US010110916B2

(12) United States Patent
Sakurai et al.

(10) Patent No.: US 10,110,916 B2
(45) Date of Patent: Oct. 23, 2018

(54) ENCODING DEVICE AND ENCODING METHOD

(71) Applicant: SONY CORPORATION, Tokyo (JP)

(72) Inventors: Hironari Sakurai, Kanagawa (JP); Junichi Tanaka, Kanagawa (JP); Takefumi Nagumo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 140 days.

(21) Appl. No.: 15/126,797

(22) PCT Filed: Apr. 8, 2015

(86) PCT No.: PCT/JP2015/060927
§ 371 (c)(1),
(2) Date: Sep. 16, 2016

(87) PCT Pub. No.: WO2015/163146
PCT Pub. Date: Oct. 29, 2015

(65) Prior Publication Data
US 2017/0094312 A1 Mar. 30, 2017

(30) Foreign Application Priority Data

Apr. 22, 2014 (JP) .................................. 2014-087911

(51) Int. Cl.
*H04N 19/61* (2014.01)
*H04N 19/124* (2014.01)
(Continued)

(52) U.S. Cl.
CPC ......... *H04N 19/577* (2014.11); *H04N 19/105* (2014.11); *H04N 19/124* (2014.11);
(Continued)

(58) Field of Classification Search
None
See application file for complete search history.

(56) References Cited

U.S. PATENT DOCUMENTS

2013/0272410 A1* 10/2013 Seregin .................. H04N 19/52
375/240.16
2014/0010446 A1* 1/2014 Chujoh .................. G06T 9/004
382/166
(Continued)

FOREIGN PATENT DOCUMENTS

JP 2011-205212 10/2011
WO WO2012/042810 A1 4/2012
(Continued)

OTHER PUBLICATIONS

Bross, et al., "Editors' proposed corrections to HEVC version 1", Joint Collaborative Team on Video Coding (JCT-VC) of ITU-T SG16 WP3 and ISO/IEC JTC1/SC29/WG11, Apr. 18-26, 2013, pp. i-298, 13th Meeting: Incheon, KR.

(Continued)

*Primary Examiner* — Reza Aghevli
(74) *Attorney, Agent, or Firm* — Paratus Law Group, PLLC

(57) ABSTRACT

The present disclosure relates to an encoding device and an encoding method capable of reducing a storage capacity necessary for bidirectional prediction. An accuracy transform unit transforms a motion vector with fractional pixel accuracy of an input image into a motion vector with integer pixel accuracy of the image for each of prediction directions for bidirectional prediction of the input image. An average unit forms a predicted image of the input image for bidirectional prediction on the basis of the motion vector with integer pixel accuracy transformed by the accuracy transform unit for each prediction direction. The present disclosure is applicable to an encoding device of high efficiency video coding (HEVC) system, for example.

18 Claims, 29 Drawing Sheets

(51) Int. Cl.
*H04N 19/513* (2014.01)
*H04N 19/577* (2014.01)
*H04N 19/146* (2014.01)
*H04N 19/105* (2014.01)
*H04N 19/182* (2014.01)
*H04N 19/176* (2014.01)
*H04N 19/172* (2014.01)

(52) U.S. Cl.
CPC ......... *H04N 19/146* (2014.11); *H04N 19/513* (2014.11); *H04N 19/61* (2014.11); *H04N 19/172* (2014.11); *H04N 19/176* (2014.11); *H04N 19/182* (2014.11)

(56) References Cited

U.S. PATENT DOCUMENTS

| | | | | |
|---|---|---|---|---|
| 2014/0301463 A1* | 10/2014 | Rusanovskyy | ........ | H04N 19/52 375/240.14 |
| 2014/0301466 A1* | 10/2014 | Li | ........ | H04N 19/597 375/240.16 |
| 2014/0314147 A1* | 10/2014 | Rusanovskyy | ........ | H04N 19/597 375/240.12 |
| 2015/0016531 A1* | 1/2015 | Hannuksela | ........ | H04N 19/70 375/240.16 |
| 2015/0023405 A1* | 1/2015 | Joshi | ........ | H04N 19/176 375/240.02 |
| 2015/0023423 A1* | 1/2015 | Zhang | ........ | H04N 19/176 375/240.16 |
| 2015/0078456 A1* | 3/2015 | Hannuksela | ........ | H04N 19/70 375/240.25 |
| 2015/0103906 A1* | 4/2015 | Zhao | ........ | H04N 19/46 375/240.12 |
| 2015/0103911 A1* | 4/2015 | Lee | ........ | H04N 19/577 375/240.15 |
| 2015/0103927 A1* | 4/2015 | Hannuksela | ........ | H04N 19/119 375/240.26 |
| 2015/0156501 A1* | 6/2015 | Hannuksela | ........ | H04N 19/70 375/240.12 |
| 2015/0172717 A1* | 6/2015 | Zhao | ........ | H04N 19/597 375/240.16 |

FOREIGN PATENT DOCUMENTS

| | | |
|---|---|---|
| WO | WO2013/069095 A1 | 5/2013 |
| WO | WO2013/119937 A1 | 8/2013 |
| WO | WO2013/157791 A1 | 10/2013 |

OTHER PUBLICATIONS

Sullivan, et al., "Overview of the High Efficiency Video Coding (HEVC) Standard", IEEE Transactions on Circuits and Systems for Video Technology, Dec. 2012, pp. 1649-1668, vol. 22 No. 12, IEEE.

Kondo, et al., "AHG7: Level definition to limit memory bandwidth of MC", Joint Collaborative Team on Video Coding (JCT-VC) of ITU-T SG16 WP3 and ISO/IEC JTC1/SC29/WG11, Feb. 1-10, 2012, pp. 1-8, 8$^{th}$ Meeting: San Jose, CA, USA.

Laroche, et al., "Non-RCE1: On MV resolution and motion vector predictor number", Joint Collaborative Team on Video Coding (JCT-VC) of ITU-T SG16 WP3 and ISO/IEC JTC1/SC29/WG11, Mar. 27-Apr. 4, 2014, pp. 1-6, 17$^{th}$ Meeting: Valencia, ES.

Fukushima, et al., "AHG7: Bi-pred restriction for small PUs", Joint Collaborative Team on Video Coding (JCT-VC) of ITU-T SG16 WP3 and ISO/IEC JTC1/SC29/WG11, Apr. 27-May 7, 2012, pp. 1-10, 9$^{th}$ Meeting: Geneva, CH.

* cited by examiner

FIG. 18

| QP | PREDICTION DIRECTION LIMITATION INFORMATION | MOTION VECTOR LIMITATION INFORMATION |
|---|---|---|
| 0 TO 29 | PRESENT | — |
| 30 TO 39 | ABSENT | PRESENT |
| 40 TO 51 | ABSENT | ABSENT |

FIG. 20

| FRAME RATE | PREDICTION DIRECTION LIMITATION INFORMATION | MOTION VECTOR LIMITATION INFORMATION |
|---|---|---|
| 30p OR HIGHER | PRESENT | — |
| 10p TO 29p | ABSENT | PRESENT |
| 1p TO 9p | ABSENT | ABSENT |

FIG. 21

| RESOLUTION | PREDICTION DIRECTION LIMITATION INFORMATION | MOTION VECTOR LIMITATION INFORMATION |
|---|---|---|
| VGA | PRESENT | — |
| HD | ABSENT | PRESENT |
| 4K | ABSENT | ABSENT |

ENCODING DEVICE AND ENCODING METHOD

CROSS REFERENCE TO PRIOR APPLICATION

This application is a National Stage Patent Application of PCT International Patent Application No. PCT/JP2015/060927 (filed on Apr. 8, 2015) under 35 U.S.C. § 371, which claims priority to Japanese Patent Application No. 2014-087911 (filed on Apr. 22, 2014), which are all hereby incorporated by reference in their entirety.

TECHNICAL FIELD

The present disclosure relates to an encoding device and an encoding method, and more particularly to an encoding device and an encoding method capable of reducing a storage capacity necessary for bidirectional prediction.

BACKGROUND ART

An encoding system called high efficiency video coding (HEVC) has been standardized by joint collaboration team-video coding (JCTVC) corresponding to a joint standardizing body of ITU-T and ISO/IEC (for example, see Non-Patent Document 1).

According to advanced video coding (AVC) system and HEVC system, motion vectors with fractional pixel accuracy (decimal pixel accuracy) are detected in respective prediction directions for bidirectional prediction (BiP) of an 8-bit image. Motion compensation is performed on the basis of the detected motion vectors. Further, according to the AVC system, 14-bit predicted images obtained in respective prediction directions are rounded into 8-bit images, and averaged to form final predicted images.

According to the HEVC system, however, 14-bit predicted images in respective prediction directions are not rounded. The 14-bit predicted images not rounded are averaged to form final predicted images. Accordingly, accuracy of the predicted images improves in comparison with accuracy of the predicted images formed by the AVC system. However, the HEVC system increases a storage capacity of a cache necessary for retaining predicted images in respective prediction directions before averaging. The same holds when a prediction mode is a merge mode.

Moreover, in case of bidirectional prediction, reference images in two directions need to be retained in the cache for detection of motion vectors and motion compensation. Accordingly, the storage capacity of the cache necessary for retaining reference images becomes larger than the corresponding storage capacity for unidirectional prediction.

CITATION LIST

Non-Patent Document

Non-Patent Document 1: Benjamin Bross, Gary J. Sullivan, Ye-Kui Wang, "Editors' proposed corrections to HEVC version 1", JCTVC-M0432_v3, 2013.4.18-4.26

SUMMARY OF THE INVENTION

Problems to be Solved by the Invention

Accordingly, reduction of a storage capacity necessary for bidirectional prediction has been demanded.

The present disclosure developed in consideration of the aforementioned circumstances reduces a storage capacity necessary for bidirectional, prediction.

Solutions to Problems

An encoding device according to a first aspect of the present disclosure includes: an accuracy transform unit that transforms a motion vector with fractional pixel accuracy of an image into a motion vector with integer pixel accuracy for each of prediction directions for bidirectional prediction of the image; a predicted image formation unit that forms a predicted image of bidirectional prediction for the image on the basis of the motion vector with integer pixel accuracy transformed by the accuracy transform unit for each of the prediction directions; and an encoding unit that encodes the image in accordance with a recursively divided block structure by using the predicted image of the bidirectional prediction formed by the predicted image formation unit.

An encoding method according to the first aspect of the present disclosure corresponds to the encoding device according to the first aspect of the present disclosure.

According to the first aspect of the present disclosure, a motion vector with fractional pixel accuracy of an image is transformed into a motion vector with integer pixel accuracy of the image for each of prediction directions for bidirectional prediction of the image. A predicted image of bidirectional prediction for the image is formed on the basis of the motion vector with integer pixel accuracy transformed for each of the prediction directions. The image is encoded in accordance with a recursively divided block structure by using the predicted image of the bidirectional prediction.

An encoding device according to a second aspect of the present disclosure includes: a direction limitation prediction unit that limits prediction for an image to either forward prediction or backward prediction in units of a plurality of largest coding units (LCUs) when a predicted image is formed for the image; and an encoding unit that encodes the image in accordance with a recursively divided block structure by using the predicted image.

An encoding method according to the second aspect of the present disclosure corresponds to the encoding device according to the second aspect of the present disclosure.

According to the second aspect of the present disclosure, prediction for an image is limited to either forward prediction or backward prediction in units of a plurality of largest coding units (LCUs) when a predicted image is formed for the image. The image is encoded in accordance with a recursively divided block structure by using the predicted image.

Note that the encoding devices according to the first and second aspects are realized by a computer executing programs.

Moreover, for realizing the encoding devices according to the first and second aspects, the programs executed by the computer may be transmitted via a transmission medium, or recorded in a recording medium to be supplied to the computer.

Each of the encoding devices according to the first and second aspects may be either an independent device, or an internal block constituting one device.

Effects of the Invention

According to the first and second aspects of the present disclosure, encoding of an image is achievable. Moreover, according to the first and second aspects of the present disclosure, a storage capacity necessary for bidirectional prediction decreases.

Note that advantages to be offered are not limited to these advantages, but may be any of advantages described in the present disclosure.

BRIEF DESCRIPTION OF DRAWINGS

FIG. 18 is a view illustrating a first example of a limitation table.

FIG. 20 is a view illustrating a second example of the limitation table.

FIG. 21 is a view illustrating a third example of the limitation table.

MODE FOR CARRYING OUT THE INVENTION

A premise for the present disclosure, and embodiments for carrying out the present disclosure (hereinafter referred to as embodiments) are described hereinbelow. Note that the respective embodiments are described in the following order.

Figure 28:
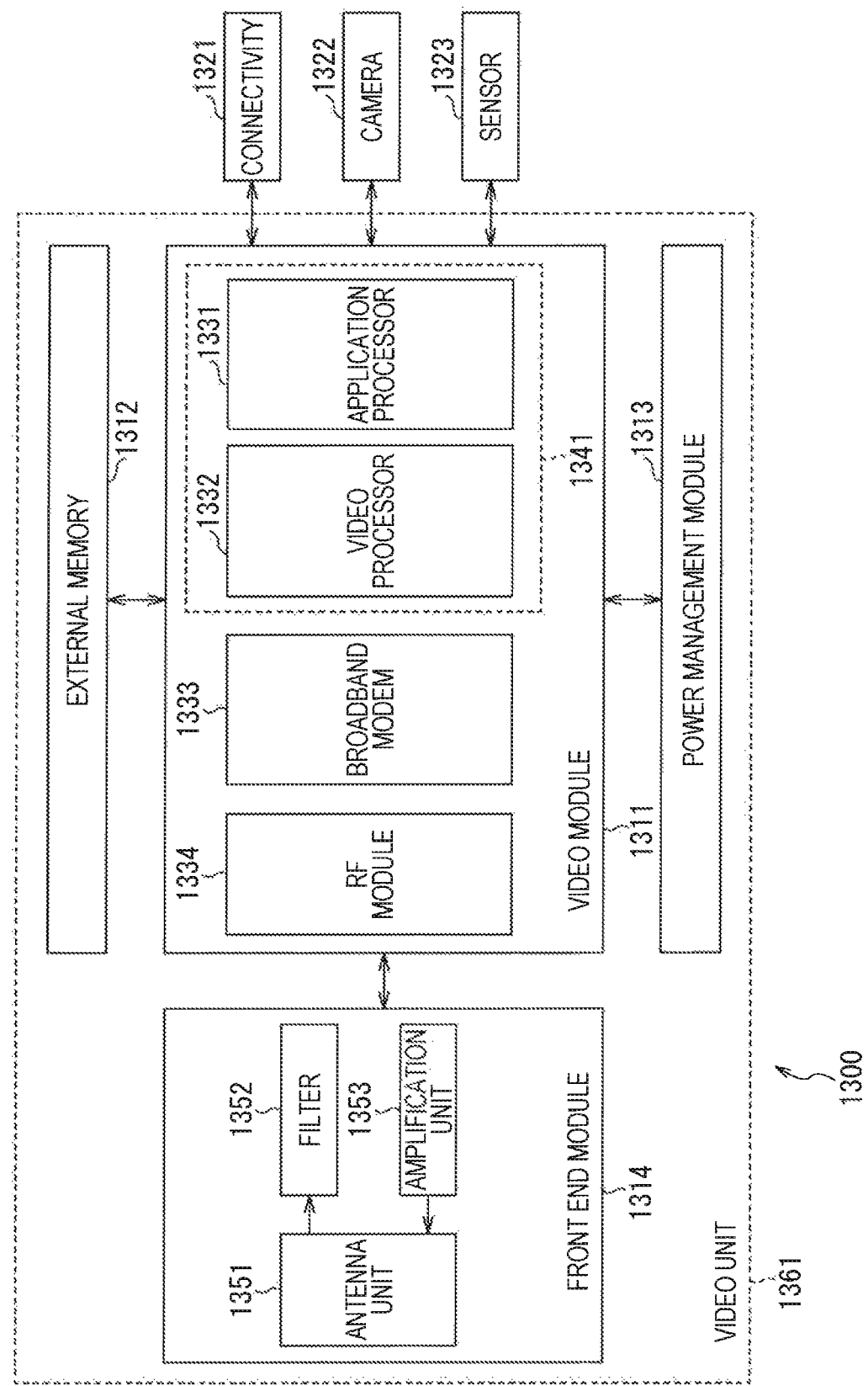
FIG. 28 is a view illustrating a general configuration example of a video set according to the present disclosure.
Figure 29:
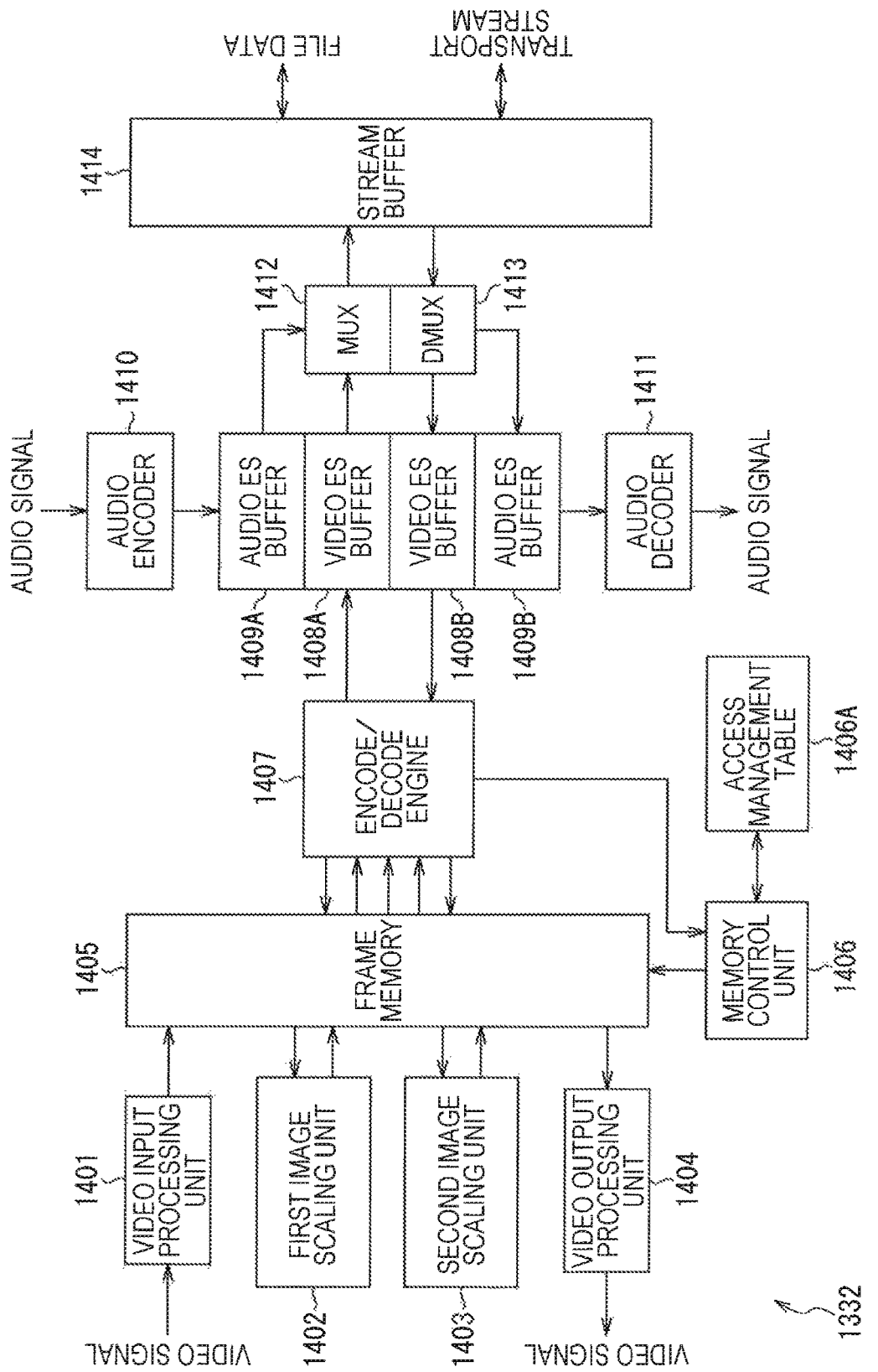
FIG. 29 is a view illustrating a general configuration example of a video processor according to the present disclosure.
Figure 30:
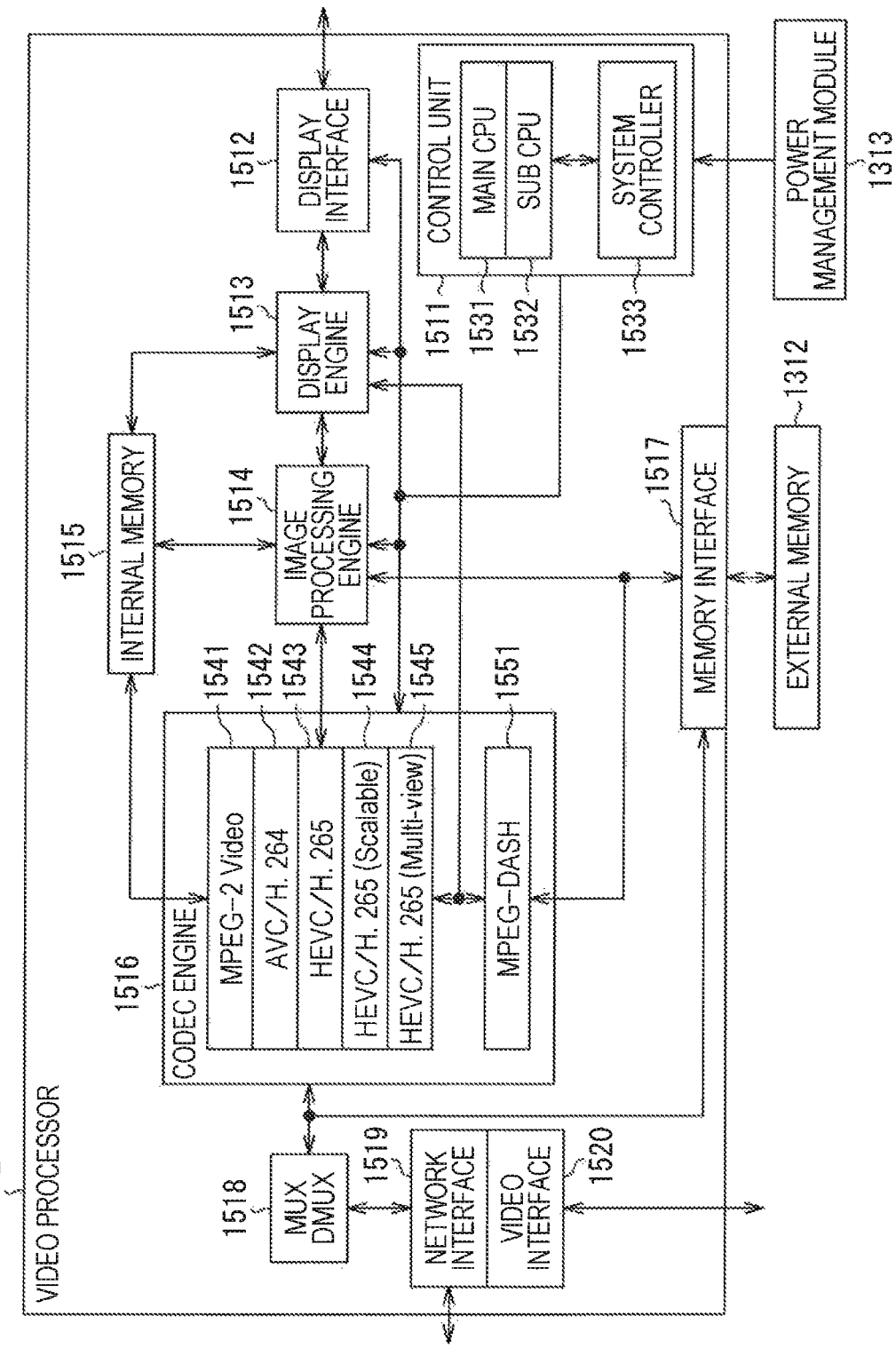
FIG. 30 is a view illustrating another example of a general configuration of a video processor according to the present disclosure.

1. First Embodiment: Encoding Device (FIGS. 1 through 9)
2. Second Embodiment: Encoding Device (FIGS. 10 through 16)
3. Third Embodiment: Encoding Device (FIGS. 17 through 21)
4. Decoding Device (FIG. 22)
5. Fourth Embodiment: Computer (FIG. 23)
6. Television Device (FIG. 24)
7. Fifth Embodiment: Cellular Phone (FIG. 25)
8. Sixth Embodiment: Recording and Reproducing Device (FIG. 26)
9. Seventh Embodiment: Imaging Device (FIG. 27)
10. Eighth Embodiment: Video Set (FIGS. 28 through 30)

First Embodiment (Configuration Example of Encoding Device in First Embodiment)

Figure 1:
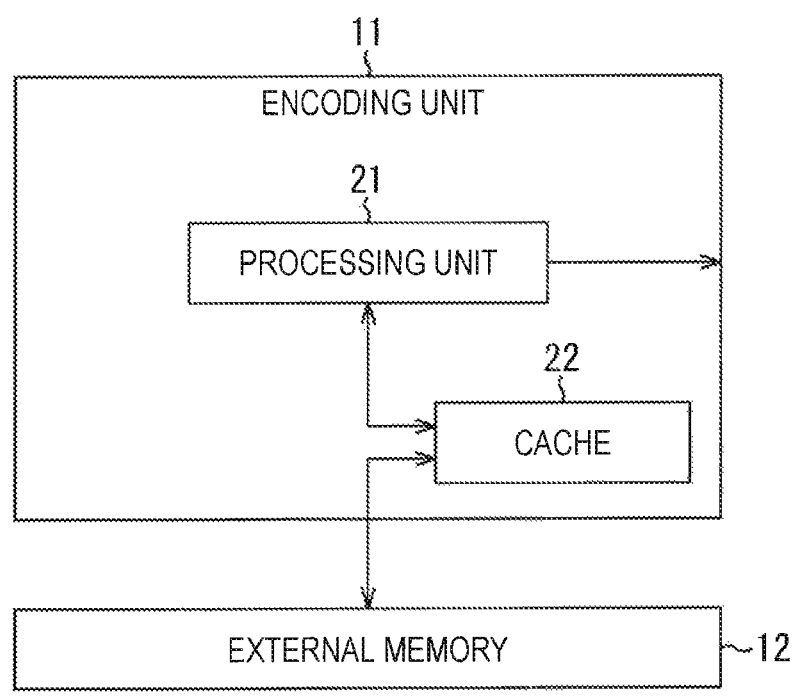
FIG. 1 is a block diagram illustrating a configuration example of an encoding device according to a first embodiment of the present disclosure.

FIG. 1 is a block diagram illustrating a configuration example of an encoding device according to a first embodiment of the present disclosure.

An encoding device 10 illustrated in FIG. 1 is constituted by an encoding unit 11 and an external memory 12. The encoding device 10 encodes images stored in the external memory 12 by HEVC system.

More specifically, the encoding unit 11 of the encoding device 10 is constituted by a processing unit 21 and a cache 22. The processing unit 21 receives, via the cache 22, images corresponding to encoding targets and stored in the external memory 12. The processing unit 21 encodes the received images (hereinafter referred to as input images). In this case, the processing unit 21 supplies intermediate results and final results of encoding to the cache 22 as necessary to store these results in the cache 22. The processing unit 21 further reads encoded images stored in the cache 22 as reference images, and uses the read images for encoding.

The cache 22 temporarily stores intermediate results and final results of encoding supplied from the processing unit 21. The cache 22 supplies stored encoded images corresponding to the final results of encoding to the external memory 12 to store the final results in the external memory 12. Moreover, the cache 22 temporality stores encoded images supplied as reference images from the external memory 12, and input images.

The external memory 12 is constituted by a DRAM (dynamic random access memory) or the like. The external memory 12 stores input images, and encoded images supplied from the cache 22. The external memory 12 supplies the stored input images to the cache 22. The external memory 12 further supplies the stored encoded images to the cache 22 as reference images.

(Configuration Example of Encoding Unit)

Figure 2:
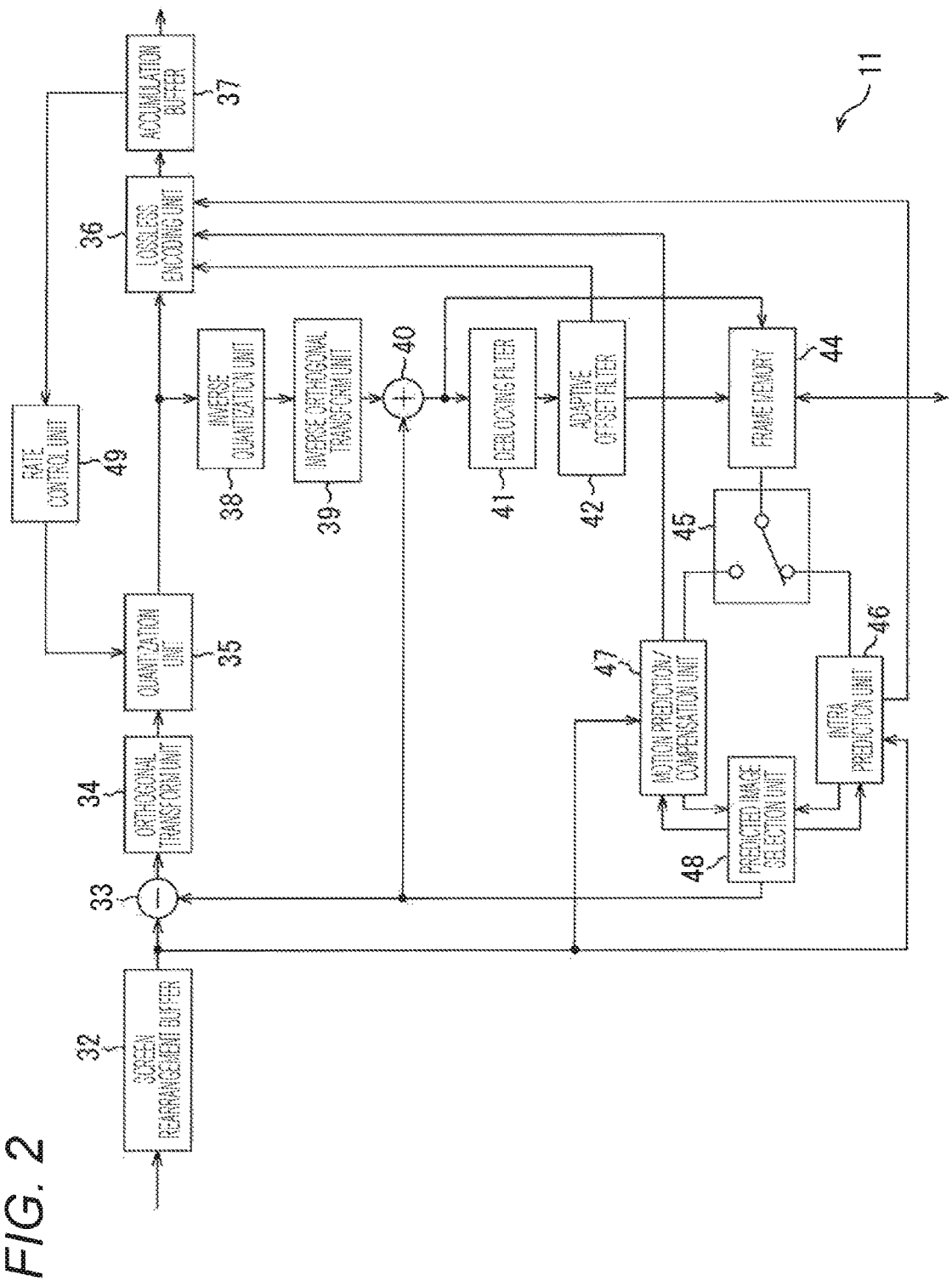
FIG. 2 is a block diagram illustrating a configuration example of an encoding unit illustrated in FIG. 1.

FIG. 2 is a block diagram illustrating a configuration example of the encoding unit 11 illustrated in FIG. 1.

The encoding unit 11 illustrated in FIG. 2 includes a screen rearrangement buffer 32, an arithmetic unit 33, an orthogonal transform unit 34, a quantization unit 35, a lossless encoding unit 36, an accumulation buffer 37, an inverse quantization unit 38, an inverse orthogonal transform unit 39, and an addition unit 40. The encoding unit 11 further includes a deblocking filter 41, an adaptive offset filter 42, a frame memory 44, a switch 45, an intra prediction unit 46, a motion prediction/compensation unit 47, a predicted image selection unit 48, and a rate control unit 49.

The processing unit 21 is constituted by parts performing processes contained in blocks other than the screen rearrangement buffer 32, the accumulation buffer 37, and the frame memory 44. The cache 22 is constituted by the screen rearrangement buffer 32, the accumulation buffer 37, the frame memory 44, and parts temporarily storing intermediate results and final results of processes contained in the blocks other than the screen rearrangement buffer 32, the accumulation buffer 37, and the frame memory 44.

The screen rearrangement buffer 32 of the encoding unit 11 stores input images supplied as digital signals from the external memory 12 illustrated in FIG. 1. The screen rearrangement buffer 32 rearranges the arrangement order of the input images, which have been stored in units of frame and arranged in the order of display, into the order for encoding in accordance with GOP structure. The screen rearrangement buffer 32 outputs the rearranged input images to the arithmetic unit 33, the intra prediction unit 46, and the motion prediction/compensation unit 47.

The arithmetic unit 33 functioning as an encoding unit encodes the input images supplied from the screen rearrangement buffer 32 in accordance with a recursively divided block structure by using predicted images supplied from the predicted image selection unit 48. More specifically, the arithmetic unit 33 performs encoding by subtracting the predicted images from the input images on the basis of the structure of coding units (CUs). The arithmetic unit 33 outputs images obtained by subtraction to the orthogonal transform unit 34 as residual information. Note that, when no predicted image is supplied from the predicted image selection unit 48, the arithmetic unit 33 outputs images read from the screen rearrangement buffer 32 to the orthogonal transform unit 34 as residual information without changing the images.

The orthogonal transform unit 34 performs orthogonal transform for the residual information received from the arithmetic unit 33 in units of transform unit (TU). The orthogonal transform unit 34 supplies orthogonal transform coefficients obtained by orthogonal transform to the quantization unit 35.

The quantization unit 35 quantizes the orthogonal coefficients supplied from the orthogonal transform unit 34. The quantization unit 35 supplies the quantized orthogonal transform coefficients to the lossless encoding unit 36.

The lossless encoding unit 36 acquires intra prediction mode information indicating an optimum intra prediction mode from the intra prediction unit 46. The lossless encoding unit 36 further acquires inter prediction mode information indicating an optimum inter prediction mode, motion vector information indicating motion vectors, information specifying reference images, and others from the motion prediction/compensation unit 47.

The lossless encoding unit 36 further acquires offset filter information indicating an offset filter from the adaptive offset filter 42.

The lossless encoding unit 36 performs lossless encoding, such as variable-length encoding (e.g., context-adaptive variable length coding (CAVLC)) and arithmetic coding (e.g., context-adaptive binary arithmetic coding (CABAC)), for the quantized orthogonal transform coefficients supplied from the quantization unit 35.

The lossless encoding unit 36 further performs lossless encoding for the intra prediction mode information, or a set of information constituted by the inter prediction mode information, the motion vector information, and the information specifying reference images, and further for the offset filter information, to obtain encoding information about encoding. The lossless encoding unit 36 supplies the encoding information and the orthogonal transform coefficients obtained by lossless encoding to the accumulation buffer 37 as encoded data to accumulate the encoded data in the accumulation buffer 37. Note that the encoding information obtained by lossless encoding may be added to encoded data as header sections such as slice headers.

The accumulation buffer 37 temporarily stores the encoded data supplied from the lossless encoding unit 36. Moreover, the accumulation buffer 37 outputs the stored encoded data.

Moreover, the quantized orthogonal transform coefficients output from the quantization unit 35 are also input to the inverse quantization unit 38. The inverse quantization unit 38 inversely quantizes the orthogonal transform coefficients quantized by the quantization unit 35 by a method corresponding to the quantization method adopted by the quantization unit 35. The inverse quantization unit 38 supplies the orthogonal transform coefficients obtained by inverse quantization to the inverse orthogonal transform unit 39.

The inverse orthogonal transform unit 39 performs inverse orthogonal transform in units of TU for the orthogonal transform coefficients supplied from the inverse quantization unit 38 by a method corresponding to the orthogonal transform method adopted by the orthogonal transform unit 34. The inverse orthogonal transform unit 39 supplies residual information obtained by inverse orthogonal transform to the addition unit 40.

The addition unit 40 adds the residual information supplied from the inverse orthogonal transform unit 39 to the predicted images supplied from the predicted image selection unit 48 to perform local decoding. Note that, when no predicted image is supplied from the predicted image selection unit 48, the addition unit 40 determines the residual information supplied from the inverse orthogonal transform unit 39 as locally decoded images. The addition unit 40 supplies the locally decoded images to the deblocking filter 41 and the frame memory 44.

The deblocking filter 41 performs deblocking filtering for removing block distortion from the locally decoded images supplied from the addition unit 40, and supplies images obtained by deblocking filtering to the adaptive offset filter 42.

The adaptive offset filter 42 performs adaptive offset filtering (sample adaptive offset (SAO)) chiefly for removing ringing from the images obtained after deblocking filtering by the deblocking filter 41.

More specifically, the adaptive offset filter 42 determines a type of adaptive offset filtering for each of largest coding units (LCUs) corresponding to maximum encoding units, and acquires offset for the determined type of adaptive offset filtering. The adaptive offset filter 42 performs the determined type of adaptive offset filtering which uses the acquired offset, for the images obtained by deblocking filtering.

The adaptive offset filter 42 supplies images obtained by adaptive offset filtering to the frame memory 44. The adaptive offset filter 42 further supplies information indicating the type of performed adaptive offset filtering and the offset to the lossless encoding unit 36 as offset filter information.

The frame memory 44 accumulates the images supplied from the adaptive offset filter 42, and the images supplied from the addition unit 40. Pixels located adjacent to predicted units (PUs) contained in the images not filtered and accumulated in the frame memory 44 are supplied to the intra prediction unit 46 as peripheral pixels via the switch 45.

On the other hand, the images filtered and accumulated in the frame memory 44 are supplied to the external memory 12 illustrated in FIG. 1, and stored in the external memory 12 as encoded images. The frame memory 44 further accumulates reference images supplied from the external memory 12. The reference images accumulated in the frame memory 44 are output to the motion prediction/compensation unit 47 via the switch 45.

The intra prediction unit 46 executes intra prediction in units of PU in all candidate intra prediction modes by using peripheral pixels read from the frame memory 44 via the switch 45.

The intra prediction unit 46 further calculates cost function values (detailed below) for all the candidate intra prediction modes on the basis of input images read from the screen rearrangement buffer 32 and predicted images formed by intra prediction. Then, the intra prediction unit 46 determines the intra prediction mode having the minimum cost function value as an optimum intra prediction mode.

The intra prediction unit 46 supplies the predicted images formed in the optimum intra prediction mode, and the corresponding cost function value to the predicted image selection unit 48. The intra prediction unit 46 supplies intra prediction mode information to the lossless encoding unit 36 when notified by the predicted image selection unit 48 about selection of the predicted images formed in the optimum intra prediction mode.

Note that the cost function value is called a rate distortion (RD) cost, and calculated by a method in a High Complexity mode or a Low Complexity mode as specified by joint model (JM) corresponding to reference software in H. 264/AVC system, for example. Note that the reference software in H. 264/AVC system has been open to the public in http://iphome.hhi.de/suehring/tml/index.htm.

More specifically, when the High Complexity mode is adopted as a calculation method for a cost function value, processes until decoding are temporarily performed for all candidate prediction modes. Then, a cost function value expressed by following Mathematical Formula (1) is calculated for each of the prediction modes.

[Mathematical Formula 1]

$$\text{Cost(Mode)}=D+\lambda \cdot R \quad (1)$$

In Mathematical Formula (1), D is a difference (distortion) between an original image and a decoded image, R is a generated code amount until orthogonal transform coefficients, and λ is a Lagrange undetermined multiplier given as a function of a quantization parameter QP.

When the Low Complexity mode is adopted as a calculation method of a cost function value, processing for forming predicted images, and calculating a code amount of encoding information is performed for all the candidate prediction modes. Then, a cost function Cost(Mode) expressed by following Mathematic Formula (2) is calculated for each of the prediction modes.

[Mathematical Formula 2]

$$\text{Cost(Mode)}=D+\text{QPtoQuant}(QP)\cdot \text{Header\_Bit} \quad (2)$$

In Mathematical Formula (2), D is a difference (distortion) between an original image and a predicted image, Header_Bit is a code amount of encoding information, and QPtoQuant is a function given as a function of a quantization parameter QP.

In the Low Complexity mode, only predicted images need to be formed for all the prediction modes without the necessity for forming decoded images. Accordingly, a calculation amount decreases.

The motion prediction/compensation unit 47 performs motion prediction and compensation in units of PU for all the candidate inter prediction modes. More specifically, the motion prediction/compensation unit 47 detects motion vectors with ¼ pixel accuracy for all the candidate inter prediction modes on the basis of input images supplied from the screen rearrangement buffer 32, and reference images supplied from the frame memory 44 via the switch 45. Note that the inter prediction mode in this context refers to a mode indicating a size of PU, a prediction direction, whether or not the mode is a merge mode, and other conditions.

When the candidate inter prediction mode indicates bidirectional prediction as the prediction direction, the motion prediction/compensation unit 47 transforms motion vectors with ¼ pixel accuracy into motion vectors with integer pixel accuracy. Then, the motion prediction/compensation unit 47 performs compensation for the reference images on the basis of the transformed motion vectors with integer pixel accuracy to form predicted images. On the other hand, when the candidate inter prediction mode indicates forward or backward prediction as the prediction direction, the motion prediction/compensation unit 47 performs compensation for the reference images using linear interpolation on the basis of the motion vectors with ¼ pixel accuracy to form predicted images.

Note that the forward prediction (L0 prediction) in this context is prediction which uses an image located before an input image corresponding to an encoding target in the order of display as a reference image, while the backward prediction (L1 prediction) is prediction which uses an image located after an input image corresponding to an encoding target in the order of display as a reference image.

The motion prediction/compensation unit 47 further calculates cost function values for all the candidate inter prediction modes on the basis of the input images and the predicted images, and determines the inter prediction mode having the minimum cost function value as an optimum inter prediction mode. Then, the motion prediction/compensation unit 47 supplies the cost function value in the optimum inter prediction mode, and the corresponding predicted images to the predicted image selection unit 48.

Moreover, the motion prediction/compensation unit 47 outputs inter prediction mode information, corresponding motion vector information, information specifying reference images, and others to the lossless encoding unit 36 when notified by the predicted image selection unit 48 about selection of the predicted images formed in the optimum inter prediction mode.

The predicted image selection unit 48 selects the mode having a smaller cost function value from the optimum intra prediction mode and the optimum inter prediction mode on the basis of the cost function values supplied from the intra prediction unit 46 and the motion prediction/compensation unit 47, and determines the selected mode as an optimum prediction mode. Then, the predicted image selection unit 48 supplies predicted images in the optimum prediction mode to the arithmetic unit 33 and the addition unit 40. The predicted image selection unit 48 further notifies the intra prediction unit 46 or the motion prediction/compensation unit 47 about selection of the predicted images in the optimum prediction mode.

The rate control unit 49 controls a rate of quantization performed by the quantization unit 35 on the basis of encoded data accumulated in the accumulation buffer 37 such that no overflow or underflow is caused.

(Configuration Example of Motion Prediction/Compensation Unit)

Figure 3:
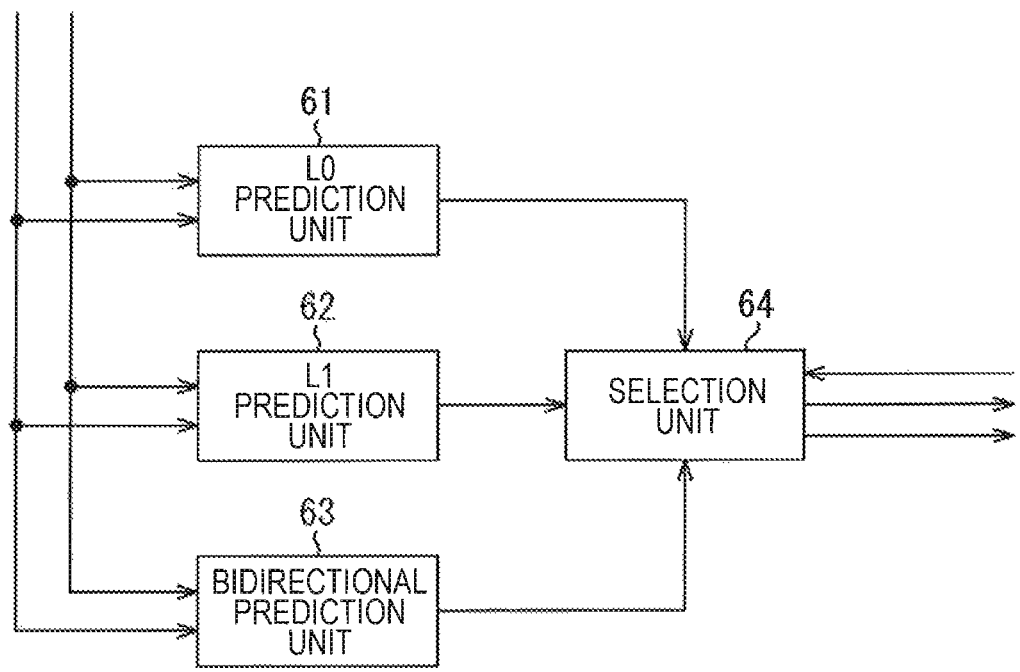
FIG. 3 is a block diagram illustrating a configuration example of a motion prediction/compensation unit illustrated in FIG. 2.

FIG. 3 is a block diagram illustrating a configuration example of the motion prediction/compensation unit 47 illustrated in FIG. 2.

The motion prediction/compensation unit 47 illustrated in FIG. 3 is constituted by an L0 prediction unit 61, an L1 prediction unit 62, a bidirectional prediction unit 63, and a selection unit 64.

The L0 prediction unit 61 of the motion prediction/compensation unit 47 performs motion prediction and compensation in units of PU in inter prediction modes indicating candidate L0 prediction (hereinafter referred to as L0 prediction modes). More specifically, the L0 prediction unit 61 detects motion vectors with ¼ pixel accuracy for each L0 prediction mode on the basis of input images received from the screen rearrangement buffer 32 and reference images located before the input images in the order of display and received from the switch 45. Then, the L0 prediction unit 61 performs compensation using linear interpolation for the reference images for each L0 prediction mode on the basis of the motion vectors with ¼ pixel accuracy to form predicted images.

The L0 prediction unit 61 further calculates a cost function value for each L0 prediction mode on the basis of the input images and the predicted images. The L0 prediction unit 61 supplies the predicted images and the cost function values in the respective L0 prediction modes to the selection unit 64.

Processing performed by the L1 prediction unit 62 is similar to processing performed by the L0 prediction unit 61 except for the point that the prediction direction is backward. More specifically, the L1 prediction unit 62 performs motion prediction and compensation in units of PU in inter prediction modes indicating candidate L1 prediction (hereinafter referred to as L1 prediction modes). The L1 prediction unit 62 further calculates a cost function value for each L1 prediction mode on the basis of the input images and the predicted images. The L1 prediction unit 62 supplies the predicted images and the cost function values in the respective L1 prediction modes to the selection unit 64.

The bidirectional prediction unit 63 performs motion prediction and compensation in units of PU in inter prediction modes indicating candidate bidirectional prediction (hereinafter referred to as bidirectional prediction modes). More specifically, the bidirectional prediction unit 63 detects forward motion vectors with ¼ pixel accuracy for each bidirectional prediction mode on the basis of input images and reference images located before the input images in the order of display. The bidirectional prediction unit 63 further detects backward motion vectors with ¼ pixel accuracy for each bidirectional prediction mode on the basis of input images and reference images located after the input images in the order of display.

Then, the bidirectional prediction unit 63 transforms the detected forward and backward motion vectors with ¼ pixel accuracy into motion vectors with integer pixel accuracy. The bidirectional prediction unit 63 performs compensation for the reference images for each bidirectional prediction mode on the basis of the forward and backward motion vectors with integer pixel accuracy to form predicted images of L0 prediction and L1 prediction. The bidirectional prediction unit 63 further averages the predicted images of L0 prediction and the predicted images of L1 prediction for each bidirectional prediction mode to form predicted images of bidirectional prediction.

The bidirectional prediction unit 63 calculates a cost function value for each bidirectional prediction mode on the basis of the input images and the predicted images of bidirectional prediction. The bidirectional prediction unit 63 supplies the predicted images and the cost function values in the respective bidirectional prediction modes to the selection unit 64.

The selection unit 64 selects the inter prediction mode corresponding to the minimum cost function value in the cost function values supplied from the L0 prediction unit 61, the L1 prediction unit 62, and the bidirectional prediction unit 63, and determines the selected mode as an optimum inter prediction mode. Then, the selection unit 64 supplies the cost function value of the optimum inter prediction mode, and the corresponding predicted images to the predicted image selection unit 48 illustrated in FIG. 2. The selection unit 64 further outputs inter prediction mode information, corresponding motion vector information, information specifying reference images, and others to the lossless encoding unit 36 when notified by the predicted image selection unit 48 about selection of the predicted images formed in the optimum inter prediction mode.

(Configuration Example of Bidirectional Prediction Unit)

Figure 4:
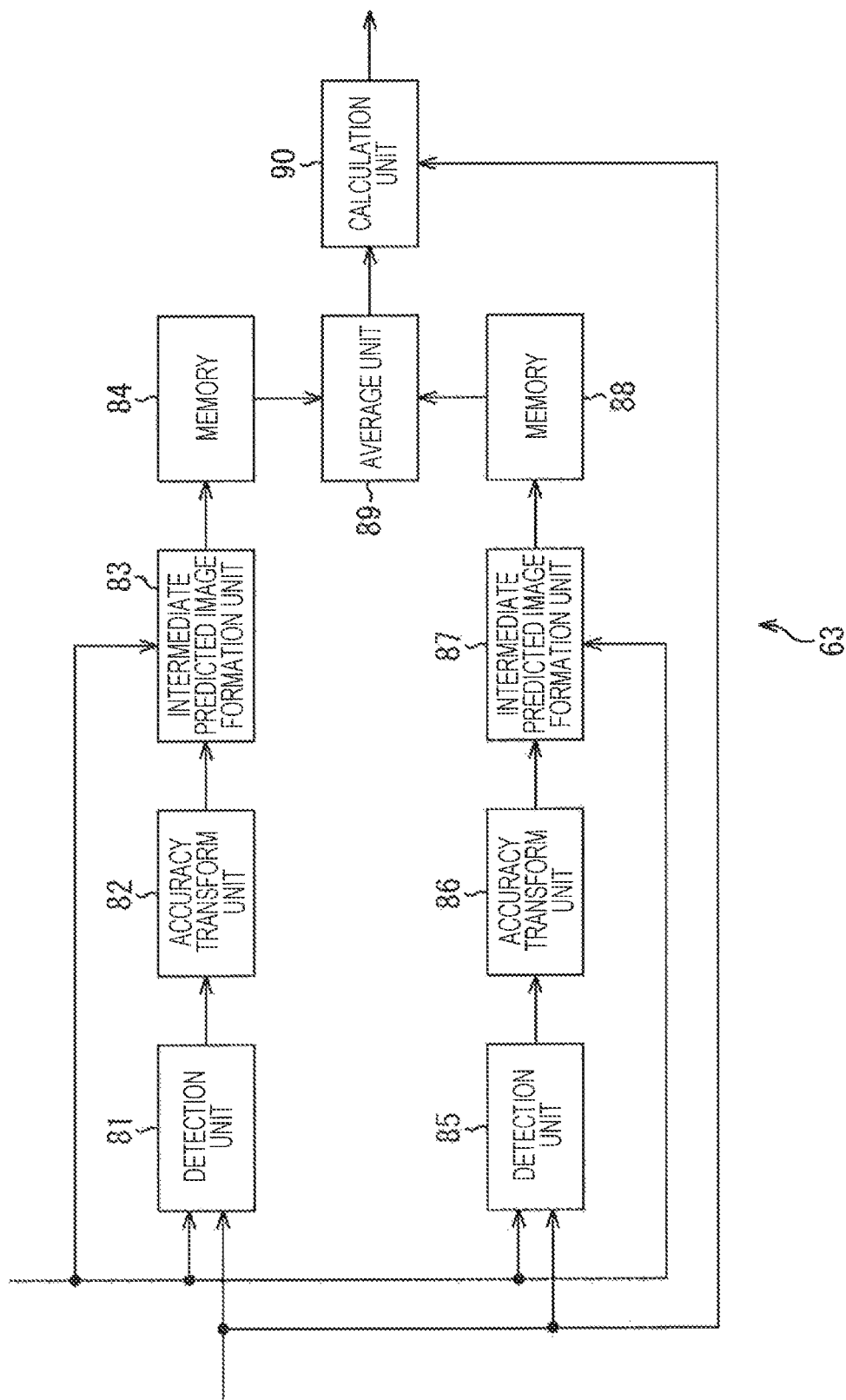
FIG. 4 is a block diagram illustrating a configuration example of a bidirectional prediction unit illustrated in FIG. 3.

FIG. 4 is a block diagram illustrating a configuration example of the bidirectional prediction unit 63 illustrated in FIG. 3.

The bidirectional prediction unit 63 illustrated in FIG. 4 is constituted by a detection unit 81, an accuracy transform unit 82, an intermediate predicted image formation unit 83, a memory 84, a detection unit 85, an accuracy transform unit 86, an intermediate predicted image formation unit 87, a memory 88, an average unit 89, and a calculation unit 90.

The detection unit 81 of the bidirectional prediction unit 63 includes a two-dimensional linear interpolation adaptive filter. For bidirectional prediction of input images, the detection unit 81 detects forward motion vectors with ¼ pixel accuracy for each of candidate bidirectional prediction modes.

More specifically, the detection unit 81 performs interpolation filtering for input images supplied from the screen rearrangement buffer 32 illustrating in FIG. 2 by using a two-dimensional linear interpolation adaptive filter to increase resolution of the input images. The detection unit 81 further performs interpolation filtering for reference images supplied from the switch 45 illustrated in FIG. 2 and located before the input images in the order of display by using the two-dimensional linear interpolation adaptive filter to increase resolution of the reference images. The detection unit 81 detects motion vectors with ¼ pixel accuracy from the input images on the basis of the input images and the reference images having high resolution. The detection unit 81 supplies the detected motion vectors with ¼ pixel accuracy to the accuracy transform unit 82.

The accuracy transform unit 82 transforms the motion vectors with ¼ pixel accuracy supplied from the detection unit 81 into motion vectors with integer pixel accuracy, and supplies the transformed motion vectors to the intermediate predicted image formation unit 83.

The intermediate predicted image formation unit 83 executes L0 prediction by performing motion compensation for the reference images located before the input images in the order of display on the basis of the motion vectors with integer pixel accuracy supplied from the accuracy transform unit 82. The intermediate predicted image formation unit 83 supplies predicted images of L0 prediction thus formed to the memory 84 as intermediate predicted images.

The memory 84 constitutes a part of the cache 22. The memory 84 stores the predicted images of L0 prediction supplied from the intermediate predicted image formation unit 83 as intermediate predicted images.

Processing performed by the detection unit 85, the accuracy transform unit 86, the intermediate predicted image formation unit 87, and the memory 88 is similar to the processing performed by the detection unit 81, the accuracy transform unit 82, the intermediate predicted image formation unit 83, and the memory 84 except for the point that the prediction direction is backward.

More specifically, the detection unit 85 includes a two-dimensional linear interpolation adaptive filter. For bidirectional prediction of input images, the detection unit 85 detects backward motion vectors with ¼ pixel accuracy for each candidate bidirectional prediction mode. Then, the detection unit 85 supplies the detected motion vectors with ¼ pixel accuracy to the accuracy transform unit 82.

The accuracy transform unit 86 transforms the motion vectors with ¼ pixel accuracy supplied from the detection unit 85 into motion vectors with integer pixel accuracy, and supplies the transformed motion vectors to the intermediate predicted image formation unit 87.

The intermediate predicted image formation unit 87 executes L1 prediction by performing motion compensation for reference images located after the input images in the order of display on the basis of the motion vectors with integer pixel accuracy supplied from the accuracy transform unit 86. The intermediate predicted image formation unit 87 supplies predicted images of L1 prediction thus formed to the memory 88 as intermediate predicted images.

The memory 88 constitutes a part of the cache 22. The memory 88 stores the predicted images of L1 prediction supplied from the intermediate predicted image formation unit 87 as the intermediate predicted images.

The average unit 89 reads the intermediate predicted images from the memory 84 and the memory 88 for each bidirectional prediction mode, and averages the read intermediate predicted images. The average unit 89 supplies the averaged intermediate predicted images to the calculation unit 90 as predicted images of bidirectional prediction.

As described above, the intermediate predicted image formation unit 83, the memory 84, the intermediate predicted image formation unit 87, the memory 88, and the average unit 89 function as a predicted image formation unit which forms predicted images of input images of bidirectional prediction on the basis of motion vectors with integer pixel accuracy in the respective prediction directions.

The calculation unit 90 calculates a cost function value for each bidirectional prediction mode on the basis of the predicted images supplied from the average unit 89 and the input images. The calculation unit 90 supplies the predicted images in the respective bidirectional prediction modes and the calculated cost function values to the selection unit 64 illustrated in FIG. 3.

(Description of Advantageous Effects)

Figure 5:
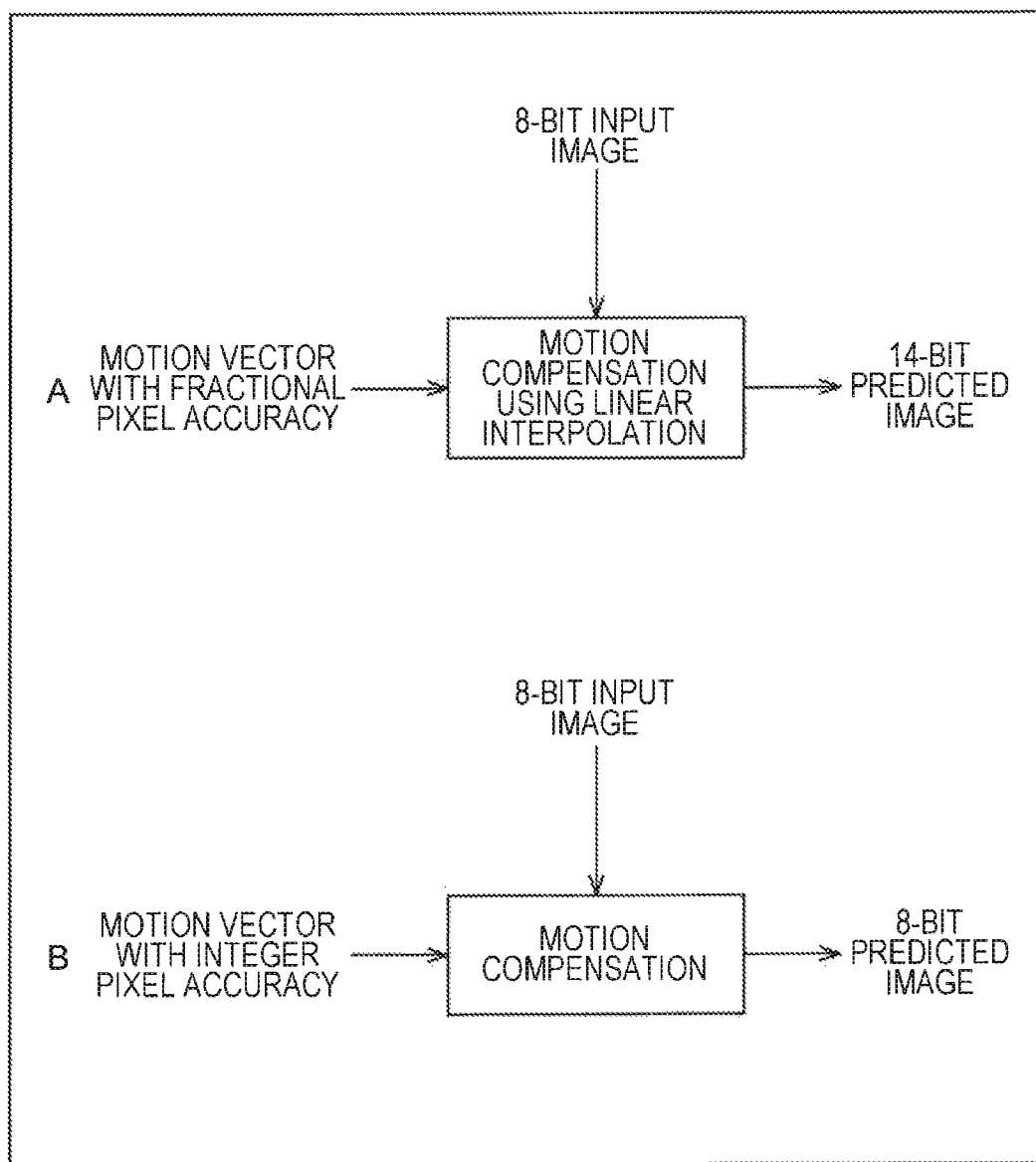
FIG. 5 is a view illustrating advantageous effects of the encoding device illustrated in FIG. 1.

FIG. 5 illustrates advantageous effects offered by the encoding device 10.

As illustrated A in FIG. 5, motion compensation based on motion vectors with fractional pixel accuracy requires linear interpolation for bidirectional prediction. Therefore, when an input image has 8 bits, for example, each of a predicted image of L0 prediction and a predicted image of L1 prediction formed by motion compensation has 14 bits. Accordingly, a large storage capacity is required for a cache storing predicted images of L0 prediction and L1 prediction to form predicted images of bidirectional prediction.

On the other hand, the encoding device 10 performs motion compensation by using motion vectors with integer pixel accuracy for bidirectional prediction. Therefore, In this case, linear interpolation is not required for motion compensation as illustrated in B in FIG. 5, wherefore an 8-bit predicted image of L0 prediction and an 8-bit predicted image of L1 prediction are formed from an 8-bit input image. Accordingly, the storage capacity required for the memory 84 and the memory 88 constituting the cache 22 decreases. In other words, according to the encoding device 10, the storage capacity of the cache necessary for bidirectional prediction decreases in comparison with the corresponding storage capacity required when motion vectors with fractional pixel accuracy are used for bidirectional prediction.

Moreover, according to the encoding device 10 which does not require linear interpolation for bidirectional prediction, a processing amount for bidirectional prediction decreases in comparison with the corresponding amount when motion vectors with fractional pixel accuracy are used for bidirectional prediction.

(Description of Processing by Encoding Device)

Figure 6:
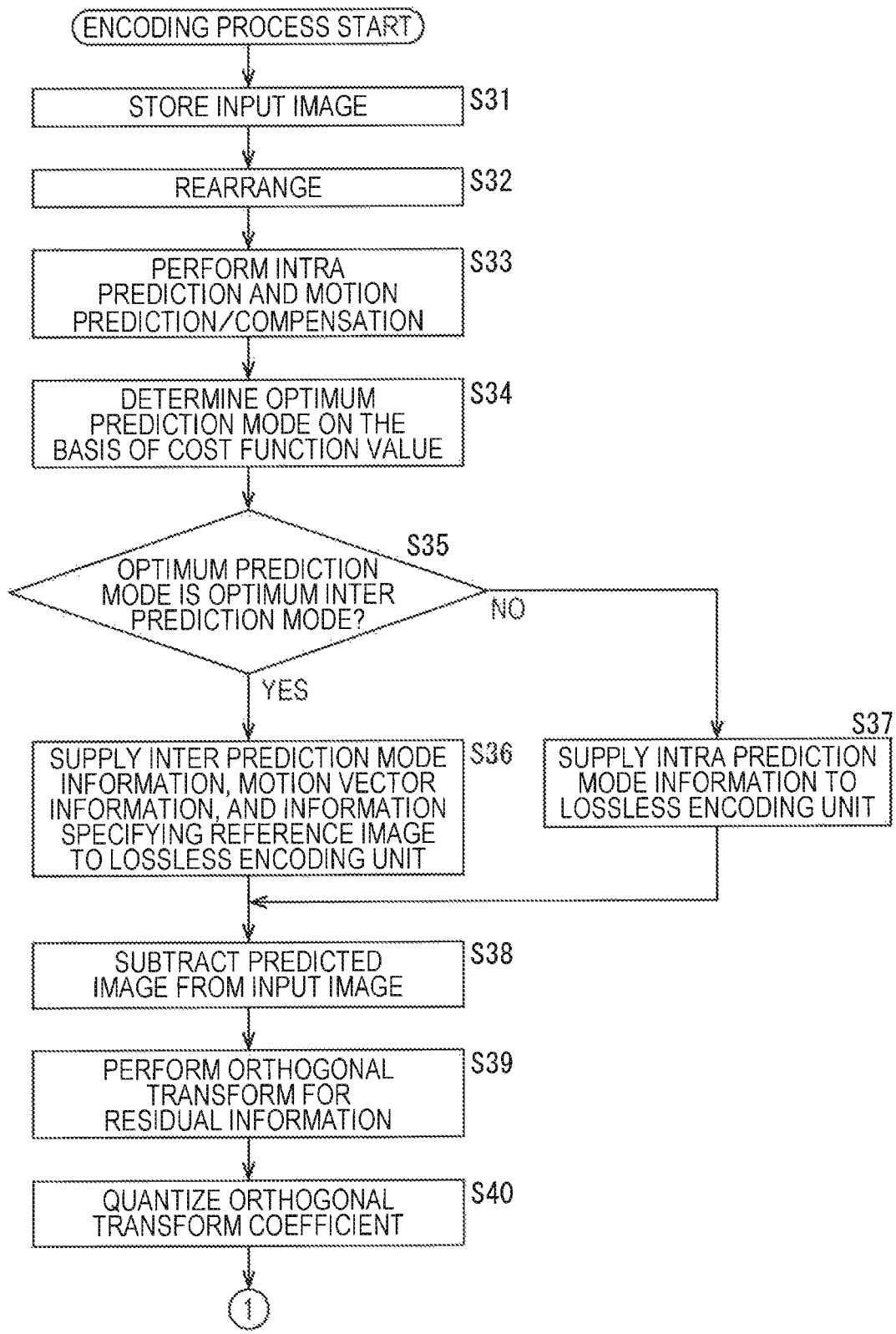
FIG. 6 is a flowchart showing an encoding process performed by the encoding device illustrated in FIG. 1.
Figure 7:
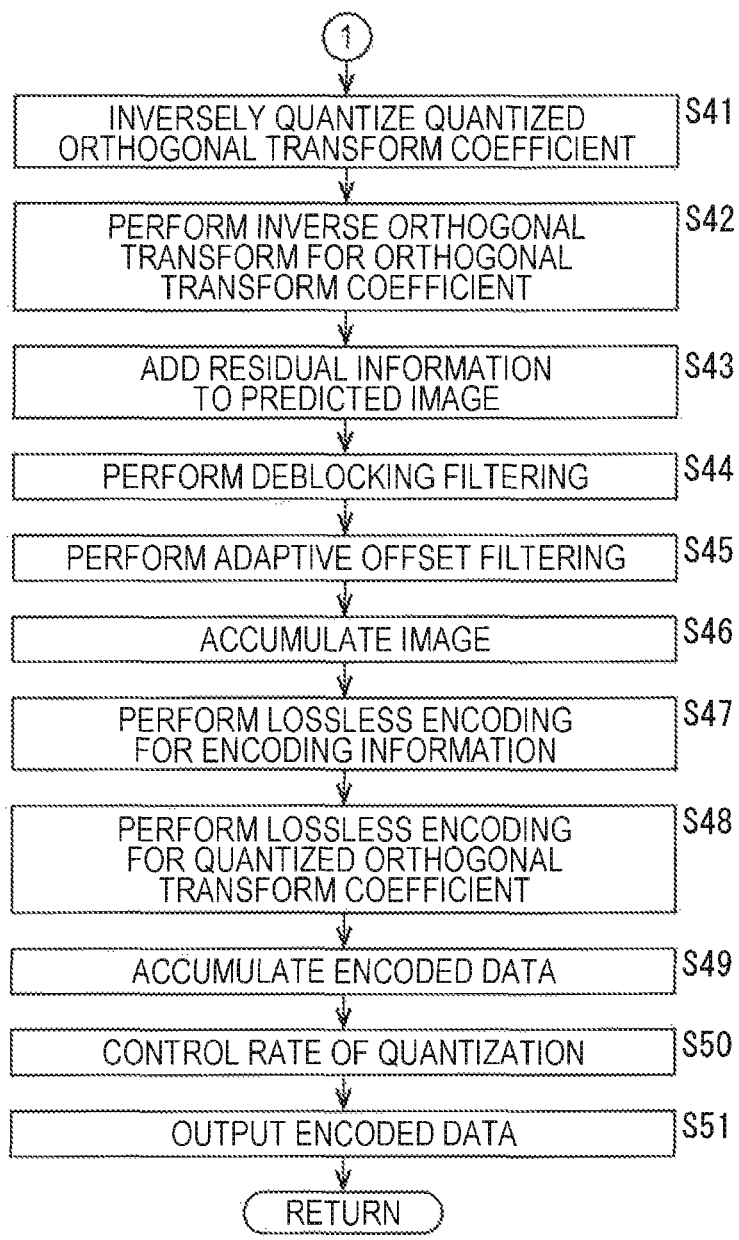
FIG. 7 is a flowchart showing the encoding process performed by the encoding device illustrated in FIG. 1.

FIGS. 6 and 7 are flowcharts showing an encoding process performed by the encoding device 10 illustrated in FIG. 1.

In step S31 shown in FIG. 7, the screen rearrangement buffer 32 of the encoding unit 11 stores input images supplied from the external memory 12 illustrated in FIG. 1.

In step S32, the screen rearrangement buffer 32 rearranges the arrangement order of the images, which have been stored in frames arranged in the order of display, into the order for encoding in accordance with GOP structure. The screen rearrangement buffer 32 supplies the rearranged images in units of frame to the arithmetic unit 33, the intra prediction unit 46, and the motion prediction/compensation unit 47.

In step S33, the intra prediction unit 46 executes intra prediction in units of PU in all candidate intra prediction modes. The intra prediction unit 46 further calculates cost function values for all the candidate intra prediction modes on the basis of the images read from the screen rearrangement buffer 32 and predicted images formed by intra prediction. Then, the intra prediction unit 46 determines the intra prediction mode having the minimum cost function value as an optimum intra prediction mode. The intra prediction unit 46 supplies the predicted images formed in the optimum intra prediction mode, and the corresponding cost function value to the predicted image selection unit 48.

Moreover, the motion prediction/compensation unit 47 performs motion prediction and compensation in units of PU in all candidate inter prediction modes. The motion prediction/compensation unit 47 further calculates cost function values for all the candidate inter prediction modes on the basis of the images supplied from the screen rearrangement buffer 32 and predicted images, and determines the inter prediction mode having the minimum cost function value as an optimum inter prediction mode. Then, the motion prediction/compensation unit 47 supplies the cost function value in the optimum inter prediction mode, and the corresponding predicted images to the predicted image selection unit 48.

In step S34, the predicted image selection unit 48 selects the mode having the minimum cost function value from the optimum intra prediction mode and the optimum inter prediction mode on the basis of the cost function values supplied from the intra prediction unit 46 and the motion prediction/compensation unit 47, and determines the selected mode as an optimum prediction mode. Then, the predicted image selection unit 48 supplies predicted images in the optimum prediction mode to the arithmetic unit 33 and the addition unit 40.

In step S35, the predicted image selection unit 48 determines whether or not the optimum prediction mode is an optimum inter prediction mode. When it is determined in step S35 that the optimum prediction mode is the optimum inter prediction mode, the predicted image selection unit 48 notifies the motion prediction/compensation unit 47 about selection of the predicted images formed in the optimum inter prediction mode.

Then, in step S36, the motion prediction/compensation unit 47 supplies inter prediction mode information, motion vector information, and information specifying reference images to the lossless encoding unit 36, whereafter the process proceeds to step S38.

On the other hand, when it is determined in step S35 that the optimum prediction mode is not the optimum inter prediction mode, i.e., when the optimum prediction mode is the optimum intra prediction mode, the predicted image selection unit 48 notifies the intra prediction unit 46 about selection of the predicted images formed in the optimum intra prediction mode. Then, in step S37, the intra prediction unit 46 supplies intra prediction mode information to the lossless encoding unit 36, whereafter the process proceeds to step S38.

In step S38, the arithmetic unit 33 subtracts the predicted images, which have been supplied from the predicted image selection unit 48, from the input images, which have been supplied from the screen rearrangement buffer 32, to perform encoding. The arithmetic unit 33 outputs images obtained by subtraction to the orthogonal transform unit 34 as residual information.

In step S39, the orthogonal transform unit 34 performs orthogonal transform in units of TU for the residual information received from the arithmetic unit 33, and supplies orthogonal transform coefficients thus obtained to the quantization unit 35.

In step S40, the quantization unit 35 quantizes the orthogonal transform coefficients supplied from the orthogonal transform unit 34, and supplies the quantized orthogonal transform coefficients to the lossless encoding unit 36 and the inverse quantization unit 38.

In step S41 in FIG. 7, the inverse quantization unit 38 inversely quantizes the quantized coefficients supplied from the quantization unit 35, and supplies orthogonal transform coefficients thus obtained to the inverse orthogonal transform unit 39.

In step S42, the inverse orthogonal transform unit 39 performs inverse orthogonal transformation in units of TU for the orthogonal transform coefficients supplied from the inverse quantization unit 38, and supplies residual information thus obtained to the addition unit 40.

In step S43, the addition unit 40 adds the residual information supplied from the inverse orthogonal transform unit 39 to the predicted images supplied from the predicted image selection unit 48 to perform local decoding. The addition unit 40 supplies the locally decoded images to the deblocking filter 41 and the frame memory 44.

In step S44, the deblocking filter 41 performs deblocking filtering for the locally decoded images supplied from the addition unit 40. The deblocking filter 41 supplies images thus obtained to the adaptive offset filter 42.

In step S45, the adaptive offset filter 42 performs adaptive offset filtering in units of LCU for the images supplied from the deblocking filter 41. The adaptive offset filter 42 supplies images thus obtained to the frame memory 44. The adaptive offset filter 42 further supplies offset filter information in units of LCU to the lossless encoding unit 36.

In step S46, the frame memory 44 accumulates the images supplied from the adaptive offset filter 42, and the images supplied from the addition unit 40. Pixels adjacent to PUs contained in the images not filtered and accumulated in the frame memory 44 are supplied to the intra prediction unit 46 via the switch 45 as peripheral pixels. On the other hand, the images filtered and accumulated in the frame memory 44 are supplied to the external memory 12, and stored therein. Moreover, the frame memory 44 accumulates reference images supplied from the external memory 12 as encoded images. These reference images are output to the motion prediction/compensation unit 47 via the switch 45.

In step S47, the lossless encoding unit 36 performs lossless encoding for intra prediction mode information, or a set of information constituted by inter prediction mode, motion vector information, and information specifying reference images, and further for offset filter information to obtain encoding information.

In step S48, the lossless encoding unit 36 performs lossless encoding for the quantized orthogonal transform coefficients supplied from the quantization unit 35. Then, the lossless encoding unit 36 generates encoded data on the basis of the encoding information obtained by lossless encoding in step S47, and the orthogonal transform coefficients obtained by lossless encoding, and supplies the generated encoded data to the accumulation buffer 37.

In step S49, the accumulation buffer 37 temporality accumulates the encoded data supplied from the lossless encoding unit 36.

In step S50, the rate control unit 49 controls a rate of quantization performed by the quantization unit 35 on the basis of the encoded data accumulated in the accumulation buffer 37 such that no overflow or underflow is caused.

In step S51, the accumulation buffer 37 outputs the stored encoded data, whereafter the process ends.

Note that, according to the encoding process shown in FIGS. 6 and 7, it is assumed that the process of intra prediction and the process of motion prediction and compensation are always performed for simplifying the explanation. However, in practical situations, only either one of the processes may be performed depending on the picture type or other conditions.

Figure 8:
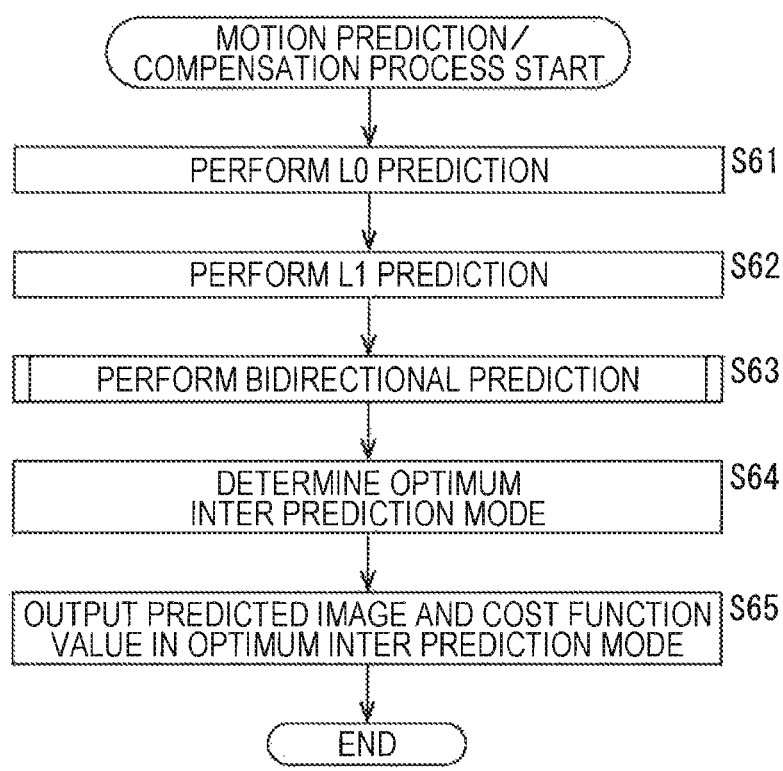
FIG. 8 is a flowchart showing details of a motion prediction/compensation process in FIG. 7.

FIG. 8 is a flowchart showing details of the process of motion prediction and compensation performed in step S33 in FIG. 7. This process of motion prediction and compensation is performed in units of PU.

In step S61 in FIG. 8, the L0 prediction unit 61 of the motion prediction/compensation unit 47 (FIG. 3) executes L0 prediction which performs motion prediction and compensation in candidate L0 prediction modes, and calculates cost function values. The L0 prediction unit 61 supplies predicted images and cost function values in the respective L0 prediction modes to the selection unit 64.

In step S62, the L1 prediction unit 62 executes L1 prediction which performs motion prediction and compensation in candidate L1 prediction modes, and calculates cost function values. The L1 prediction unit 62 supplies predicted images and cost function values in the respective L1 prediction modes to the selection unit 64.

In step S63, the bidirectional prediction unit 63 executes bidirectional prediction which performs motion prediction and compensation in candidate bidirectional prediction modes, and calculates cost function values. The process of bidirectional prediction are detailed below with reference to FIG. 9. The bidirectional prediction unit 63 supplies predicted images and cost function values in the respective bidirectional prediction modes to the selection unit 64.

In step S64, the selection unit 64 selects the inter prediction mode corresponding to the minimum cost function value in the cost function values supplied from the L0 prediction unit 61, the L1 prediction unit 62, and the bidirectional prediction unit 63, and determines the selected inter prediction mode as an optimum inter prediction mode.

In step S65, the selection unit 64 outputs predicted images in the optimum inter prediction mode, and the corresponding cost function value to the predicted image selection unit 48 illustrated in FIG. 2, whereafter the process ends.

Figure 9:
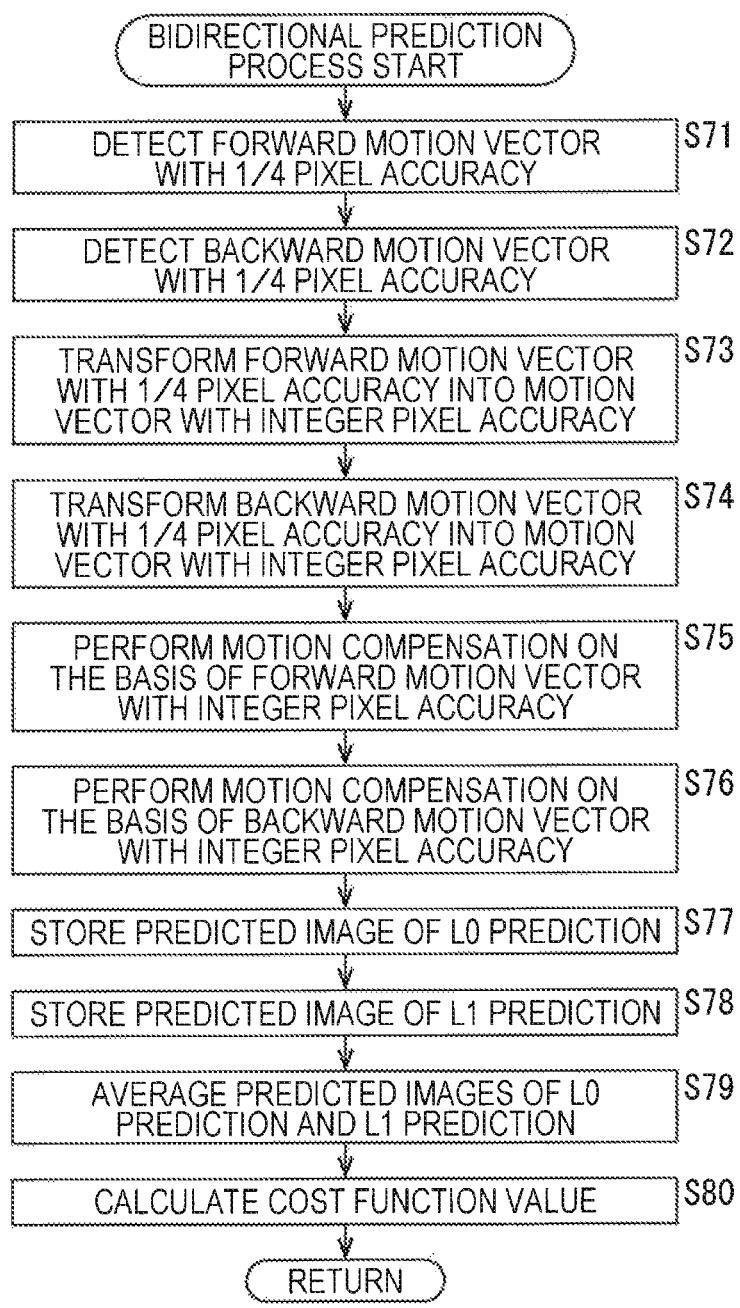
FIG. 9 is a flowchart showing details of a bidirectional prediction process in FIG. 8.

FIG. 9 is a flowchart showing details of the process of bidirectional prediction in step S63 shown in FIG. 8. The process of bidirectional prediction is performed for each candidate bidirectional prediction mode.

In step S71 in FIG. 9, the detection unit 81 of the bidirectional prediction unit 63 (FIG. 4) detects forward motion vectors with ¼ pixel accuracy, and supplies the detected motion vectors with ¼ pixel accuracy to the accuracy transform unit 82.

In step S72, the detection unit 85 detects backward motion vectors with ¼ pixel accuracy, and supplies the detected motion vectors with ¼ pixel accuracy to the accuracy transform unit 86.

In step S73, the accuracy transform unit 82 transforms the forward motion vectors with ¼ pixel accuracy supplied from the detection unit 81 into motion vectors with integer pixel accuracy, and supplies the transformed motion vectors to the intermediate predicted image formation unit 83.

In step S74, the accuracy transform unit 86 transforms the backward motion vectors with ¼ pixel accuracy supplied from the detection unit 85 into motion vectors with integer pixel accuracy, and supplies the transformed motion vectors to the intermediate predicted image formation unit 87.

In step S75, the intermediate predicted image formation unit 83 performs motion compensation for reference images located before the input images in the order of display on the basis of the forward motion vectors with integer pixel accuracy supplied from the accuracy transform unit 82 to execute L0 prediction. The intermediate predicted image formation unit 83 supplies predicted images of L0 prediction thus formed to the memory 84.

In step S76, the intermediate predicted image formation unit 87 performs motion compensation for reference images located after the input images in the order of display on the basis of the backward motion vectors with integer pixel accuracy supplied from the accuracy transform unit 86 to execute L1 prediction. The intermediate predicted image formation unit 87 supplies predicted images of L1 prediction thus formed to the memory 88.

In step S77, the memory 84 stores the predicted images of L0 prediction supplied from the intermediate predicted image formation unit 83. In step S78, the memory 88 stores the predicted images of L1 prediction supplied from the intermediate predicted image formation unit 87.

In step S79, the average unit 89 averages the predicted images of L0 prediction stored in the memory 84, and the predicted image of L1 prediction stored in the memory 88. The average unit 89 supplies the averaged predicted images to the calculation unit 90 as predicted images of bidirectional prediction.

In step S80, the calculation unit 90 calculates cost function values on the basis of the predicted images supplied from the average unit 89, and the input images. The calculation unit 90 supplies the predicted images and the cost function values to the selection unit 64 illustrated in FIG. 3. Thereafter, the process returns to step S63 in FIG. 8, and proceeds to step S64.

As described above, for bidirectional prediction, the encoding device 10 transforms motion vectors of input images with fractional pixel accuracy into motion vectors with integer pixel accuracy, and executes bidirectional prediction on the basis of the motion vectors with integer pixel accuracy to form predicted images. Therefore, in this case, both the bit number of predicted images of L0 prediction, and the bit number of predicted images of L1 prediction used for forming predicted images of bidirectional prediction decrease. Accordingly, the storage capacity necessary for the memory 84 and the memory 88 decreases. Moreover, the processing amount of bidirectional prediction decreases.

Second Embodiment (Configuration Example of Encoding Device in Second Embodiment)

Figure 10:
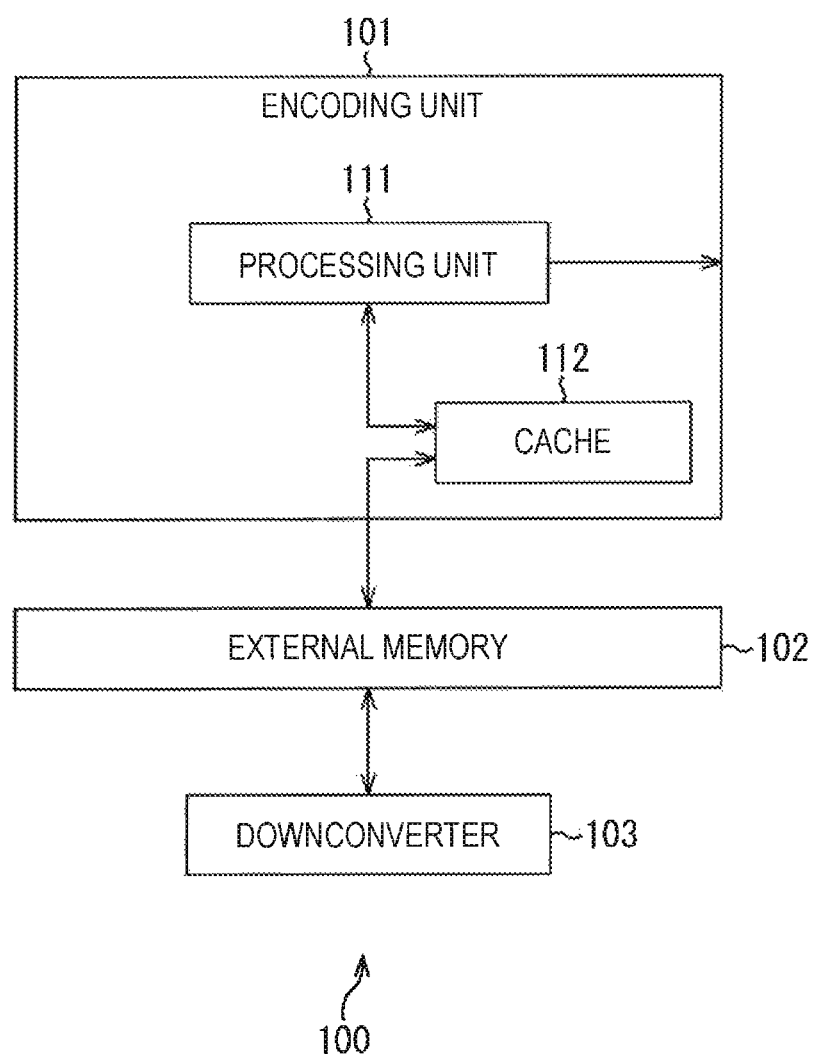
FIG. 10 is a block diagram illustrating a configuration example of an encoding device according to a second embodiment of the present disclosure.

FIG. 10 is a block diagram illustrating a configuration example of an encoding device according to a second embodiment of the present disclosure.

An encoding device 100 illustrated in FIG. 10 is constituted by an encoding unit 101, an external memory 102, and a downconverter 103. The encoding device 100 executes only either L0 prediction or L1 prediction as bidirectional prediction for encoding images stored in the external memory 102 by HEVC system.

More specifically, the encoding unit 101 of the encoding device 100 is constituted by a processing unit 111 and a cache 112. The processing unit 111 receives input images via the cache 112, as images corresponding to encoding targets and stored in the external memory 102. The processing unit 111 encodes the input images.

In this case, the processing unit 111 supplies intermediate results and final results of encoding to the cache 112 as necessary, and stores these results in the cache 112. The processing unit 111 further selects either L0 prediction or L1 prediction as prediction to be executed in bidirectional prediction modes on the basis of reference images stored in the cache 112, reduced to ¼ of the original size, and located before and after input images in the order of display (hereinafter referred to as reduced reference images), and input images reduced to ¼ of the original size (hereinafter referred to as reduced input images). Then, the processing unit 111 executes selected L0 prediction or L1 prediction by using encoded images stored in the cache 112 as reference images to perform prediction in bidirectional prediction modes.

The cache 112 temporality stores intermediate results of encoding and encoded images supplied from the processing unit 111. The cache 112 supplies the stored encoded images to the external memory 102 to store the encoded images therein. Moreover, the cache 112 temporarily stores encoded images supplied from the external memory 102 as reference images. The cache 112 temporarily stores reduced reference images, input images, and reduced input images supplied from the external memory 102.

The external memory 102 is constituted by a DRAM or the like. The external memory 102 stores input images, and encoded images supplied from the cache 112. The external memory 102 further stores reduced input images and reduced reference images supplied from the downconverter 103.

The external memory 102 supplies stored input images, and reduced input images corresponding to these input images to the cache 112. Moreover, the external memory 102 supplies encoded images located before or after the stored input images in the order of display to the cache 112 as reference images. The external memory 102 further supplies reduced reference images to the cache 112.

The downconverter 103 reads input images from the external memory 102, and reduces the input images to ¼ of the original size. Then, the downconverter 103 supplies the reduced input images thus obtained to the external memory 102.

The downconverter 103 further reads encoded images located before and after the input images in the order of display from the external memory 102 as reference images, and reduces the read reference images to ¼ of the original size. Then, the downconverter 103 supplies the reduced reference images thus obtained to the external memory 102.

Note that it is assumed herein that the reduction rates of the reference images and the input images are both set to ¼. However, the reduction rate of the reference images and the reduction rate of the input images are not limited to ¼, but may be other rates as long as both rates are set to an identical rate.

(Configuration Example of Encoding Unit)

Figure 11:
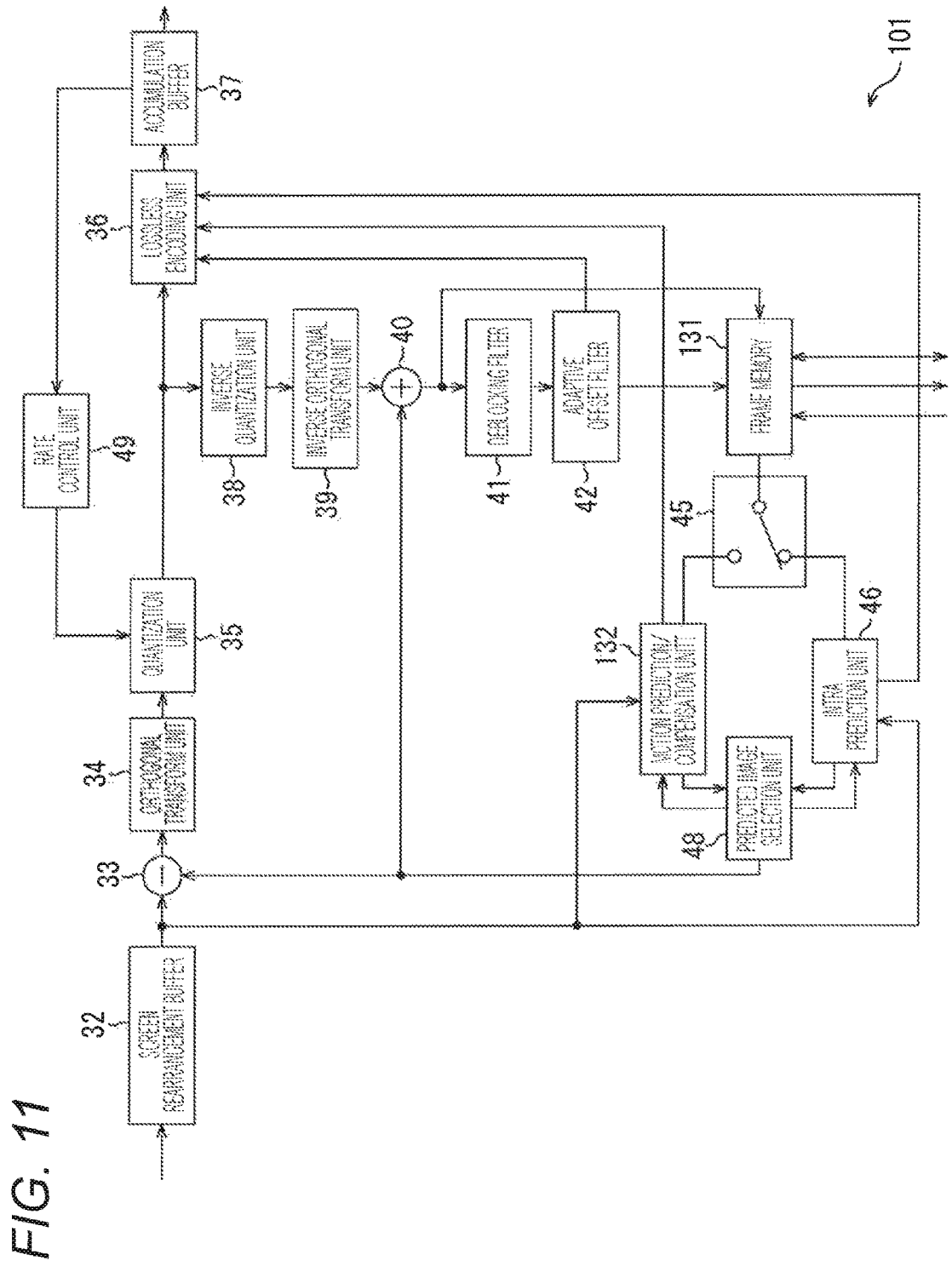
FIG. 11 is a block diagram illustrating a configuration example of an encoding unit illustrated in FIG. 10.

FIG. 11 is a block diagram illustrating a configuration example of the encoding unit 101 illustrated in FIG. 10.

Configurations illustrated in FIG. 11 similar to the corresponding configurations in FIG. 2 have been given similar reference numbers. The same explanation is not repeated hereinbelow.

The configuration of the encoding unit 101 illustrated in FIG. 11 is different from the configuration of the encoding unit 11 illustrated in FIG. 1 in that a frame memory 131 and a motion prediction/compensation unit 132 are provided in place of the frame memory 44 and the motion prediction/compensation unit 47, respectively.

The frame memory 131 accumulates images supplied from the adaptive offset filter 42, and images supplied from the addition unit 40. Pixels adjacent to PUs in the images not filtered and accumulated in the frame memory 131 are supplied to the intra prediction unit 46 via the switch 45 as peripheral pixels.

On the other hand, the images filtered and accumulated in the frame memory 131 are supplied to the external memory 102 illustrated in FIG. 10 as encoded images, and stored therein. The frame memory 131 further accumulates reference images, reduced reference images, and reduced input images supplied from the external memory 102. The reference images, the reduced reference images, and the reduced input images accumulated in the frame memory 131 are output to the motion prediction/compensation unit 132 via the switch 45.

The motion prediction/compensation unit 132 performs motion prediction and compensation in units of PU in all candidate inter prediction modes. More specifically, the motion prediction/compensation unit 132 determines the prediction direction in units of LCU group constituted by continuous five LCUs on the basis of the reduced reference images and the reduced input images supplied from the frame memory 131 via the switch 45 when the candidate inter prediction mode is a bidirectional prediction mode.

Then, the motion prediction/compensation unit 132 detects motion vectors with ¼ pixel accuracy on the basis of input images supplied from the screen rearrangement buffer 32, and the reference images in the determined prediction direction supplied from the frame memory 131 via the switch 45.

On the other hand, the motion prediction/compensation unit 132 detects motion vectors with ¼ pixel accuracy on the basis of the input images, and the reference images located before or after the input images in the order of display, when the candidate inter prediction mode is an L0 prediction mode or an L1 prediction mode.

The motion prediction/compensation unit 132 performs compensation for the reference images by using linear interpolation on the basis of the detected motion vectors with ¼ pixel accuracy for each inter prediction mode to form predicted images. Then, the motion prediction/compensation unit 132 calculates a cost function value on the basis of the input images and the predicted images for each inter prediction mode, and determines the inter prediction mode having the minimum cost function value as an optimum inter prediction mode. The motion prediction/compensation unit 132 supplies the cost function value in the optimum inter prediction mode, and the corresponding predicted images to the predicted image selection unit 48.

The motion prediction/compensation unit 132 further outputs inter prediction mode information, corresponding motion vector information, information specifying reference images, and others to the lossless encoding unit 36 when notified by the predicted image selection unit 48 about selection of the predicted images formed in the optimum inter prediction mode.

Note that, according to the second embodiment, the unit for determining the prediction direction for bidirectional prediction is the LCU group constituted by continuous five LCUs. However, the number of continuous LCUs contained in each unit may be other numbers of continuous LCUs.

(Configuration Example of Motion Prediction/Compensation Unit)

Figure 12:
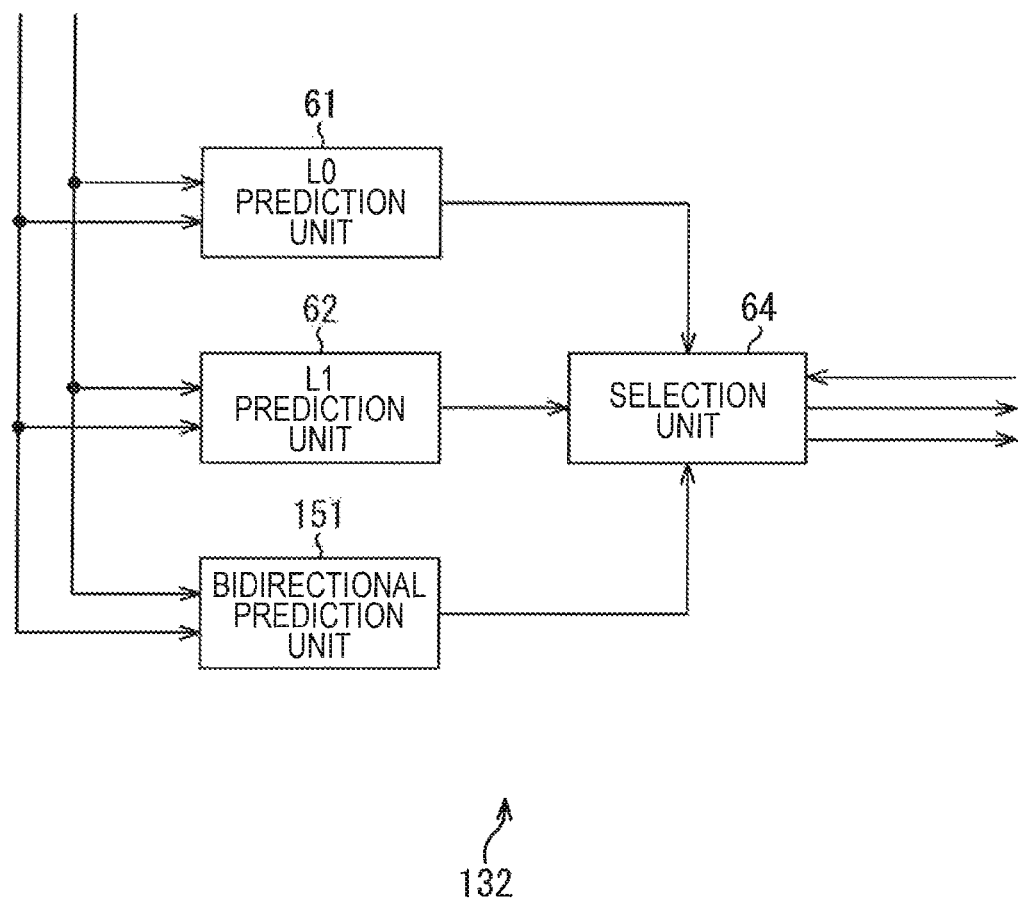
FIG. 12 is a block diagram illustrating a configuration example of a motion prediction/compensation unit illustrated in FIG. 11.

FIG. 12 is a block diagram illustrating a configuration example of the motion prediction/compensation unit 132 illustrated in FIG. 11.

Configurations illustrated in FIG. 12 similar to the corresponding configurations in FIG. 3 have been given similar reference numbers. The same explanation is not repeated hereinbelow.

The configuration of the motion prediction/compensation unit 132 illustrated in FIG. 12 is different from the configuration of the motion prediction/compensation unit 47 illustrated in FIG. 3 in that a bidirectional prediction unit 151 is provided in place of the bidirectional prediction unit 63.

The bidirectional prediction unit 151 performs motion prediction and compensation which limits the prediction direction indicated by a bidirectional prediction mode to only either the forward direction or the backward direction as motion prediction and compensation in the corresponding bidirectional prediction mode when bidirectional prediction is not performed for input images. More specifically, the bidirectional prediction unit 151 determines either the forward direction or the backward direction as the prediction direction in units of LCU group on the basis of reduced reference images and reduced input images supplied from the frame memory 131 illustrated in FIG. 11 via the switch 45. The bidirectional prediction unit 151 (direction limitation prediction unit) limits the prediction direction in this manner to either the forward direction or the backward prediction.

Then, the bidirectional prediction unit 151 detects motion vectors with ¼ pixel accuracy on the basis of input images supplied from the screen rearrangement buffer 32, and reference images in the determined prediction direction supplied from the frame memory 131 via the switch 45. The bidirectional prediction unit 151 performs compensation for the reference images in the determined prediction direction by using linear interpolation on the basis of the detected motion vectors with ¼ pixel accuracy for each bidirectional prediction mode.

The bidirectional prediction unit 151 calculates cost function values on the basis of predicted images thus formed, and the input images. The bidirectional prediction unit 151 supplies the predicted images and the cost function values in the respective bidirectional prediction modes to the selection unit 64.

(Configuration Example of Bidirectional Prediction Unit)

Figure 13:
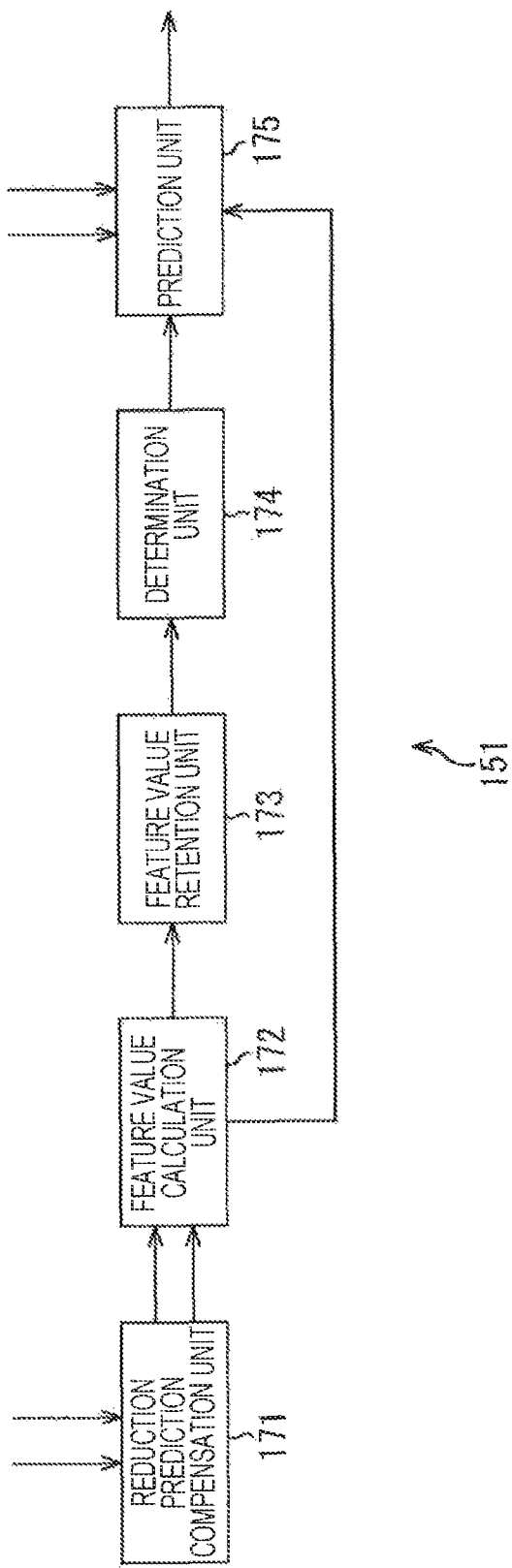
FIG. 13 is a block diagram illustrating a configuration example of a bidirectional prediction unit illustrated in FIG. 12.

FIG. 13 is a block diagram illustrating a configuration example of the bidirectional prediction unit 151 illustrated in FIG. 12.

The bidirectional prediction unit 151 illustrated in FIG. 13 is constituted by a reduction prediction compensation unit 171, a feature value calculation unit 172, a feature value retention unit 173, a determination unit 174, and a prediction unit 175.

The reduction prediction compensation unit 171 of the bidirectional prediction unit 151 receives reduced input images, and reduced reference images located before and after the input images in the order of display, in units of LUC group via the switch 45 illustrated in FIG. 11. The reduction prediction compensation unit 171 performs bidirectional motion prediction and compensation for each LCU group by using the reduced reference images and the reduced input images.

More specifically, the reduction prediction compensation unit 171 includes a two-dimensional linear interpolation adaptive filter. The reduction prediction compensation unit 171 detects motion vectors with ¼ pixel accuracy in the respective prediction directions for each LCU group by using the reduced input images and the reduced reference images. The reduction prediction compensation unit 171 performs motion compensation for the reduced reference images on the basis of the motion vectors with ¼ pixel accuracy in the respective prediction directions thus obtained to execute bidirectional prediction for the reduced input images.

The reduction prediction compensation unit 171 calculates cost function values of reduced predicted images in the respective prediction directions obtained by bidirectional prediction on the basis of the reduced predicted images and the reduced input images. The reduction prediction compensation unit 171 supplies the motion vectors of the reduced input images and the cost function values of the reduced predicted images in the respective prediction directions to the feature value calculation unit 172.

The feature value calculation unit 172 calculates feature values for each prediction direction by using following Mathematical Formula (3) on the basis of the motion vectors of the reduced input images and the cost function values of the reduced predicted images supplied from the reduction prediction compensation unit 171.

[Mathematical Formula 3]

$$\text{Cost}m = \text{Sum}(SAD) + \lambda * \text{Sum}(MV) \qquad (3)$$

In Mathematical Formula (3), Costm is a feature value, while SAD is a cost function value of a reduced input image. Moreover, λ is a coefficient determined beforehand, while MV is a motion vector of a reduced input image.

According to Mathematical Formula (3), the feature value decreases as the cost function value decreases, i.e., as the prediction accuracy increases. Moreover, the feature value decreases as the motion vector decreases, i.e., the amount of motion vector information contained in encoded data decreases. Accordingly, encoding efficiency increases as the feature value decreases.

The feature value calculation unit 172 supplies the calculated forward and backward feature values of the respective LCU groups to the feature value retention unit 173, and supplies the forward and backward motion vectors to the prediction unit 175. The feature value retention unit 173 retains the forward and backward feature values of the respective LCU groups supplied from the feature value calculation unit 172.

The determination unit 174 reads the forward and backward feature values from the feature value retention unit 173 for each LCU group. The determination unit 174 determines the prediction direction of prediction executed instead of bidirectional prediction on the basis of the read forward and backward feature values.

More specifically, the determination unit 174 selects the prediction direction corresponding to the smaller feature value from the directions corresponding to the forward and backward feature values, and determines the selected direction as the prediction direction of prediction executed instead of bidirectional prediction. In other words, the determination unit 174 selects prediction exhibiting higher encoding efficiency from L0 prediction and L1 prediction, and determines the selected prediction as prediction executed instead of bidirectional prediction. The determination unit 174 supplies the prediction directions of the respective LCU groups to the prediction unit 175.

The prediction unit 175 performs motion prediction and compensation while changing the prediction direction indicated by the bidirectional prediction mode to the prediction direction supplied from the prediction unit 175 for each candidate bidirectional prediction mode. More specifically, the prediction unit 175 includes a two-dimensional linear interpolation adaptive filter. The prediction unit 175 detects motion vectors with ¼ pixel accuracy by using input images supplied via the switch 45 illustrated in FIG. 11, and reference images in the prediction direction supplied from the determination unit 174. In this case, the prediction unit 175 selects motion vectors in the prediction direction supplied from the prediction unit 175 from the forward motion vectors and backward motion vectors supplied from the feature value calculation unit 172, and uses the selected motion vectors.

The prediction unit 175 performs motion compensation for the reference images on the basis of the motion vectors with ¼ pixel accuracy detected by detection of motion vectors with ¼ pixel accuracy to execute prediction in the prediction direction supplied from the determination unit 174.

The prediction unit 175 calculates cost function values on the basis of predicted images obtained by prediction, and the input images for each bidirectional prediction mode. The prediction unit 175 supplies the predicted images in the respective bidirectional prediction modes and the corresponding cost function values to the selection unit 64 illustrated in FIG. 12.

Note that, according to the example illustrated in FIG. 13, the feature value calculation unit 172 is provided on the upstream side of the feature value retention unit 173. However, the feature value calculation unit 172 may be provided on the downstream side. In this case, the feature value retention unit 173 retains motion vectors and cost function values of the respective LCU groups. The feature value calculation unit 172 calculates feature values of the respective LCU groups on the basis of the motion vectors and the cost function values retained in the feature value retention unit 173, and supplies the calculated feature values to the determination unit 174.

(Description of Bidirectional Prediction Mode)

Figure 14:
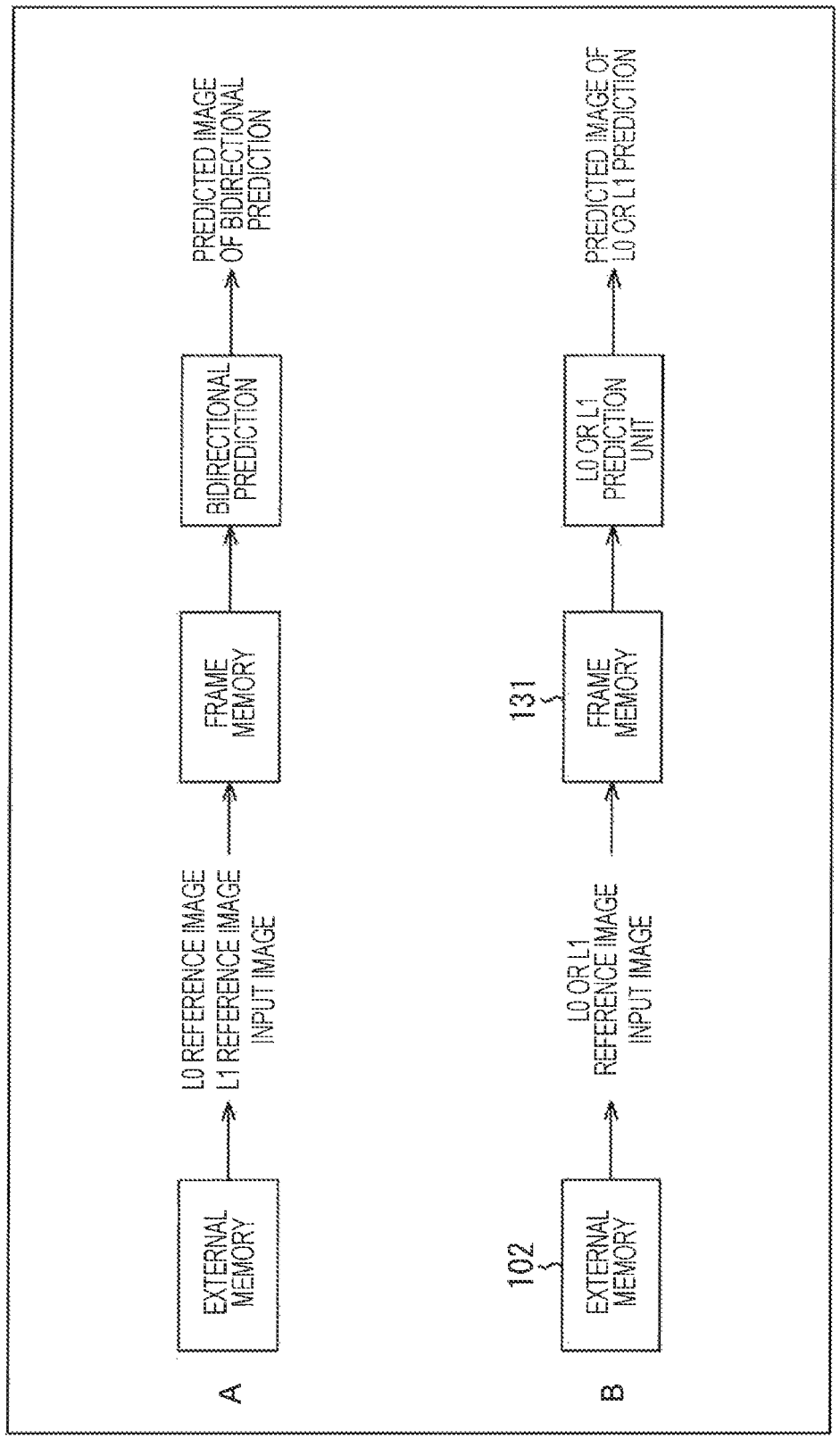
FIG. 14 is a view illustrating prediction in a bidirectional prediction mode executed by the encoding device illustrated in FIG. 10.

FIG. 14 is a view illustrating prediction in a bidirectional prediction mode according to the encoding device 100 illustrated in FIG. 10.

As illustrated in A in FIG. 14, forward reference images (L0 reference images), backward reference images (L1 reference images), and input images are read from an external memory, and stored in a frame memory constituting a cache when bidirectional prediction is executed as prediction in a bidirectional prediction mode. Then, bidirectional prediction is executed by using the forward reference images, the backward reference images, and the input images stored in the frame memory to form predicted images of bidirectional prediction.

According to the encoding device 100, however, reference images in a prediction direction determined by the determination unit 174 (L0 or L1 reference images), and input images are read from the external memory 102, and stored in the frame memory 131 as illustrated in B in FIG. 14. Then, L0 prediction or L1 prediction is executed by using the reference images and the input images stored in the frame memory 131 to form predicted images of L0 prediction or L1 prediction.

According to the encoding device 100, therefore, only either forward reference images or backward reference image are read from the external memory 102, and stored in the frame memory 131. Accordingly, a band required for reading between the external memory 102 and the cache 112 during prediction in a bidirectional prediction mode becomes the half of the corresponding band required for executing bidirectional prediction in a bidirectional prediction mode.

(Description of Prediction Direction in Bidirectional Prediction Mode)

Figure 15:
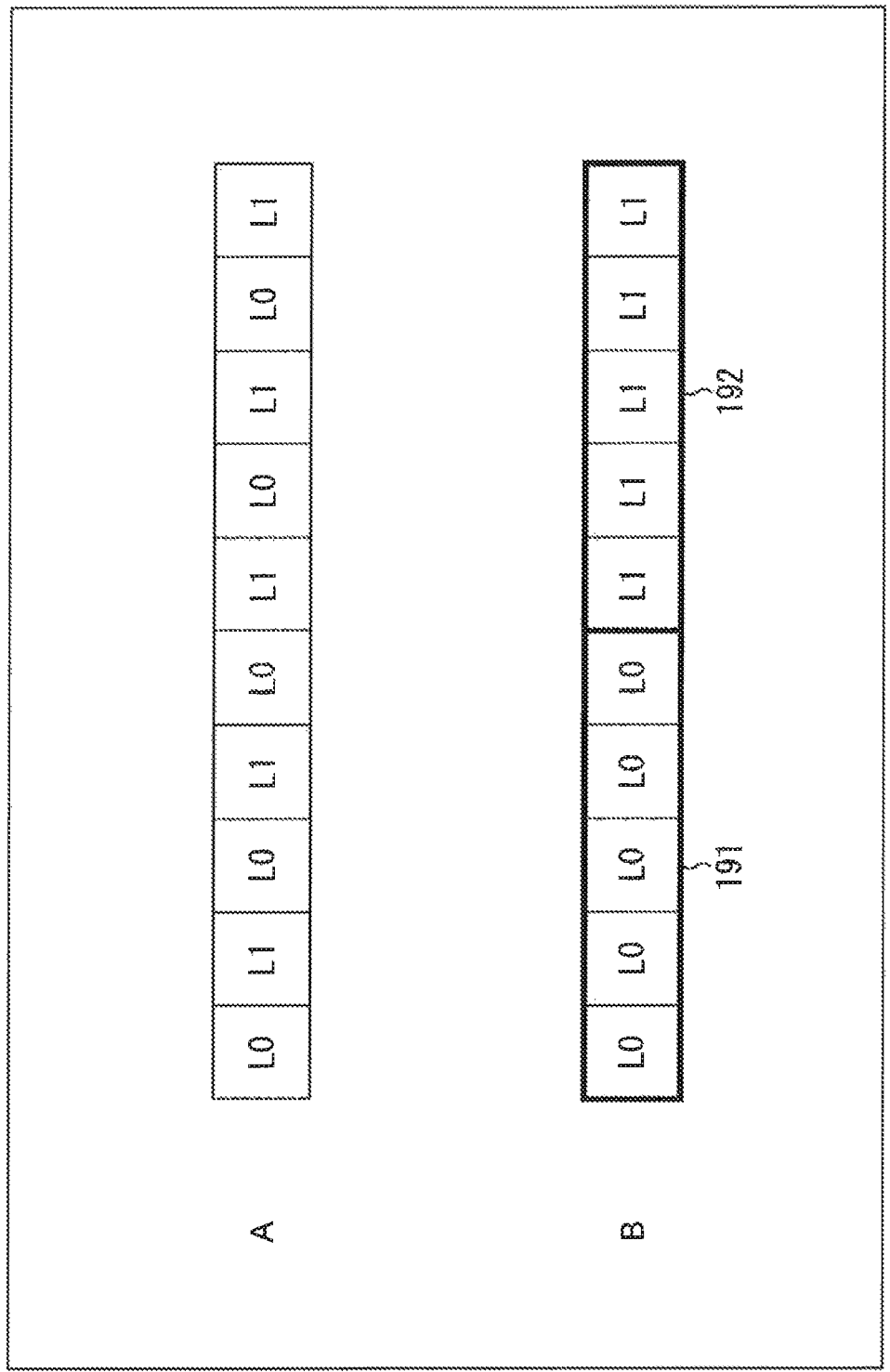
FIG. 15 is a view illustrating a prediction direction determined by a determination unit illustrated in FIG. 13.

FIG. 15 is a view illustrating a prediction direction determined by the determination unit 174 illustrated in FIG. 13.

Note that, in FIG. 15, each square indicates an LCU. Moreover, in the figure, "L0" or "L1" shown within each square indicates that prediction in a bidirectional prediction mode of the LCU specified in the corresponding square is L0 prediction or L1 prediction, respectively.

When prediction directions of bidirectional modes is determined in units of LCU, the prediction directions of the bidirectional prediction modes differ from each other for each LCU as illustrated in A in FIG. 15. Accordingly, when prediction directions of bidirectional prediction modes differ from each other for adjoining LCUs as illustrated in A in FIG. 15, the encoding unit 101 is required to read reference images in the corresponding prediction directions from the external memory 102 in units of LCU.

On the other hand, the determination unit 174 determines prediction directions of bidirectional prediction modes for each LCU group, wherefore prediction directions of bidirectional prediction modes for respective LCUs differ for each LCU group. According to the example illustrated in B in FIG. 15, prediction directions of bidirectional prediction modes for an LCU group 191 and an LCU group 192 adjacent to the LCU group 191 differ from each other. In this case, the encoding unit 101 reads reference images of the prediction directions of the bidirectional prediction modes of the corresponding LCU groups from the external memory 102 only in units of LCU group.

Accordingly, the access frequency from the encoding unit 101 to the external memory 102 decreases in comparison with the access frequency required when prediction directions of bidirectional prediction modes are determined in units of LCU.

(Description of Processing by Encoding Device)

An encoding process performed by the encoding device 100 illustrated in FIG. 10 is similar to the encoding process illustrated in FIGS. 6 and 7 except in the point of bidirectional prediction in step S63 illustrated in FIG. 8, and in that reduced reference images and reduced input images are accumulated in the frame memory 44. Accordingly, only bidirectional prediction is hereinafter described.

Figure 16:
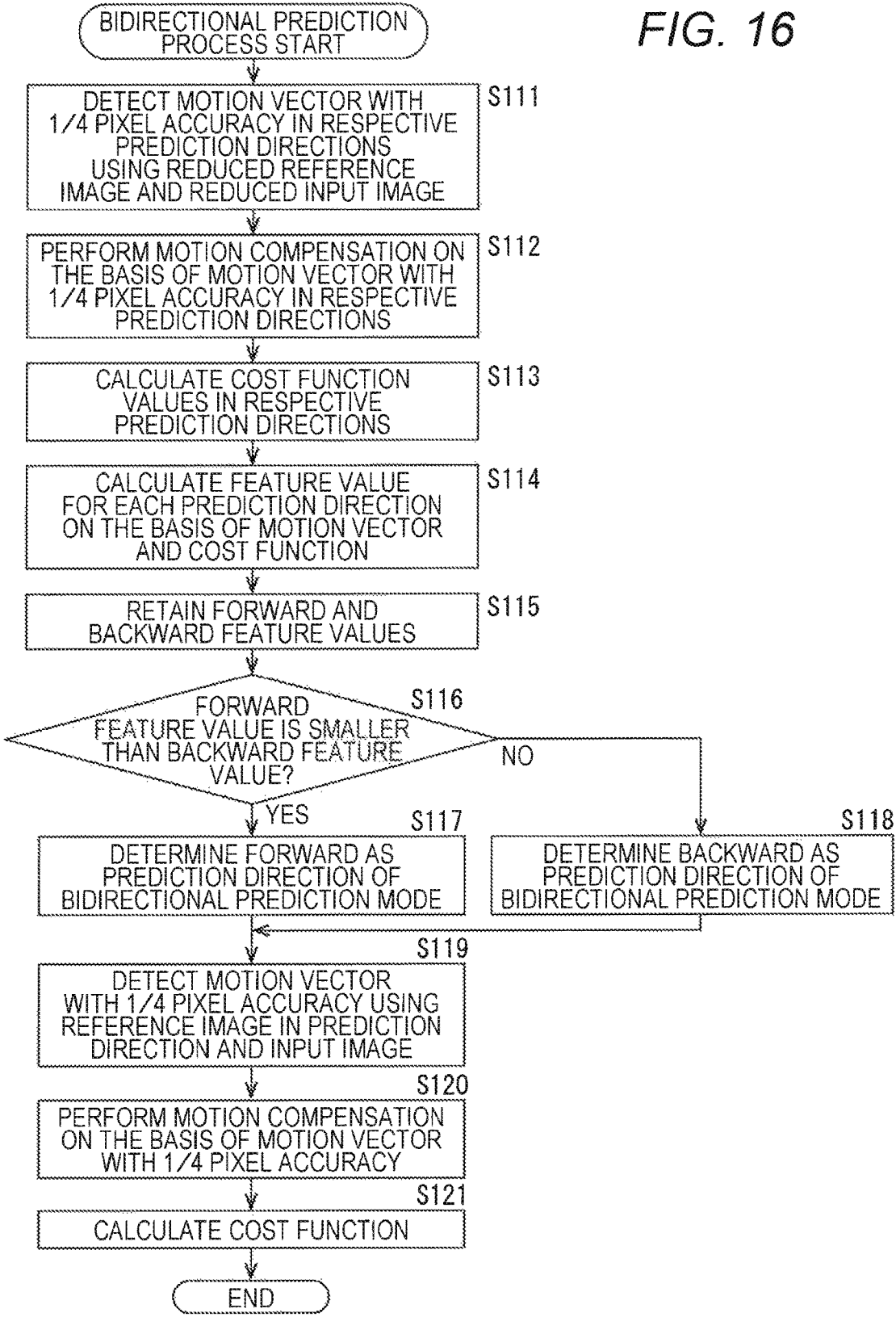
FIG. 16 is a flowchart showing a bidirectional prediction process performed by the encoding device.

FIG. 16 is a flowchart showing bidirectional prediction executed by the encoding device 100. The process of bidirectional prediction is performed for each candidate bidirectional prediction mode.

Processing in steps S111 through S118 shown in FIG. 16 is performed in units of LCU group. In step S111, the reduction prediction compensation unit 171 (FIG. 13) of the bidirectional prediction unit 151 detects motion vectors with ¼ pixel accuracy in respective prediction directions by using reduced reference images and reduced input images supplied via the switch 45 illustrated in FIG. 11.

In step S112, the reduction prediction compensation unit 171 performs motion compensation for the reduced reference images on the basis of the motion vectors with ¼ pixel accuracy in the respective prediction directions obtained in step S111 to execute bidirectional prediction for the reduced input images.

In step S113, the reduction prediction compensation unit 171 calculates cost function values of reduced predicted images in the respective prediction directions obtained by bidirectional prediction on the basis of the reduced predicted images and the reduced input images. The reduction prediction compensation unit 171 supplies the motion vectors of the reduced input images and the cost function values of the reduced predicted images in the respective prediction directions to the feature value calculation unit 172.

In step S114, the feature value calculation unit 172 calculates a feature value by using Mathematical Formula (3) discussed above for each prediction direction on the basis of the motion vectors and the cost function values supplied from the reduction prediction compensation unit 171. The feature value calculation unit 172 supplies calculated forward and backward feature values to the feature value retention unit 173, and supplies forward and backward motion vectors to the prediction unit 175.

In step S115, the feature value retention unit 173 retains the forward and backward feature values supplied from the feature value calculation unit 172.

In step S116, the determination unit 174 determines whether or not the forward feature value stored in the feature value retention unit 173 is smaller than the backward feature value. When it is determined in step S116 that the forward feature value is smaller than the backward feature value, the determination unit 174 determines the forward direction as the prediction direction of the bidirectional prediction mode, and supplies the determined direction to the prediction unit 175.

On the other hand, when it is determined in step S116 that the forward feature value is not smaller than the backward feature value, the determination unit 174 determines the backward direction as the prediction direction of the bidirectional prediction mode, and supplies the determined direction to the prediction unit 175.

After processing in step S117 or S118, the process proceeds to step S119. Processing in steps S119 through S121 is performed in units of PU.

In step S119, the prediction unit 175 detects motion vectors with ¼ pixel accuracy by using the reference images in the prediction direction supplied from the determination unit 174 and corresponding to a PU of a processing target, and the input images supplied via the switch 45.

In step S120, the prediction unit 175 performs motion compensation for the reference images on the basis of the motion vectors with ¼ pixel accuracy obtained in step S119 to execute prediction in the prediction direction supplied from the determination unit 174.

In step S121, the prediction unit 175 calculates cost function values on the basis of predicted images obtained by prediction, and the input images. The prediction unit 175 supplies the predicted images and the cost function values to the selection unit 64 illustrated in FIG. 12, whereafter the process ends.

As described above, the encoding device 100 executes L0 prediction or L1 prediction instead of bidirectional prediction. Accordingly, the band required for reading of reference images between the encoding unit 101 and the external memory 102 decreases. Moreover, the storage capacity of the frame memory 131 necessary for storage of reference images in a bidirectional prediction mode decreases. Furthermore, only either L0 prediction or L1 prediction is executed in a bidirectional prediction mode, wherefore the processing amount required in a bidirectional prediction mode decreases.

Moreover, the encoding device 100 determines the prediction direction of prediction executed in place of bidirectional prediction in units of a plurality of LCUs. Accordingly, the access frequency from the encoding unit 101 to the external memory 102 decreases.

Note that Feature values may be determined by using only either cost functions or motion vectors.

Third Embodiment (Configuration Example of Encoding Unit of Encoding Device in Third Embodiment)

A configuration of an encoding device according to a third embodiment of the present disclosure is similar to the configuration of the encoding device 100 illustrated in FIG. 10 except for an encoding unit. Accordingly, only the encoding unit in this embodiment is hereinafter described.

Figure 17:
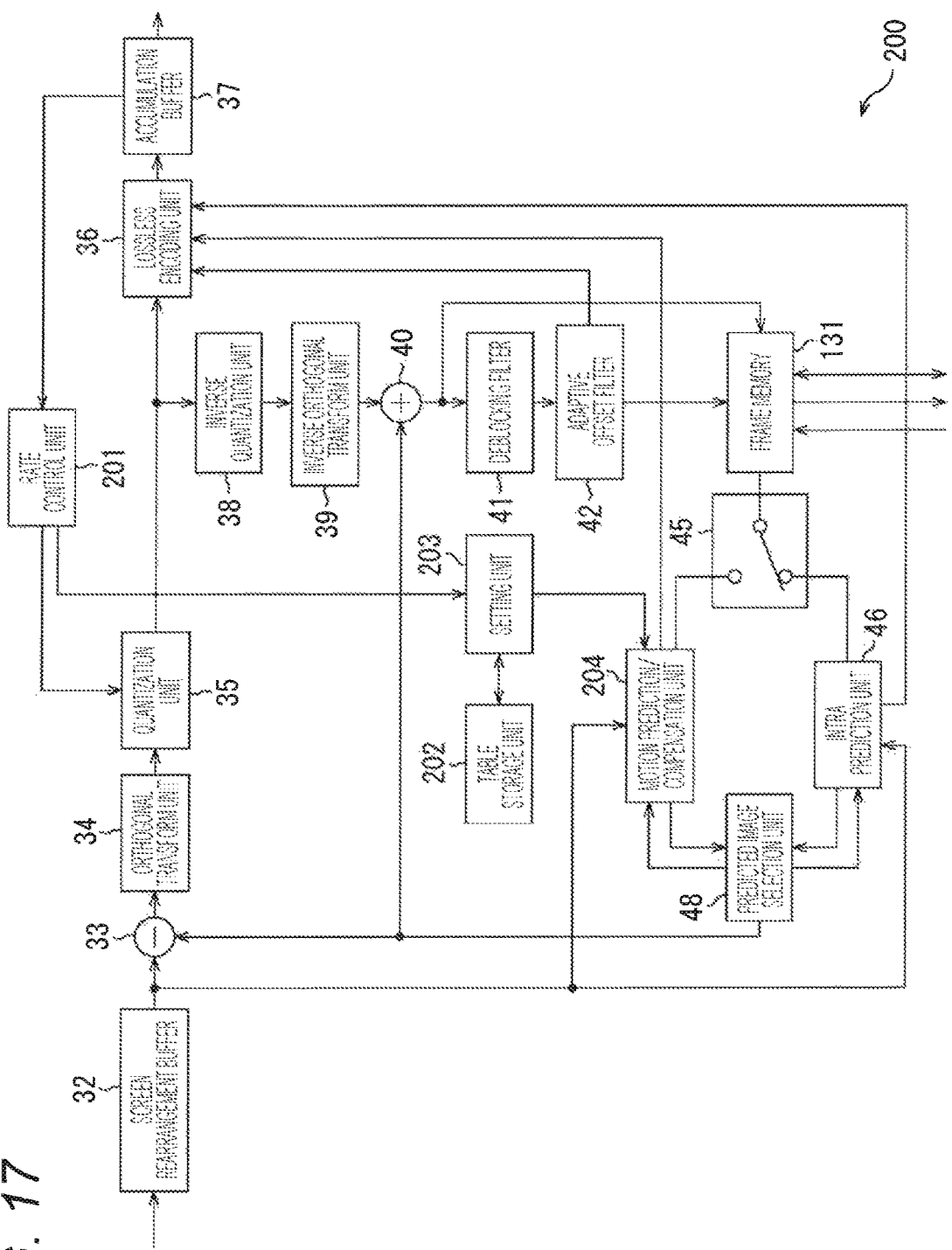
FIG. 17 is a block diagram illustrating a configuration example of an encoding unit of an encoding device according to a third embodiment of the present disclosure.

FIG. 17 is a block diagram illustrating a configuration example of the encoding unit of the encoding device according to the third embodiment of the present disclosure.

Configurations illustrated in FIG. 17 similar to the corresponding configurations illustrated in FIG. 11 have been given similar reference numbers. The same explanation is not repeated hereinbelow.

The configuration of an encoding unit 200 illustrated in FIG. 17 is different from the configuration of the encoding unit 101 illustrated in FIG. 11 in that a rate control unit 201 and a motion prediction/compensation unit 204 are provided in place of the rate control unit 49, the motion prediction/compensation unit 132, and that a table storage unit 202, and a setting unit 203 are added. The encoding unit 200 limits motion vector accuracy and prediction directions in accordance with quantization parameters (QP).

More specifically, the rate control unit 201 of the encoding unit 200 controls a rate of quantization performed by the quantization unit 35 on the basis of encoded data accumulated in the accumulation buffer 37 such that no overflow or underflow is caused. The rate control unit 201 further supplies the quantization parameters used for control of the rate of quantization to the setting unit 203.

The table storage unit 202 stores a limitation table which registers motion vector limitation information and prediction direction limitation information in correspondence with the quantization parameters. The motion vector limitation information is information indicating whether or not motion vector accuracy for bidirectional prediction is limited to integer accuracy. The prediction direction limitation information is information indicating whether or not a prediction direction in a bidirectional prediction mode is limited to the forward direction or backward direction. Note that, when the prediction direction limitation information indicates that a prediction direction is limited to either one of the directions, bidirectional prediction is not executed. In this case, the motion vector limitation information is not registered.

The setting unit 203 averages the quantization parameters supplied from the rate control unit 201 in units of screen, and calculates an average value of the quantization parameters. On the basis of the average value of the quantization parameters thus calculated, the setting unit 203 requests the table storage unit 202 to read the motion vector limitation information and the prediction direction limitation information from the limitation table registering these information in correspondence with the average value.

The setting unit 203 sets motion vector accuracy used for forming predicted images of bidirectional direction to either integer pixel accuracy or fractional pixel accuracy on the basis of the motion vector limitation information read from the table storage unit 202 in response to the request. Moreover, the setting unit 203 (determination unit) determines whether to execute bidirectional prediction on the basis of the prediction direction limitation information read from the table storage unit 202 in response to the request.

The setting unit 203 supplies the set motion vector accuracy, and the bidirectional prediction information indicating whether to execute bidirectional prediction to the motion prediction/compensation unit 204.

The motion prediction/compensation unit 204 performs motion prediction and compensation in a manner similar to motion prediction and compensation performed by the motion prediction/compensation unit 132 illustrated in FIG. 11 (hereinafter referred to as direction limitation process)

when the bidirectional prediction information indicates inexecution of bidirectional prediction.

Moreover, the motion prediction/compensation unit 204 performs motion prediction/compensation in a manner similar to motion prediction and compensation performed by the motion prediction/compensation unit 47 illustrated in FIG. 2 (hereinafter referred to as accuracy limitation process) when the bidirectional prediction information indicates execution of bidirectional prediction with integer pixel accuracy indicated by the set motion vector accuracy.

Furthermore, the motion prediction/compensation unit 204 performs normal prediction and compensation (hereinafter referred to as normal process) when the bidirectional prediction information indicates execution of bidirectional prediction with fractional pixel accuracy indicated by the set motion vector accuracy. In the normal process, motion vectors with fractional pixel accuracy are detected by motion prediction and compensation in a bidirectional prediction mode similarly to the motion prediction/compensation unit 132. In this case, bidirectional prediction is executed similarly to the motion prediction/compensation unit 47.

The motion prediction/compensation unit 204 calculates cost function values for all candidate inter prediction modes on the basis of input images, and predicted images formed by the direction limitation process, the accuracy limitation process, or the normal process. Then, the motion prediction/compensation unit 204 determines the inter prediction mode having the minimum cost function value as an optimum inter prediction mode. The motion prediction/compensation unit 204 supplies the cost function value in the optimum inter prediction mode, and the corresponding predicted images to the predicted image selection unit 48.

The motion prediction/compensation unit 204 further outputs inter prediction mode information, corresponding motion vector information, information specifying reference images, and others to the lossless encoding unit 36 when notified by the predicted image selection unit 48 about selection of predicted images formed in the optimum inter prediction mode.

(Example of Limitation Table)

FIG. 18 is a view illustrating an example of the limitation table stored in the table storage unit 202 illustrated in FIG. 17.

When a quantization parameter is low, i.e., when a bit rare of encoded data is high, an encoding performance difference becomes inconspicuous. Moreover, in this case, lowering of encoding efficiency caused by limitation of a prediction direction in a bidirectional prediction mode, and limitation of motion vector accuracy for bidirectional prediction does not cause a problem. Accordingly, it is preferable in this situation to reduce the storage capacity of the cache 112 by limiting the prediction direction in the bidirectional prediction mode and the motion vector accuracy for bidirectional prediction.

On the other hand, when a quantization parameter is high, i.e., a bit rate of encoded data is low, an encoding performance difference becomes conspicuous. In this case, lowering of encoding efficiency causes a problem. Accordingly, it is preferable in this situation to improve encoding performance and encoding efficiency without limiting the prediction direction in the bidirectional prediction mode and the accuracy of the motion vectors for bidirectional prediction.

According to the limitation table illustrated in FIG. 18, therefore, quantization parameters (QP) are divided into three levels of 0 to 29, 30 to 39, and 40 to 51. In this case, prediction direction limitation information indicating the presence of limitations is registered in correspondence with the lowest level (0 to 29) of the quantization parameters. Moreover, prediction direction limitation information indicating the absence of limitations, and motion vector limitation information indicating the presence of limitations are registered in correspondence with the second lowest level (30 to 39) of the quantization parameters. Furthermore, prediction direction limitation information and motion vector limitation information both indicating the absence of limitations are registered in correspondence with the highest level (40 to 51) of the quantization parameters.

Note that the levels of the quantization parameters illustrated in FIG. 18 are set on the basis of quantization parameters assumed for each use purpose such that the levels of quantization parameters applied to the respective use purpose (applications) differ for each use purpose.

More specifically, when the encoding unit 200 is incorporated in a video camera or like devices, encoded data on captured images are stored in a storage. In this case, the bit rate required for encoded data on high definition (HD) images corresponding to captured images is a high bit rate such as 50 Mbps. Quantization parameters therefore often become 30 or lower. Accordingly, the lowest level of the quantization parameters is determined in the range from 0 to 29.

Moreover, when encoded data on captured images are transmitted via a network, the bit rate required for encoded data on HD images corresponding to captured images is a low bit rate such as 5 Mbps. Further, in this case, quantization parameters often lie in a range from 30 to 39. Accordingly, the second lowest level of the quantization parameters is determined in the range from 30 to 39.

Furthermore, when the encoding unit 200 is incorporated in a monitoring camera or like devices, captured images corresponding to encoding targets are images captured by the monitoring camera. In this case, the bit rate required for encoded data on HD images is an ultra-low bit rate such as 2 Mbps. Quantization parameters therefore often become 40 or higher. Accordingly, the highest level of the quantization parameters is determined in the range from 40 to 51. The levels of the quantization parameters are not limited to the example illustrated in FIG. 18.

(Description of Processing by Encoding Device)

An encoding process performed by the encoding device according to the third embodiment of the present disclosure is similar to the encoding process illustrated in FIGS. 6 and 7 except for the point of motion prediction and compensation in step S33 in FIG. 6, and the point that reduced reference images and reduced input images are accumulated in the frame memory 131 as necessary. Accordingly, only motion prediction and compensation are hereinafter described.

Figure 19:
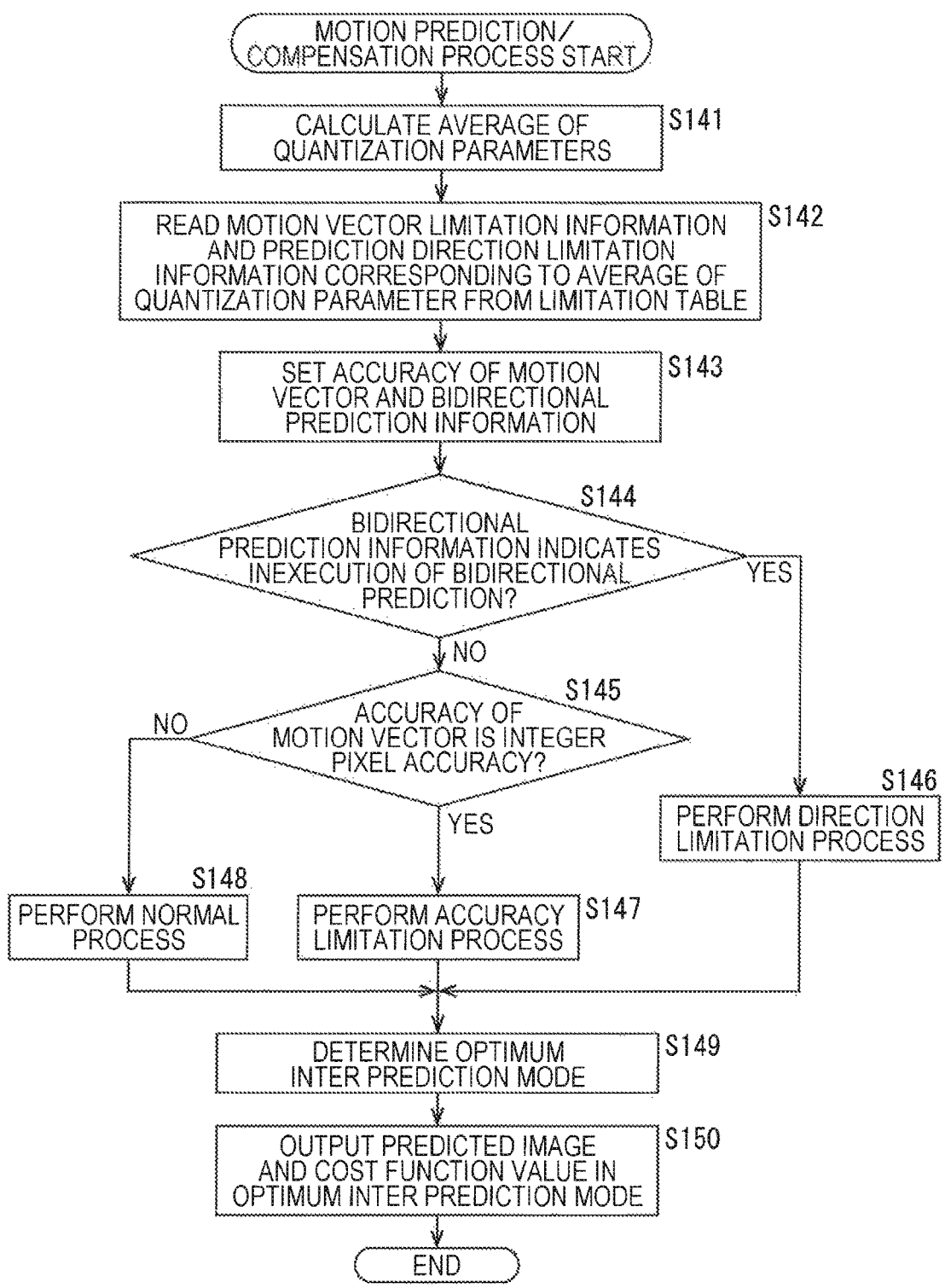
FIG. 19 is a flowchart showing a motion prediction/compensation process performed by an encoding unit illustrated in FIG. 17.

FIG. 19 is a flowchart showing motion prediction and compensation performed by the encoding unit 200 illustrated in FIG. 17.

In step S141 in FIG. 19, the setting unit 203 averages quantization parameters supplied from the rate control unit 201 in units of screen, and calculates an average value of the quantization parameters. In step S142, the setting unit 203 reads motion vector limitation information and prediction direction limitation information corresponding to the average value of the quantization parameters from the limitation table stored in the table storage unit 202.

In step S143, the setting unit 203 sets motion vector accuracy and bidirectional prediction information for bidirectional prediction on the basis of the read motion vector limitation information and prediction direction limitation information. The setting unit 203 supplies the set motion vector accuracy and bidirectional prediction information to the motion prediction/compensation unit 204.

In step S144, the motion prediction/compensation unit 204 determines whether or not the bidirectional prediction information indicates inexecution of bidirectional prediction. When it is determined in step S144 that the bidirectional prediction information indicates inexecution of bidirectional prediction, the process proceeds to step S146. In step S146, the motion prediction/compensation unit 204 performs the direction limitation process, whereafter the process proceeds to step S149.

When it is determined in step S144 that the bidirectional prediction information indicates execution of bidirectional prediction, the process proceeds to step S145. In step S145, the motion prediction/compensation unit 204 determines whether or not the set motion vector accuracy is integer pixel accuracy.

When it is determined in step S145 that the set motion vector accuracy is integer pixel accuracy, the motion prediction/compensation unit 204 performs the accuracy limitation process, whereafter the process proceeds to step S149.

Moreover, when it is determined in step S145 that the set motion vector accuracy is not integer pixel accuracy, i.e., when the set motion vector accuracy is fractional pixel accuracy, the process proceeds to step S148.

In step S148, the motion prediction/compensation unit 204 performs the normal process, whereafter the process proceeds to step S149.

In step S149, the motion prediction/compensation unit 204 calculates cost function values for all candidate inter prediction modes on the basis of input images, and predicted images formed by the direction limitation process, the accuracy limitation process, or the normal process. Then, the motion prediction/compensation unit 204 determines the inter prediction mode having the minimum cost function value as an optimum inter prediction mode.

In step S150, the motion prediction/compensation unit 204 outputs the predicted images and the cost function value in the optimum inter prediction mode to the predicted image selection unit 48. Then, the process ends.

As described above, the encoding unit 200 selectively performs the direction limitation process, the accuracy limitation process, or the normal process on the basis of quantization parameters. Therefore, when a quantization parameter is high, for example, i.e., when an encoding performance difference is conspicuous, lowering of encoding efficiency causes a problem. In this case, the encoding unit 200 performs the normal process to secure image quality and encoding efficiency. On the other hand, when a quantization parameter is low, i.e., when an encoding performances is inconspicuous, lowering of encoding efficiency is allowable. In this case, the encoding unit 200 performs the direction limitation process or the accuracy limitation process to reduce the storage capacity of the cache 112.

Note that, according to the third embodiment, quantization parameters are averaged in units of screen. However, quantization parameters may be averaged in units of slice or LCU. When quantization parameters are averaged in units of LCU, the prediction direction in a bidirectional prediction mode in a state that bidirectional prediction information indicates inexecution of bidirectional prediction is not determined in units of LCU group, but in units of LCU.

(Other Examples of Limitation Table)

According to the example described above, the encoding unit 200 selectively performs the direction limitation process, the accuracy limitation process, or the normal process on the basis of quantization parameters. However, the encoding unit 200 may selectively perform the direction limitation process, the accuracy limitation process, or the normal process on the basis of information other than quantization parameters.

FIG. 20 is a view illustrating a limitation table referred to when the direction limitation process, the accuracy limitation process, or the normal process is selectively performed on the basis of a frame rate.

When a frame rate is high, a time distance between an input image and a reference image decreases. In this case, a predicted image is not greatly affected by lowering of prediction accuracy. Accordingly, it is preferable in this situation to reduce the storage capacity of the cache 112 by limiting the prediction direction in the bidirectional prediction mode and the motion vector accuracy for bidirectional prediction.

When a frame rate is low, a time distance between an input image and a reference image increases. In this case, a predicted image is greatly affected by lowering of prediction accuracy. Accordingly, it is preferable to increase accuracy of predicted images without limiting a prediction direction in a bidirectional prediction mode and motion vector accuracy for bidirectional prediction.

According to the limitation table illustrated in FIG. 20, therefore, frame rates are divided into three levels of 1p to 9p, 10p to 29p, and 30p or higher. Prediction direction limitation information indicating the presence of limitations is registered in correspondence with the highest level of frame rates (30p or higher). Moreover, prediction direction limitation information indicating the absence of limitations, and motion vector limitation information indicating the presence of limitations are registered in correspondence with the second highest level of frame rates (10p to 29p). Furthermore, prediction direction limitation information and motion vector limitation information both indicating the absence of limitations are registered in correspondence with the lowest level of frame rates (1p to 9p).

Note that the levels of the frame rates illustrated in FIG. 20 are set on the basis of frame rates of encoding targets assumed for each use purpose such that the levels applied to the respective use purpose (applications) differ for each use purpose.

More specifically, when the encoding unit 200 is incorporated in a video camera or like devices, encoded data on captured images are stored in a storage. In this case, the frame rate of captured images corresponding to encoding targets is a high frame rate such as 30p and 60p. Accordingly, the highest level of frame rates is determined as 30p or higher.

Moreover, when encoded data on captured images are transmitted via a network, the frame rate required for captured images corresponding to encoding targets is a low frame rate such as 15p. Accordingly, the second highest level of frame rates is determined in a range from 10p to 29p.

Furthermore, when the encoding unit 200 is incorporated in a monitoring camera or like devices, captured images corresponding to encoding targets are images captured by the monitoring camera. In this case, the frame rate of captured images corresponding to encoding targets is an ultra-low frame rate such as 5p. Accordingly, the lowest level of frame rates is determined in a range from 1p to 9p. The levels of frame rates are not limited to the example illustrated in FIG. 20.

When the limitation table illustrated in FIG. 20 is stored in the table storage unit 202, a quantization bit rate is not supplied from the rate control unit 201 to the setting unit 203. Then, the setting unit 203 reads motion vector limitation information and prediction direction limitation information corresponding to a frame rate input by a user or the like from the limitation table on the basis of the frame rate. The setting unit 203 sets motion vector accuracy for bidirectional prediction and bidirectional prediction information on the basis of the read motion vector limitation information and prediction direction limitation information.

Thus, when a frame rate is low, i.e., when predicted images are greatly affected by lowering of prediction accuracy, the normal process is performed. In this case, sufficient prediction accuracy is securable. On the other hand, when a frame rate is high, i.e., when predicted images are not greatly affected by lowering of prediction accuracy, the direction limitation process or the accuracy limitation process is performed. In this case, the storage capacity of the cache 112 decreases.

FIG. 21 is a view illustrating an example of a limitation table referred to when the direction limitation process, the accuracy limitation process, or the normal process is selectively performed on the basis of resolution.

When resolution is low, image density often decreases (picture becomes rough). In this case, predicted images are not greatly affected by accuracy of prediction vectors. Accordingly, it is preferable in this situation to reduce the storage capacity of the cache 112 by limiting the prediction direction in the bidirectional prediction mode and the motion vector accuracy for bidirectional prediction.

On the other hand, when resolution is high, image density often increases (picture becomes fine). In this case, predicted images are greatly affected by accuracy of prediction vectors. Accordingly, it is preferable to increase accuracy of predicted images without limiting a prediction direction in a bidirectional prediction mode and motion vector accuracy for bidirectional prediction.

According to the limitation table illustrated in FIG. 21, therefore, resolution is divided into three levels constituted by video graphics array (VGA) resolution, HD resolution, and 4K resolution. Prediction direction limitation information indicating the presence of limitations is registered in correspondence with the lowest level of resolution (VGA resolution). Moreover, prediction direction limitation information indicating the absence of limitations, and motion vector limitation information indicating the presence of limitations are registered in correspondence with the second lowest level of resolution (HD resolution). Furthermore, prediction direction limitation information and motion vector limitation information both indicating the absence of limitations are registered in correspondence with the highest level of resolution (4K resolution).

Note that the levels of the resolution illustrated in FIG. 21 are set on the basis of resolution of encoding targets assumed for respective use purposes such that levels applied to the respective use purpose (applications) differ for each use purpose.

More specifically, when the encoding unit 200 is incorporated in a video camera or like devices, encoded data on captured images are stored in a storage. In this case, the resolution required for captured images of encoding targets is high resolution such as 4K (quad full high definition (QFHD)) resolution. Accordingly, the highest level of resolution is determined as 4K resolution.

Moreover, when encoded data on captured images are transmitted via a network, the resolution required for captured images of encoding targets is middle resolution such as HD resolution. Accordingly, the second highest level of resolution is determined as HD resolution.

Furthermore, when the encoding unit 200 is incorporated in a monitoring camera or like devices, captured images corresponding to encoding targets are images captured by the monitoring camera. In this case, the resolution required for captured images of encoding targets is low resolution such as VGA resolution. Accordingly, the lowest level of resolution is determined as VGA resolution. The levels of resolution are not limited to the example illustrated in FIG. 21.

When the limitation table illustrated in FIG. 21 is stored in the table storage unit 202, a quantization bit rate is not supplied from the rate control unit 201 to the setting unit 203. Then, the setting unit 203 reads motion vector limitation information and prediction direction limitation information corresponding to resolution input by a user or the like on the basis of the input resolution. The setting unit 203 sets motion vector accuracy for bidirectional prediction and bidirectional prediction information on the basis of the read motion vector limitation information and prediction direction limitation information.

Thus, when resolution is high, i.e., when predicted images are greatly affected by accuracy of prediction vectors, the normal process is performed. In this case, sufficient accuracy of prediction vectors is securable. On the other hand, when resolution is low, i.e., when predicted images are not greatly affected by accuracy of prediction vectors, the direction limitation process or the accuracy limitation process is performed. In this case, the storage capacity of the cache 112 decreases.

Note that, according to the third embodiment, the direction limitation process, the accuracy limitation process, or the normal process is selectively performed on the basis of quantization parameters, frame rates, or resolution. However, the direction limitation process, the accuracy limitation process, or the normal process may be selectively performed on the basis of a use purpose (application).

<Decoding Device>
(Configuration Example of Decoding Device)

Figure 22:
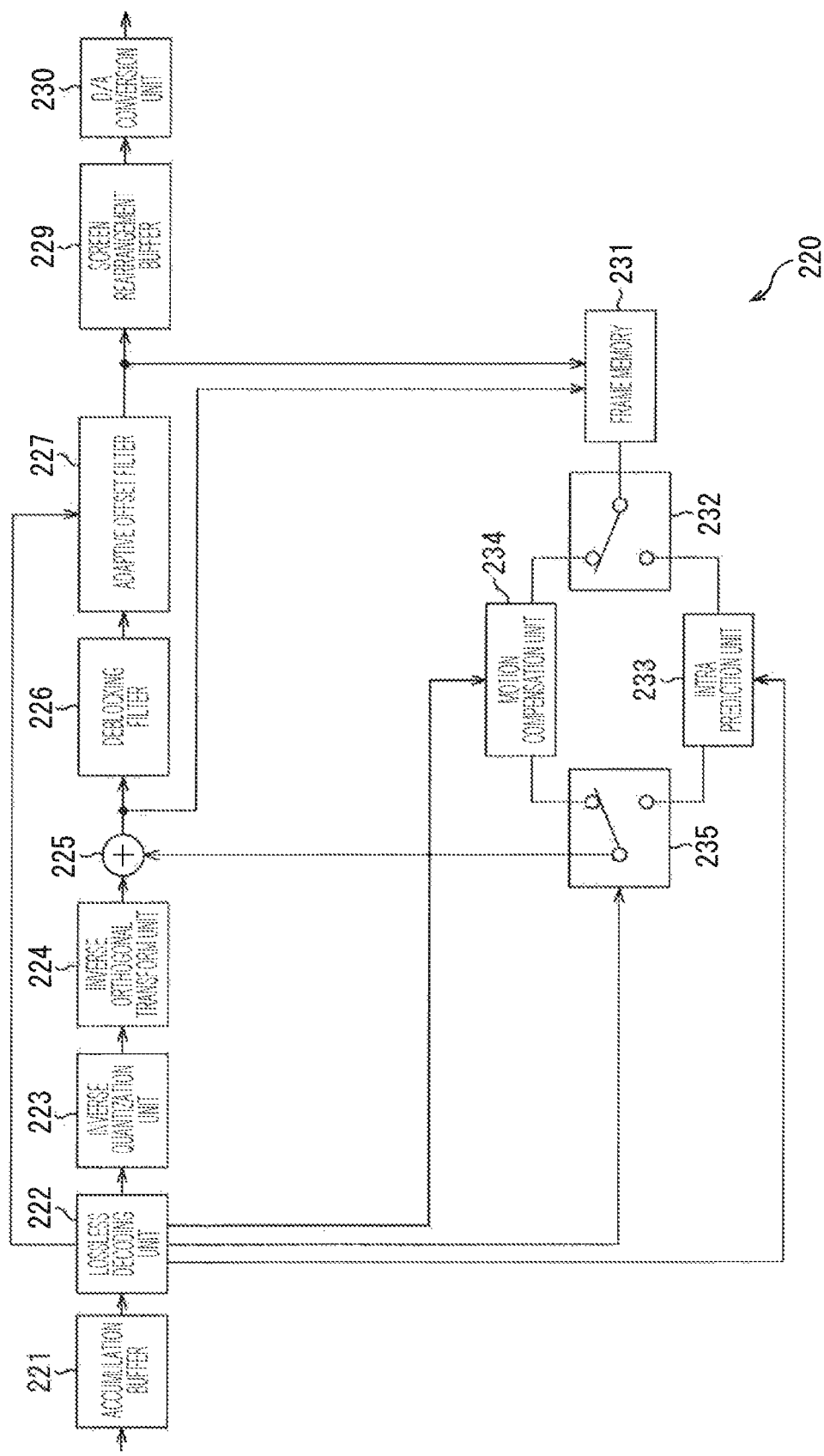
FIG. 22 is a block diagram illustrating a configuration example of a decoding device.

FIG. 22 is a block diagram illustrating a configuration example of a decoding device 220 which decodes encoded data generated by the encoding devices according to the first through third embodiments.

The decoding device 220 illustrated in FIG. 22 includes an accumulation buffer 221, a lossless decoding unit 222, an inverse quantization unit 223, an inverse orthogonal transform unit 224, an addition unit 225, a deblocking filter 226, an adaptive offset filter 227, and a screen rearrangement buffer 229. Moreover, the decoding device 220 further includes a D/A conversion unit 230, a frame memory 231, a switch 232, an intra prediction unit 233, a motion compensation unit 234, and a switch 235.

The accumulation buffer 221 of the decoding device 220 receives encoded data from the encoding device 10 or the encoding device 100, and accumulates the received encoded data. The accumulation buffer 221 supplies the accumulated encoded data to the lossless decoding unit 222.

The lossless decoding unit 222 performs lossless decoding such as variable length decoding and arithmetic decoding corresponding to lossless encoding performed by the lossless encoding unit 36 illustrated in FIG. 2 for the encoded data received from the accumulation buffer 221 to obtain quantized orthogonal transform coefficients and encoding information. The lossless decoding unit 222 supplies the quantized orthogonal transform coefficients to the inverse quantization unit 223. Moreover, the lossless decoding unit 222 further supplies intra prediction mode information and others as encoding information to the intra prediction unit 233. The lossless decoding unit 222 supplies motion vector information, inter prediction mode information, information specifying reference images, and others to the motion compensation unit 234.

The lossless decoding unit 222 further supplies the intra prediction mode information or the inter prediction mode information as encoding information to the switch 235. The lossless decoding unit 222 supplies offset filter information as encoding information to the adaptive offset filter 227.

The inverse quantization unit 223, the inverse orthogonal transform unit 224, the addition unit 225, the deblocking filter 226, the adaptive offset filter 227, the frame memory 231, the switch 232, the intra prediction unit 233, and the motion compensation unit 234 perform processes similar to the processes performed by the inverse quantization unit 38, the inverse orthogonal transform unit 39, the addition unit 40, the deblocking filter 41, the adaptive offset filter 42, the frame memory 44 (131), the switch 45, the intra prediction unit 46, and the motion prediction/compensation unit 47 (132) illustrated in FIG. 2, respectively, to decode images.

More specifically, the inverse quantization unit 223 inversely quantizes quantized orthogonal transform coefficients received from the lossless decoding unit 222, and supplies orthogonal transform coefficients thus obtained to the inverse orthogonal transform unit 224.

The inverse orthogonal transform unit 224 performs inverse orthogonal transform for the orthogonal transform coefficients received from the inverse quantization unit 223 in units of TU. The inverse orthogonal transform unit 224 supplies residual information obtained by inverse orthogonal transform to the addition unit 225.

The addition unit 225 adds the residual information supplied from the inverse orthogonal transform unit 224 to predicted images supplied from the switch 235 to perform decoding. The addition unit 225 supplies images obtained by decoding to the deblocking filter 226 and the frame memory 231.

Note that, when no predicted image is supplied from the switch 235, the addition unit 225 supplies images corresponding to the residual information supplied from the inverse orthogonal transform unit 224 to the deblocking filter 226 and the frame memory 231 as images obtained by decoding.

The deblocking filter 226 performs deblocking filtering for the images supplied from the addition unit 225, and supplies image thus obtained to the adaptive offset filter 227.

The adaptive offset filter 227 performs adaptive offset filtering of a type indicated by offset filter information received from the lossless decoding unit 222 for the images obtained by deblocking filtering for each LCU by using offset indicated by the offset filter information. The adaptive offset filter 227 supplies images obtained by adaptive offset filtering to the screen rearrangement buffer 229 and the frame memory 231.

The screen rearrangement buffer 229 stores the images supplied from the adaptive offset filter 227 in units of frame. The screen rearrangement buffer 229 rearranges the arrangement order of the images, which have been stored in units of frame in the order for encoding, into the order of original display, and supplies the rearranged images to the D/A conversion unit 230.

The D/A conversion unit 230 converts the digital images in units of frame supplied from the screen rearrangement buffer 229 into analog images, and outputs the converted images.

The frame memory 231 accumulates the images supplied from the adaptive offset filter 227, and the images supplied from the addition unit 225. Pixels adjacent to PUs in the images not filtered and accumulated in the frame memory 231 are supplied to the intra prediction unit 233 via the switch 232 as peripheral pixels. On the other hand, the images filtered and accumulated in the frame memory 231 are supplied to the motion compensation unit 234 via the switch 232 as reference images.

The intra prediction unit 233 executes intra prediction in an optimum intra prediction mode indicated by the intra prediction mode information supplied from the lossless decoding unit 222 in units of PU by using peripheral pixels read from the frame memory 231 via the switch 232. The intra prediction unit 233 supplies predicted images thus formed to the switch 235.

The motion compensation unit 234 reads reference images, which are specified by the information supplied from the lossless decoding unit 222 for specifying reference images, from the frame memory 231 via the switch 232. The motion compensation unit 234 performs motion compensation in an optimum inter prediction mode indicated by the inter prediction mode information supplied from the lossless decoding unit 222 in units of PU by using the read reference images and motion vectors supplied from the lossless decoding unit 222. The motion compensation unit 234 supplies predicted images thus formed to the switch 235.

The switch 235 supplies the predicted images supplied from the intra prediction unit 233 to the addition unit 225 when receiving the intra prediction mode information from the lossless decoding unit 222. On the other hand, the switch 235 supplies the predicted images supplied from the motion compensation unit 234 to the addition unit 225 when receiving the inter prediction mode information from the lossless decoding unit 222.

Fourth Embodiment (Description of Computer According to Present Disclosure)

A series of processes described above may be executed either by hardware or by software. When the series of processes are executed by software, programs constituting the software are installed into a computer. The computer in this context includes a computer incorporated in dedicated hardware, and a general-purpose personal computer capable of executing various types of functions under various types of programs installed in the computer, for example.

Figure 23:
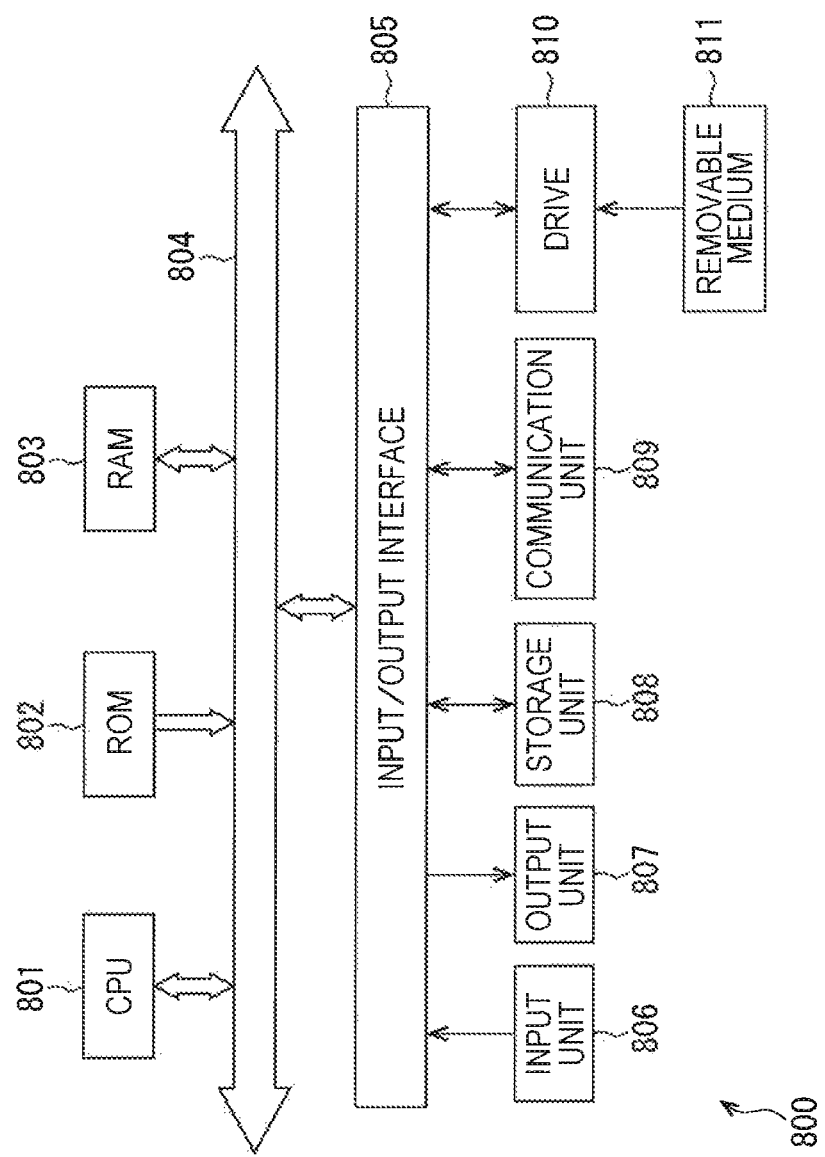
FIG. 23 is a block diagram illustrating a configuration example of hardware of a computer.

FIG. 23 is a block diagram illustrating a configuration example of hardware of a computer which executes the series of processes described above under programs.

According to a computer 800, a central processing unit (CPU) 801, a read only memory (ROM) 802, and a random access memory (RAM) 803 are connected to each other via a bus 804.

An input/output interface 805 is further connected to the bus 804. An input unit 806, an output unit 807, a storage unit 808, a communication unit 809, and a drive 810 are connected to the input/output interface 805.

The input unit 806 is constituted by a keyboard, a mouse, a microphone and the like. The output unit 807 is constituted by a display, a speaker and the like. The storage unit 808 is constituted by a hard disk, a non-volatile memory and the like. The communication unit 809 is constituted by a network interface or the like. The drive 810 drives a removable medium 811 constituted by a magnetic disk, an optical disk, a magneto-optical disk, or a semiconductor memory.

According to the computer 800 thus constructed, the CPU 801 loads programs stored in the storage unit 808 into the RAM 803 via the input/output interface 805 and the bus 804, and executes the loaded programs to perform the series of processes described above, for example.

The programs executed by the computer 800 (CPU 801) may be recorded in the removable medium 813 corresponding to a package medium or the like, and supplied in this form to the computer 800, for example. Alternatively, the programs may be supplied via a wired or wireless transmission medium, such as a local area network, the Internet, and digital satellite broadcasting.

According to the computer 800, the programs may be installed in the storage unit 808 via the input/output interface 805 in a state of attachment of the removable medium 811 to the drive 810. Alternatively, the programs may be received by the communication unit 809 via a wired or wireless transmission medium, and installed in the storage unit 808. Instead, the programs may be installed beforehand in the ROM 802 or the storage unit 808.

Note that the programs executed by the computer 800 may be programs under which the processes are performed in time series in the order described in the present specification, or may be performed in parallel, or at necessary timing such as at the time of a call.

<Television Device>

Figure 24:
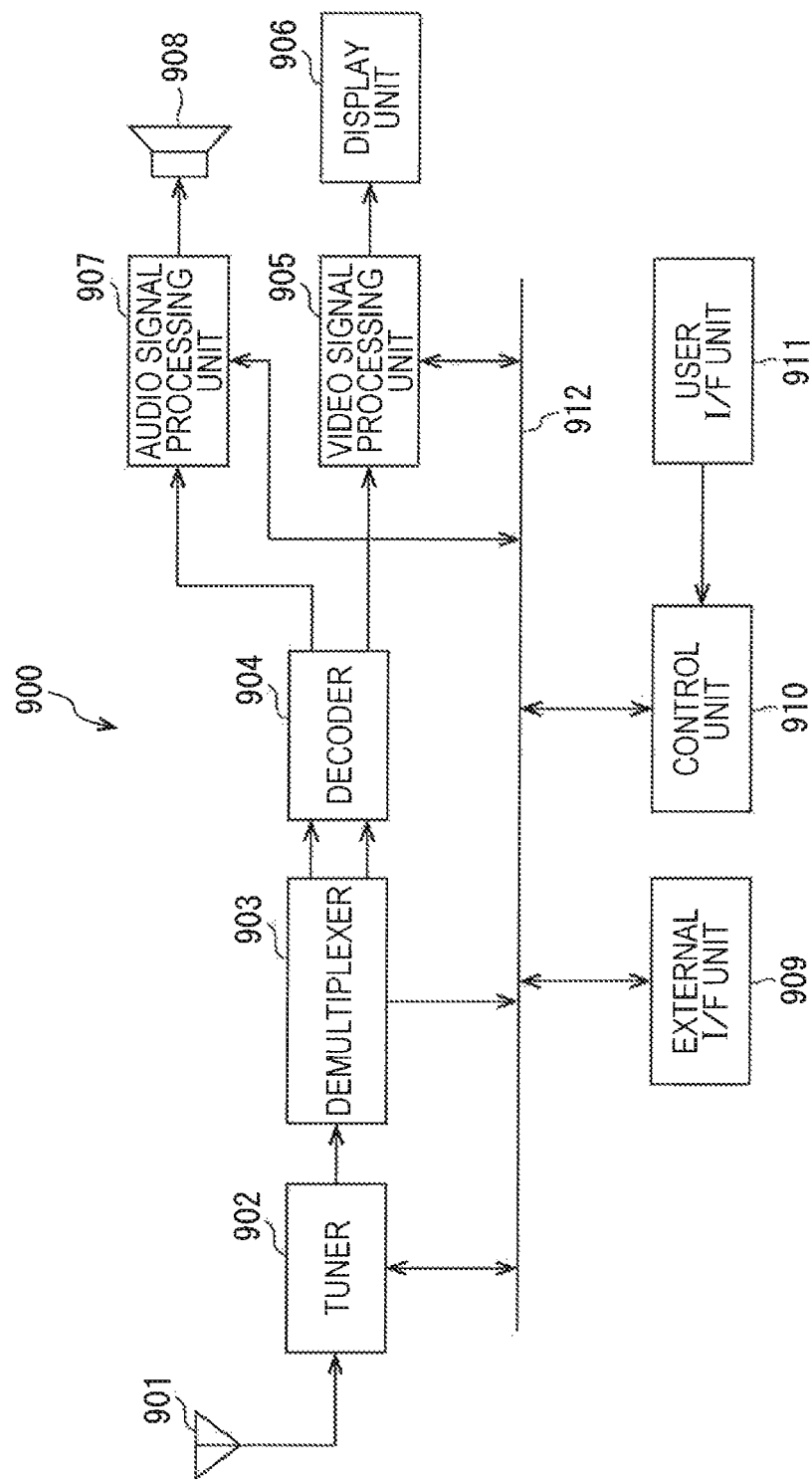
FIG. 24 is a view illustrating a general configuration example of a television device according to the present disclosure.

FIG. 24 illustrates an example of a general configuration of a television device which acquires encoded bit streams containing encoded data generated by the encoding device according to the present disclosure. A television device 900 includes an antenna 901, a tuner 902, a demultiplexer 903, a decoder 904, a video signal processing unit 905, a display unit 906, an audio signal processing unit 907, a speaker 908, and an external interface unit 909. The television device 900 further includes a control unit 910, a user interface unit 911, and others.

The tuner 902 selects a desired channel from broadcast wave signals received by the antenna 901, demodulates the selected channel, and outputs encoded bit streams thus obtained to the demultiplexer 903.

The demultiplexer 903 extracts video or audio packets of a program corresponding to a viewing target from the encoded bit streams, and outputs data contained in the extracted packets to the decoder 904. The demultiplexer 903 further supplies packets containing data such as electronic program guide (EPG) to the control unit 910. Note that when the data are scrambled, scrambling is cancelled by using the demultiplexer or the like.

The decoder 904 decodes packets, and outputs video data generated by decoding to the video signal processing unit 905, and outputs audio data generated by decoding to the audio signal processing unit 907.

The video signal processing unit 905 performs noise removal, video processing corresponding to user settings, and other processing for video data. The video signal processing unit 905 generates video data contained in a program to be displayed on the display unit 906, and image data generated by processing of applications supplied via a network, for example. The video signal processing unit 905 further generates video data for displaying a menu screen or the like through which items are selected, for example, and superimposes the generated video data on video data contained in a program. The video signal processing unit 905 generates driving signals on the basis of video data thus generated to drive the display unit 906.

The display unit 906 drives display devices (such as liquid crystal display elements or the like) on the basis of the driving signals received from the video signal processing unit 905 to display video images of a program or the like.

The audio signal processing unit 907 performs predetermined processing, such as noise removal, for audio data, performs D/A conversion and amplification of the processed audio data, and supplies the audio data thus obtained to the speaker 908 to output voices.

The external interface unit 909 is an interface for connection with an external device or a network, and provided for transmission and reception of data such as video data and audio data.

The user interface unit 911 is connected to the control unit 910. The user interface unit 911 is constituted by an operation switch, a remote control signal receiving unit and the like, and supplies operation signals corresponding to user operation to the control unit 910.

The control unit 910 is constituted by a central processing unit (CPU), a memory and the like. The memory stores programs executed by the CPU, various types of data required for processing by the CPU, EPG data, data acquired via a network, and others. The programs stored in the memory are read by the CPU at predetermined timing such as a startup of the television device 900, and executed by the CPU. The CPU executes the programs to control respective units such that the television device 900 performs operation corresponding to user operation.

Note that the television device 900 includes a bus 912 for connecting the tuner 902, the demultiplexer 903, the video signal processing unit 905, the audio signal processing unit 907, the external interface unit 909 and the like to the control unit 910.

Fifth Embodiment (Configuration Example of Cellular Phone)

Figure 25:
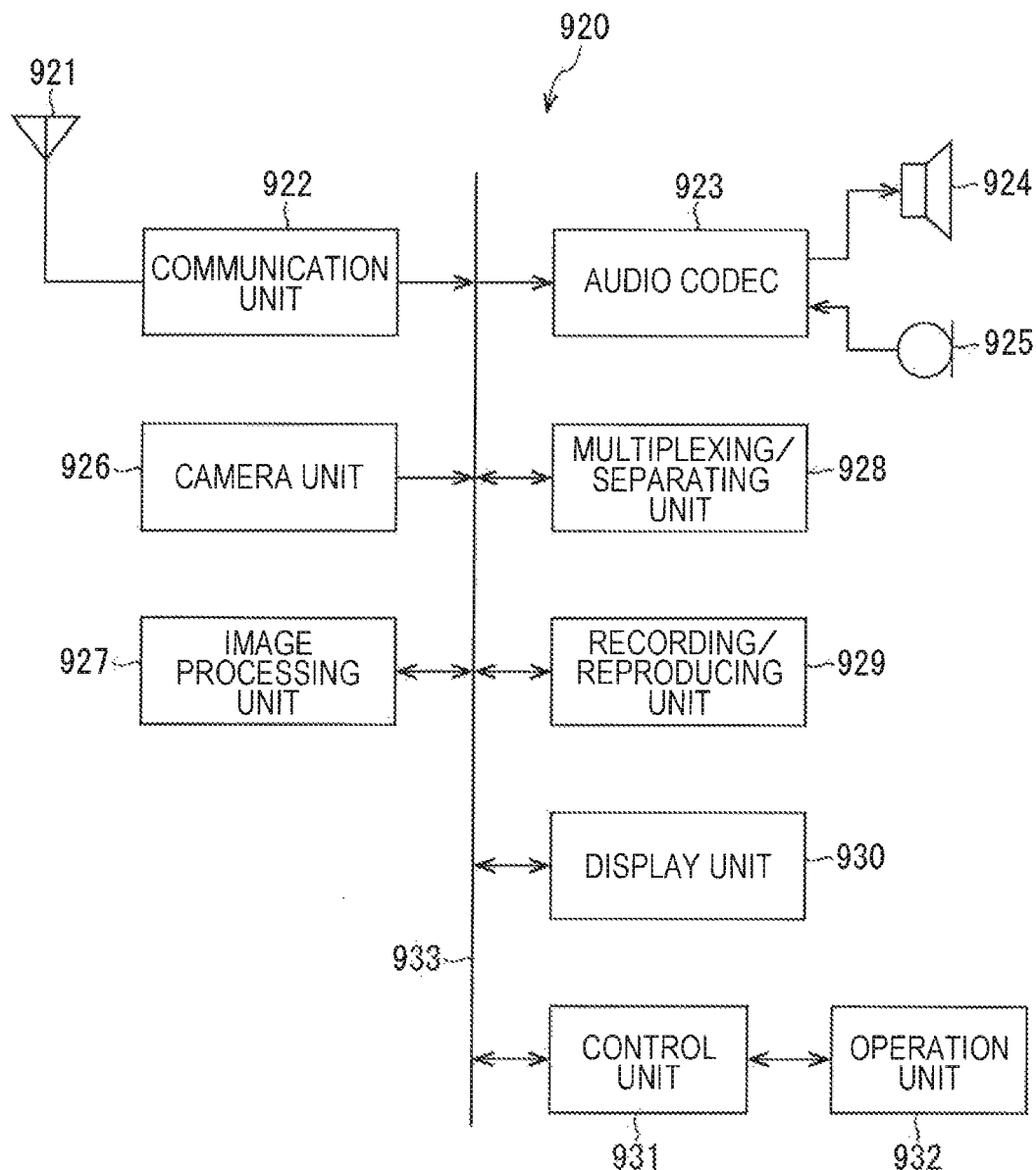
FIG. 25 is a view illustrating a general configuration example of a cellular phone according to the present disclosure.

FIG. 25 is a view illustrating an example of a general configuration of a cellular phone according to the present disclosure. A cellular phone 920 includes a communication unit 922, an audio codec 923, a camera unit 926, an image processing unit 927, a multiplexing/separating unit 928, a recording/reproducing unit 929, a display unit 930, and a control unit 931. These units are connected to each other via a bus 933.

Moreover, an antenna 921 is connected to the communication unit 922, while a speaker 924 and a microphone 925 are connected to the audio codec 923. Furthermore, an operation unit 932 is connected to the control unit 931.

The cellular phone 920 performs various operations, such as transmission and reception of audio signals, transmission and reception of electronic mails and image data, imaging, and data recording, in various modes such as a voice communication mode and a data communication mode.

In the voice communication mode, audio signals generated by the microphone 925 are supplied to the communication unit 922 after conversion into audio data and compression by the audio codec 923. The communication unit 922 performs modulation, frequency transform, and other processing for audio data to generate transmission signals. Moreover, the communication unit 922 supplies the generated transmission signals to the antenna 921 to transmit the transmission signals to a not-shown base station. The communication unit 922 further performs amplification, frequency transform, demodulation, and other processing for reception signals received by the antenna 921, and supplies obtained audio data to the audio codec 923. The audio codec 923 performs data expansion of audio data and conversion of audio data into analog audio signals, and outputs the analog audio signals to the speaker 924.

Moreover, for mail transmission in the data communication mode, the control unit 931 receives character data input through the operation unit 932, and displays input characters on the display unit 930. Moreover, the control unit 931 generates mail data in accordance with user instructions or the like input through the operation unit 932, and supplies the generated mail data to the communication unit 922. The communication unit 922 performs modulation, frequency transform and other processing for the mail data, and transmits transmission signals thus obtained from the antenna 921. The communication unit 922 also performs amplification, frequency transform, demodulation and other processing for reception signals received by the antenna 921 to restore mail data. The restored mail data is supplied to the display unit 930 to display contents of a mail.

Note that the cellular phone 920 may store received mail data in a storage medium by using the recording/reproducing unit 929. The storage medium is an arbitrary rewritable storage medium. For example, the storage medium may be a removable medium such as a semiconductor memory including a RAM and a built-in flash memory, a hard disk, a magnetic disk, an optical magnetic disk, an optical disk, a universal serial bus (USB) memory, and a memory card.

For transmission of image data in the data communication mode, image data generated by the camera unit 926 is supplied to the image processing unit 927. The image processing unit 927 encodes the image data to generate encoded data.

The multiplexing/separating unit 928 multiplexes the encoded data generated by the image processing unit 927, and the audio data supplied from the audio codec 923 by a predetermined system, and supplies the multiplexed data to the communication unit 922. The communication unit 922 performs processing such as modulation and frequency transform for the multiplexed data, and transmits transmission signals thus obtained from the antenna 921. The communication unit 922 also performs processing such as amplification, frequency transform, and demodulation for reception signals received by the antenna 921 to restore multiplexed data. The restored multiplexed data is supplied to the multiplexing/separating unit 928. The multiplexing/separating unit 928 separates the multiplexed data, and supplies encoded data to the image processing unit 927, and supplies audio data to the audio codec 923. The image processing unit 927 decodes the encoded data to generate image data. The image processing unit 927 supplies the generated image data to the display unit 930 to display received images. The audio codec 923 converts the audio data into analog audio signals, and supplies the analog audio signals to the speaker 924 to output received voices.

According to the cellular phone device thus constructed, the image processing unit 927 has the function of the encoding device (encoding method) according to the present application. Accordingly, a storage capacity necessary for bidirectional prediction decreases.

Sixth Embodiment (Configuration Example of Recording and Reproducing Device)

Figure 26:
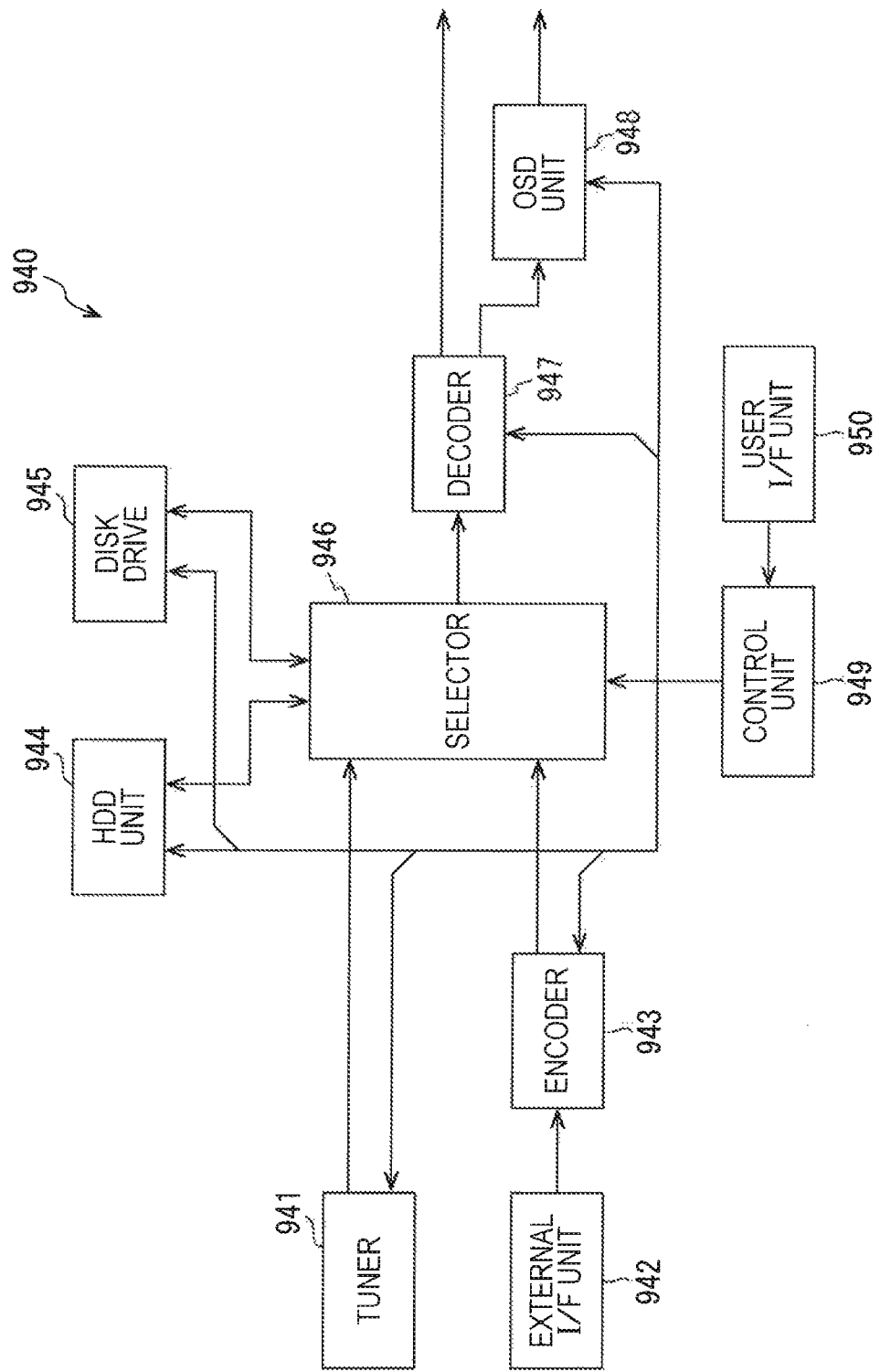
FIG. 26 is a view illustrating a general configuration example of a recording and reproducing device according to the present disclosure.

FIG. 26 illustrates an example of a general configuration of a recording and reproducing device according to the present disclosure. A recording and reproducing device 940 receives audio data and video data contained in a broadcasting program, and records these data in a recording medium. The recording and reproducing device 940 supplies the recorded data to a user at timing corresponding to an instruction from the user. The recording and reproducing device 940 also acquires audio data and video data from another device, and records these data in a recording medium, for example. The recording and reproducing device 940 further decodes audio data and video data recorded in a recording medium, and outputs the decoded data to display images and output voices by using a monitoring device or the like.

The recording and reproducing device 940 includes a tuner 941, an external interface unit 942, an encoder 943, an hard disk drive (HDD) unit 944, a disk drive 945, a selector 946, a decoder 947, an on-screen display (OSD) unit 948, a control unit 949, and a user interface unit 950.

The tuner 941 selects a desired channel from broadcast signals received via a not-shown antenna. The tuner 941 demodulates reception signals of a desired channel, and outputs encoded bit streams obtained by demodulation to the selector 946.

The external interface unit 942 is at least constituted by any one of an IEEE 1394 interface, a network interface unit, a USB interface, a flash memory interface and the like. The external interface unit 942 is an interface for connection with an external device, a network, a memory card or the like, and provided to receive data such as video data and audio data to be recorded.

The encoder 943 encodes video data or audio data supplied from the external interface unit 942 by a predetermined system when the data is not encoded, and outputs encoded bit streams to the selector 946.

The HDD unit 944 records content data such as video images and voices, various types of programs, other types of data and the like in a built-in hard disk, and reads these data from the hard disk at the time of reproduction, for example.

The disk drive 945 records and reproduces signals to and from an attached optical disk. The optical disk is constituted by a DVD disk (such as DVD-Video, DVD-RAM, DVD-R, DVD-RW, DVD+R, and DVD+RW), a Blu-ray (registered trademark) disc, or the like.

The selector 946 selects encoded bit streams from streams received from the tuner 941 or the encoder 943, and supplies the selected encoded bit streams to either the HDD unit 944 or the disk drive 945 during recording of video images or voices. The selector 946 further supplies encoded bit streams output from the HDD unit 944 or the disk drive 945 to the decoder 947 during reproduction of images and voices.

The decoder 947 decodes encoded bit streams. The decoder 947 supplies video data generated by decoding to the OSD unit 948. The decoder 947 further outputs audio data generated by decoding.

The OSD unit 948 generates video data for displaying a menu screen or the like through which items are selected, for example, and outputs the generated video data while superimposing the video data on video data output from the decoder 947.

The user interface unit 950 is connected to the control unit 949. The user interface unit 950 is constituted by an operation switch, a remote control signal receiving unit and the like, and configured to supply operation signals corresponding to user operation to the control unit 949.

The control unit 949 is constituted by a CPU, a memory and the like. The memory stores programs executed by the CPU, and various types of data required for processing by the CPU. The programs stored in the memory are read by the CPU at predetermined timing such as a startup of the recording and reproducing device 940, and executed by the CPU. The CPU executes the programs to controls respective units such that the recording and reproducing device 940 performs operation corresponding to user operation.

According to the recording and reproducing device thus constructed, the encoder 943 has the function of the encoding device (encoding method) according to the present application. Accordingly, a storage capacity necessary for bidirectional prediction decreases.

Seventh Embodiment (Configuration Example of Imaging Device)

Figure 27:
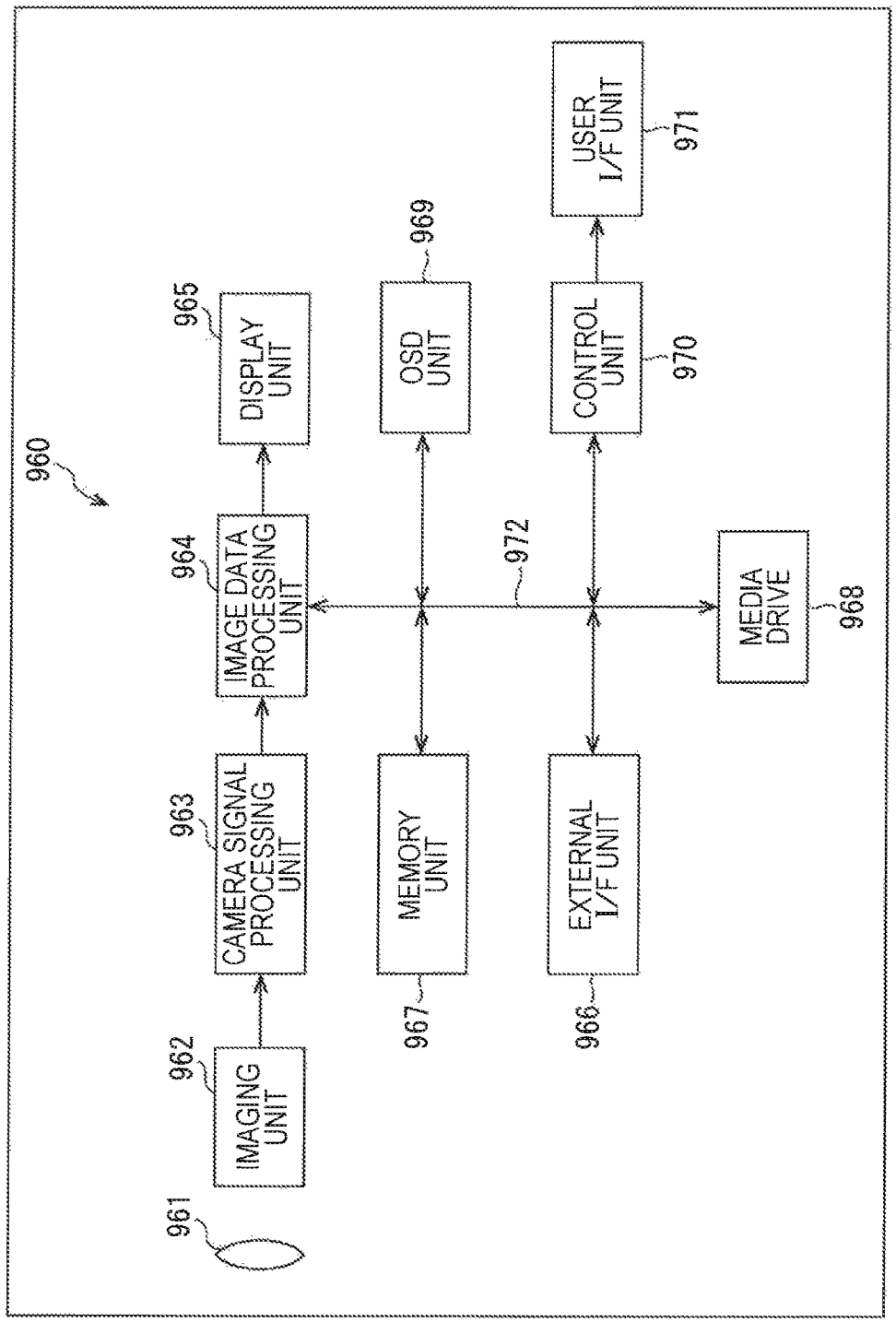
FIG. 27 is a view illustrating a general configuration example of an imaging device according to the present disclosure.

FIG. 27 illustrates an example of a general configuration of an imaging device according to the present disclosure. An imaging device 960 images a subject, and displays an image of the subject on a display unit or records the image in a recording medium as image data.

The imaging device 960 includes an optical block 961, an imaging unit 962, a camera signal processing unit 963, an image data processing unit 964, a display unit 965, an external interface unit 966, a memory unit 967, a media drive 968, an OSD unit 969, and a control unit 970. Moreover, a user interface unit 971 is connected to the control unit 970. Furthermore, the image data processing unit 964, the external interface unit 966, the memory unit 967, the media drive 968, the OSD unit 969, the control unit 970 and others are connected to each other via a bus 972.

The optical block 961 is constituted by a focus lens, a diaphragm mechanism and the like. The optical block 961 forms an optical image of a subject on an imaging surface of the imaging unit 962. The imaging unit 962 is constituted by a CCD or CMOS image sensor, and configured to generate electric signals corresponding to an optical image by photoelectric conversion, and supply the generated electric signals to the camera signal processing unit 963.

The camera signal processing unit 963 performs various types of camera signal processing, such as knee correction, gamma correction, and color correction for the electric signals supplied from the imaging unit 962. The camera signal processing unit 963 supplies image data obtained by camera signal processing to the image data processing unit 964.

The image data processing unit 964 encodes the image data supplied from the camera signal processing unit 963. The image data processing unit 964 supplies encoded data generated by encoding to the external interface unit 966 and the media drive 968. Moreover, the image data processing unit 964 decodes encoded data supplied from the external interface unit 966 and the media drive 968. The image data processing unit 964 supplies image data generated by decoding to the display unit 965. The image data processing unit 964 also supplies image data received from the camera signal processing unit 963 to the display unit 965, and supplies display data received from the OSD unit 969 to the display unit 965 while superimposing the display data on image data.

The OSD unit 969 generates display data, such as menu screens and icons constituted by symbols, characters, or figures, and outputs the generated display data to the image data processing unit 964.

The external interface unit 966 is constituted by an USB input/output terminal, for example, and connected to a printer at the time of printing of an image. Moreover, a drive is connected to the external interface unit 966 as necessary. An appropriate removable medium such as a magnetic disk and an optical disk is attached to the drive. Computer programs read from the removable medium are installed as necessary. Furthermore, the external interface unit 966 includes a network interface connected to a predetermined network such as a LAN and the Internet. The control unit 970 reads encoded data from the media drive 968 in accordance with an instruction from the user interface unit 971, and supplies the read encoded data from the external interface unit 966 to other devices connected via the network, for example. Moreover, when encoded data or image data is supplied from other devices via the network, the control unit 970 acquires the data via the external interface unit 966, and supplies the data to the image data processing unit 964, for example.

The recording medium driven by the media drive 968 is constituted by an arbitrary readable and writable removable medium such as a magnetic disk, a magneto-optical disk, an optical disk, and a semiconductor memory. Moreover, the type of the recording medium as a removable medium is arbitrarily selected from a tape device, a disk, or a memory card, for example. Needless to say, the recording medium may be a non-contact integrated circuit (IC) card or the like.

Moreover, the media drive 968 may be integrated with the recording medium to constitute a non-portable recording medium such as a built-in hard disk drive and a solid state drive (SSD).

The control unit 970 is constituted by a CPU. The memory unit 967 stores programs executed by the control unit 970, various types of data or the like required for processing by the control unit 970, and others. The programs stored in the memory unit 967 are read by the control unit 970 at predetermined timing such as a startup of the imaging device 960, and executed by the control unit 970. The control unit 970 executes the programs to control respective units such that the imaging device 960 operates in accordance with user operation.

According to the imaging device thus constructed, the image data processing unit 964 has the function of the encoding device (encoding method) according to the present application. Accordingly, a storage capacity necessary for bidirectional prediction decreases.

Eighth Embodiment

Other Examples

While specific examples of devices according to the present disclosure have been discussed herein, the present disclosure is not limited to these devices, but may be applied to various configurations incorporated in the respective devices, such as a processor as a system large scale integration (LSI) or the like, a module including a plurality of processors or the like, a unit including a plurality of modules or the like, and a set adding other functions to each unit (i.e., configuration constituting a part of each device), for example.

(Configuration Example of Video Set)

An example of a set according to the present disclosure is hereinafter described with reference to FIG. 28. FIG. 28 illustrates an example of a general configuration of a video set according to the present disclosure.

Multi-functionalization of electronic devices has been accelerating in recent years. For development or manufacture of these electronic devices, not only a configuration performing one function, but also a combination of a plurality of configurations performing associated functions, i.e., a set performing a plurality of functions is often sold or provided as a part of configurations of the electronic devices.

A video set 1300 illustrated in FIG. 28 has a multi-functionalized configuration of this type, and is constituted by a combination of both a device having functions associated with encoding and decoding of images (either one or both of encoding and decoding), and a device having other functions associated with these functions.

As illustrated in FIG. 28, the video set 1300 includes a module group such as a video module 1311, an external memory 1312, a power management module 1313, and a front end module 1314, and a device having associated functions such as a connectivity 1321, a camera 1322, and a sensor 1323.

A module is a part having several part functions associated with each other to perform a unified function. A specific physical configuration of a module is arbitrarily determined. Examples of a module include a plurality of processors each of which performs a function, electronic circuit elements such as a resistor and a capacitor, other devices or the like, all disposed on a wiring board or the like and integrated with each other. Moreover, other examples include a new module combining a module with another module or processor.

According to the example illustrated in FIG. 28, the video module 1311 is constituted by a combination of configurations having functions associated with image processing, and includes an application processor, a video processor, a broadband modem 1333, and an RF module 1334.

A processor is constituted by configurations having predetermined functions and integrated on semiconductor chips by system on a chip (SoC). There is a processor called a system large scale integration (LSI), for example. These configurations performing predetermined functions may be logic circuits (hardware configurations), may be units such as CPU, ROM, and RAM and programs executed by these units (software configurations), or may be a combination of both types. For example, the processor may include logic circuits and units such as CPU, ROM, and RAM, realize a part of functions by the logic circuits (hardware configurations), and realize other functions under programs executed by the CPU (software configurations).

The application processor 1331 illustrated in FIG. 28 is a processor which executes applications associated with image processing. The applications executed by the application processor 1331 may perform not only arithmetic processing, but also control configurations inside or outside the video module 1311, such as a video processor 1332, as necessary to realize predetermined functions.

The video processor 1332 is a processor having functions associated with encoding and decoding (either one or both of encoding and decoding) of images.

The broadband modem 1333 is a processor (or module) which performs processing associated with wired or wireless (or both) broadband communication provided via broadband lines such as the Internet and public telephone line networks. For example, the broadband modem 1333 converts data to be transmitted (digital signals) into analog signals by digital modulation or other methods, and converts received analog signals into data (digital signals) by demodulation. For example, the broadband modem 1333 performs digital modulation and demodulation for image data processed by the video processor 1332, streams containing encoded image data, application programs, setting data, and other arbitrary information.

The RF module 1334 is a module which performs frequency transform, modulation and demodulation, amplification, filtering and other processing for radio frequency (RF) signals transmitted and received via an antenna. For example, the RF module 1334 performs frequency transform or other processing for baseband signals generated by the broadband modem 1333 to generate RF signals. For example, the RF module 1334 further performs frequency transform or other processing for RF signals received via the front end module 1314 to generate baseband signals.

Note that, as indicated by a dotted line 1341 in FIG. 28, the application processor 1331 and the video processor 1332 may be integrated into one processor.

The external memory 1312 is a module which includes a storage device provided outside the video module 1311 and used by the video module 1311. The storage device of the external memory 1312 may be realized by an arbitrary physical configuration. It is preferable that this storage device is realized by a semiconductor memory relatively inexpensive and having a large capacity, such as a dynamic random access memory (DRAM), considering that the storage device is generally used for storage of large-volume data such as image data in units of frame.

The power management module 1313 manages and controls power supply to the video module 1311 (to respective configurations within video module 1311).

The front end module 1314 is a module which provides a front end function (circuit at transmission and reception end on antenna side) for the RF module 1334. As illustrated in FIG. 28, the front end module 1314 includes an antenna unit 1351, a filter 1352, and an amplification unit 1353.

The antenna unit 1351 includes an antenna for transmitting and receiving wireless signals, and peripheral configurations of the antenna. The antenna unit 1351 transmits signals supplied from the amplification unit 1353 as wireless signals to supply received wireless signals to the filter 1352 as electric signals (RF signals). The filter 1352 filters RF signals received via the antenna unit 1351, and supplies the processed RF signals to the RF module 1334. The amplification unit 1353 amplifies RF signals supplied from the RF module 1334, and supplies the amplified RF signals to the antenna unit 1351.

The connectivity 1321 is a module having functions associated with connection to the outside. The physical configuration of the connectivity 1321 may be arbitrarily determined. For example, the connectivity 1321 includes a configuration having a communication function other than a function in conformity to a communication standard corresponding to the broadband modem 1333, an external input/output terminal, and others.

For example, the connectivity 1321 may include a module having a communication function in conformity to wireless communication standards such as Bluetooth (registered trademark), IEEE 802.11 (such as wireless fidelity (Wi-Fi, registered trademark)), near field communication (NFC), and infrared data association (IrDA), or an antenna transmitting and receiving signals in conformity to these standards. For example, the connectivity 1321 may include a module having a communication function in conformity to wired communication standards such as a universal serial bus (USB), and a high-definition multimedia interface (HDMI, registered trademark), or a terminal in conformity to these standards. For example, the connectivity 1321 may have a function for transmitting other data (signals), such as a function of an analog input/output terminal.

The connectivity 1321 may include a device corresponding to a transmission destination of data (signals). For example, the connectivity 1321 may include a drive (including not only drive for removable medium, but also hard disk, solid state drive (SSD), network attached storage (NAS) and the like) for reading and writing data from and to a recording medium such as a magnetic disk, an optical disk, a magneto-optical disk, and a semiconductor memory. Moreover, the connectivity 1321 may include a device for outputting images and voices (such as monitor and speaker).

The camera 1322 is a module which has a function of imaging a subject and obtaining image data on the subject. Image data obtained after imaging by the camera 1322 is supplied to and encoded by the video processor 1332, for example.

The sensor 1323 is a module having an arbitrary sensor function, such as audio sensor, ultrasonic sensor, optical sensor, illuminance sensor, infrared sensor, image sensor, rotation sensor, angle sensor, angular velocity sensor, speed sensor, acceleration sensor, inclination sensor, magnetism identification sensor, shock sensor, and temperature sensor. Data detected by the sensor 1323 is supplied to the application processor 1331, and utilized by applications or the like, for example.

The configurations described as modules may be realized as processors, or configurations described as processors may be realized as modules.

According to the video set 1300 thus constructed, the present disclosure may be applied to the video processor 1332 as described below. Accordingly, the video set 1300 may be practiced as a set according to the present disclosure.

(Configuration Example of Video Processor)

FIG. 29 illustrates an example of a general configuration of the video processor 1332 (FIG. 28) according to the present disclosure.

According to the example illustrated in FIG. 29, the video processor 1332 has both a function of receiving video signals and audio signals and encoding these input by a predetermined system, and a function of decoding encoded video data and audio data, and reproducing and outputting video signals and audio signals.

As illustrated in FIG. 29, the video processor 1332 includes a video input processing unit 1401, a first image scaling unit 1402, a second image scaling unit 1403, a video output processing unit 1404, a frame memory 1405, and a memory control unit 1406. Moreover, the video processor 1332 includes an encode/decode engine 1407, video elementary stream (ES) buffers 1408A and 1408B, and audio ES buffer 1409A and 1409B. The video processor 1332 further includes an audio encoder 1410, an audio decoder 1411, a multiplexing unit (multiplexer (MUX)) 1412, a demultiplexing unit (demultiplexer (DMUX)) 1413, and a stream buffer 1414.

The video input processing unit 1401 acquires video signals input through the connectivity 1321 (FIG. 28) or the like, and converts the video signals into digital image data. The first image scaling unit 1402 performs format conversion, image scaling, and other processing for image data. The second image scaling unit 1403 performs image scaling for image data in accordance with a format of an output destination to which images are output via the video output processing unit 1404, and performs format conversion and image scaling similar to those of the first image scaling unit 1402, for example. The video output processing unit 1404 performs format conversion, conversion into analog signals, and other processing for image data, and outputs the processed image data to the connectivity 1321 (FIG. 28) and others as reproduced video signals.

The frame memory 1405 is an image data memory shared by the video input processing unit 1401, the first image scaling unit 1402, the second image scaling unit 1403, the video output processing unit 1404, and the encode/decode engine 1407. The frame memory 1405 is realized as a semiconductor memory such as a DRAM.

The memory control unit 1406 receives synchronous signals from the encode/decode engine 1407, and controls access for writing and reading to and from the frame memory 1405 in accordance with an access schedule written to an access management table 1406A to indicate access to the frame memory 1405. The access management table 1406A is updated by the memory control unit 1406 in accordance with processes executed by the encode/decode engine 1407, the first image scaling unit 1402, the second image scaling unit 1403 and others.

The encode/decode engine 1407 encodes image data, and decodes video streams corresponding to encoded image data. For example, the encode/decode engine 1407 encodes image data read from the frame memory 1405, and sequentially writes the encoded image data to the video ES buffer 1408A as video streams. Moreover, for example, the encode/decode engine 1407 sequentially reads video streams from the video ES buffer 1408B, decodes the read video streams, and sequentially writes the decoded video streams to the frame memory 1405 as image data. The encode/decode engine 1407 uses the frame memory 1405 as a work area for encoding and decoding of the data. Moreover, the encode/decode engine 1407 outputs synchronous signals to the memory control unit 1406 at a start of processing for each macroblock, for example.

The video ES buffer 1408A buffers video streams generated by the encode/decode engine 1407, and supplies the buffered video streams to the multiplexing unit (MUX) 1412. The video ES buffer 1408B buffers video streams supplied from the demultiplexing unit (DMUX) 1413, and supplies the buffered video streams to the encode/decode engine 1407.

The audio ES buffer 1409A buffers audio streams generated by the audio encoder 1410, and supplies the buffered audio streams to the multiplexing unit (MUX) 1412. The audio ES buffer 1409B buffers audio streams supplied from the demultiplexing unit (DMUX) 1413, and supplies the buffered audio streams to the audio decoder 1411.

The audio encoder 1410 converts audio signals input from the connectivity 1321 (FIG. 28) or others into digital signals, for example, and encodes the digital signals by a predetermined system such as MPEG audio system and audiocode number 3 (AC3) system. The audio encoder 1410 sequentially writes audio streams as data constituted by encoding audio signals to the audio ES buffer 1409A. The audio decoder 1411 decodes audio streams supplied from the audio ES buffer 1409B, converts the decoded audio streams into analog signals, for example, and supplies the analog signals to the connectivity 1321 (FIG. 28) or others as reproduced audio signals.

The multiplexing unit (MUX) 1412 multiplexes video streams and audio streams. The method for multiplexing (i.e., format of bit streams generated by multiplexing) may be arbitrarily determined. Moreover, during multiplexing, the multiplexing unit (MUX) 1412 may add predetermined header information or the like to bit streams. In other words, the multiplexing unit (MUX) 1412 may convert a format of streams by multiplexing. For example, the multiplexing unit (MUX) 1412 multiplexes video streams and audio streams for conversion into transport streams corresponding to bit streams of a transport format. Moreover, for example, the multiplexing unit (MUX) 1412 multiplexes video streams and audio streams for conversion into data of a recording file format (file data).

The demultiplexing unit (DMUX) 1413 demultiplexes bit streams containing multiplexed video streams and audio streams by a method corresponding to multiplexing by the multiplexing unit (MUX) 1412. More specifically, the demultiplexing unit (DMUX) 1413 extracts video streams and audio streams from bit streams read from the stream buffer 1414 (separates video streams and audio streams from bit streams). In other words, the demultiplexing unit (DMUX) 1413 converts the format of the streams by demultiplexing (inverse conversion from conversion by multiplexing unit (MUX) 1412). For example, the demultiplexing unit (DMX) 1413 acquires, via the stream buffer 1414, transport streams supplied from the connectivity 1321, the broadband modem 1333 (both in FIG. 28) or others, and demultiplexes the acquired transport streams for conversion into video streams and audio streams. Moreover, for example, the demultiplexing unit (DMUX) 1413 acquires, via the stream buffer 1414, file data read from various types of recording media by the connectivity 1321 (FIG. 28) or others, and demultiplexes the file data for conversion into video streams and audio streams.

The stream buffer 1414 buffers bit streams. For example, the stream buffer 1414 buffers transport streams supplied from the multiplexing unit (MUX) 1412, and supplies the buffered transport streams to the connectivity 1321, the broadband modem 1333 (both in FIG. 28) and others at predetermined timing, in response to a request from the outside, or other occasions.

Moreover, for example, the stream buffer 1414 buffers file data supplied from the multiplexing unit (MUX) 1412, and supplies the buffered file data to the connectivity 1321 (FIG. 28) and others at predetermined timing, in response to a request from the outside, or other occasions.

The stream buffer 1414 further buffers transport streams acquired via the connectivity 1321, the broadband modem 1333 (both in FIG. 28) and others, and supplies the buffered transport streams to the demultiplexing unit (DMUX) 1413 at predetermined timing, in response to a request from the outside, or other occasions.

The stream buffer 1414 further buffers file data read from various types of recording media via the connectivity 1321 (FIG. 28) and others, and supplies the buffered file data to the demultiplexing unit (DMUX) 1413 at predetermined timing, in response to a request from the outside, or other occasions.

An example of operation performed by the video processor 1332 thus constructed is hereinafter described. For example, video signals input to the video processor 1332 from the connectivity 1321 (FIG. 28) or others are converted into digital image data of a predetermined system such as 4:2:2Y/Cb/Cr system by the video input processing unit 1401, and sequentially written to the frame memory 1405. The digital image data is read by the first image scaling unit 1402 or the second image scaling unit 1403, and again written to the frame memory 1405 after format conversion into a predetermined system such as 4:2:0Y/Cb/Cr system and scaling. The image data is encoded by the encode/decode engine 1407, and written to the video ES buffer 1408A as video streams.

Moreover, audio signals input to the video processor 1332 from the connectivity 1321 (FIG. 28) or others are encoded by the audio encoder 1410, and written to the audio ES buffer 1409A as audio streams.

The video streams in the video ES buffer 1408A and the audio streams in the audio ES buffer 1409A are read and multiplexed by the multiplexing unit (MUX) 1412, and converted into transport streams or file data, for example. The transport streams generated by the multiplexing unit (MUX) 1412 are buffered by the stream buffer 1414, and output to an external network via the connectivity 1321 and the broadband modem 1333 (both in FIG. 28), for example. Moreover, the file data generated by the multiplexing unit (MUX) 1412 is buffered by the stream buffer 1414, output to the connectivity 1321 (FIG. 28) or others, and recorded in various types of recording media.

Moreover, the transport streams input to the video processor 1332 from the external network via the connectivity 1321, the broadband modem 1333 (both illustrated in FIG. 28) or others are buffered by the stream buffer 1414, and demultiplexed by the demultiplexing unit (DMUX) 1413. Moreover, the file data read from various types of recording media by the connectivity 1321 (FIG. 28) or others, and input to the video processor 1332 are buffered by the stream buffer 1414, and demultiplexed by the demultiplexing unit (DMUX) 1413. In other words, the transport streams or the file data input to the video processor 1332 are separated into video streams and audio streams by the demultiplexing unit (DMUX) 1413.

Audio streams are supplied to the audio decoder 1411 via the audio ES buffer 1409B, and decoded to reproduce audio signals. Moreover, video streams are written to the video ES buffer 1408B, sequentially read and decoded by the encode/decode engine 1407, and written to the frame memory 1405. The decoded image data is scaled by the second scaling unit 1403, and written to the frame memory 1405. Then, the decoded image data is read by the video output processing unit 1404, and converted into a format of a predetermined system such as 4:2:2Y/Cb/Cr system. The converted data is further converted into analog signals to reproduce and output video signals.

According to the video processor 1332 thus constructed, the encode/decode engine 1407 may incorporate the respective embodiments of the present disclosure described above. More specifically, the encode/decode engine 1407 may have the function of the encoding devices according to the first and second embodiments, for example. According to this configuration, the video processor 1332 offers advantageous effects similar to the advantageous effects described with reference to FIGS. 1 through 23.

Note that the encode/decode engine 1407 according to the present disclosure (i.e., function of decoding device of the respective embodiments) may be realized by hardware such as logic circuits, may be realized by software such as incorporated programs, or may be realized by a combination of both.

(Other Configuration Examples of Video Processor)

FIG. 30 illustrates another example of a general configuration of the video processor 1332 (FIG. 28) according to the present disclosure. According to the example illustrated in FIG. 30, the video processor 1332 has a function of encoding and decoding video data by a predetermined system.

More specifically, the video processor 1332 includes a control unit 1511, a display interface 1512, a display engine 1513, an image processing engine 1514, and an internal memory 1515 as illustrated in FIG. 30. The video processor 1332 further includes a codec engine 1516, a memory interface 1517, a multiplexing/demultiplexing unit (MUX/DMUX) 1518, a network interface 1519, and a video interface 1520.

The control unit 1511 controls operations of respective units within the video processor 1332, such as the display interface 1512, the display engine 1513, the image processing engine 1514, and the codec engine 1516.

As illustrated in FIG. 30, the control unit 1511 includes a main CPU 1531, a sub CPU 1532, and a system controller 1533, for example. The main CPU 1531 executes programs or the like for controlling operations of the respective processing units included in the video processor 1332. The main CPU 1531 generates control signals under the programs or the like, and supplies the generated control signals to the respective processing units (i.e., controls operations of the respective processing units). The sub CPU 1532 supplements the functions of the main CPU 1531. For example, the sub CPU 1532 executes processing such as child processes, sub routines of the programs or the like executed by the main CPU 1531. The system controller 1533 controls operations of the main CPU 1531 and the sub CPU 1532 by designating programs executed by the main CPU 1531 and the sub CPU 1532, for example.

The display interface 1512 outputs image data to the connectivity 1321 (FIG. 28), for example, under control by the control unit 1511. For example, the display interface 1512 outputs image data constituted by digital data to a monitoring device or the like of the connectivity 1321 (FIG. 28) as reproduced video signals after conversion from image data constituted by digital data into analog signals, or as image data constituted by digital data without change.

The display engine 1513 performs various types of conversion, such as format conversion, size conversion, and color gamut conversion for the image data under control by the control unit 1511 to match the image data with hardware specifications of a monitoring device or the like which displays the images.

The image processing engine 1514 performs predetermined image processing, such as filtering for image quality improvement, for the image data under control by the control unit 1511.

The internal memory 1515 is a memory provided inside the video processor 1332 and shared by the display engine 1513, the image processing engine 1514, and the codec engine 1516. The internal memory 1515 is used for data exchange between the display engine 1513, the image processing engine 1514, and the codec engine 1516. For example, the internal memory 1515 stores data supplied from the display engine 1513, the image processing engine 1514, or the codec engine 1516, and supplies the data to the display engine 1513, the image processing engine 1514, or the codec engine 1516 as necessary (in response to request, for example). The internal memory 1515 may be realized by an arbitrary storage device. It is preferable that the internal memory 1515 is realized by a semiconductor memory having a relatively small capacity (in comparison with external memory 1312) and a high response speed, such as static random access memory (SRAM), in consideration that the internal memory 1515 is generally used for storage of small-volume data such as image data in units of block, and parameters.

The codec engine 1516 performs processing associated with encoding and decoding of image data. The encoding and decoding system handled by the codec engine 1516 may be arbitrarily determined. The encoding and decoding system handled by the codec engine 1516 may be one system or a plurality of systems. For example, the codec engine 1516 may have a plurality of encoding and decoding codec functions, and encode image data or decode encoded data by using one selected from these functions.

According to the example illustrated in FIG. 30, the codec engine 1516 includes an MPEG-2 Video 1541, an AVC/H. 264 1542, an HEVC/H. 265 1543, an HEVC/H. 265(Scalable) 1544, an HEVC/H. 265(Multi-view) 1545, and an MPEG-DASH 1551, as function blocks for processing associated with codec, for example.

The MPEG-2 Video 1541 is a function block performing encoding and decoding of image data by MPEG-2 system. The AVC/H. 264 1542 is a function block performing encoding and decoding of image data by AVC system. The HEVC/H. 265 1543 is a function block performing encoding and decoding of image data by HEVC system. The HEVC/H. 265(Scalable) 1544 is a function block performing scalable encoding and scalable decoding of image data by HEVC system. The HEVC/H. 265(Multi-view) 1545 is a function block performing multiview encoding and multiview decoding of image data by HEVC system.

The MPEG-DASH 1551 is a function block which transmits and receives image data by MPEG-dynamic adaptive streaming over HTTP (MPEG-DASH) system. MPEG-DASH is a technology for video streaming using hypertext transfer protocol (HTTP), and is characterized by selecting appropriate encoded data in units of segment from a plurality of sets of encoded data having different resolution or the like and prepared beforehand, and thereafter transmitting the selected encoded data, as one of characteristics of this technology. The MPEG-DASH 1551 generates streams in conformity to standards, and performs transmission control for the streams and other processing. The MPEG-DASH 1551 uses the foregoing MPEG-2 Video 1541 through HEVC/H. 265(Multi-view) 1545 for encoding and encoding of image data.

The memory interface 1517 is an interface for the external memory 1312. Data supplied from the image processing engine 1514 and the codec engine 1516 is supplied to the external memory 1312 via the memory interface 1517. Moreover, data read from the external memory 1312 is supplied to the video processor 1332 (image processing engine 1514 or codec engine 1516) via the memory interface 1517.

The multiplexing/demultiplexing unit (MUX/DMUX) 1518 multiplexes and demultiplexes various types of data associated with images such as bit streams of encoded data, image data, video signals and the like. The method for multiplexing and demultiplexing may be arbitrarily determined. For example, the multiplexing/demultiplexing unit (MUX/DMUX) 1518 may not only unify a plurality of sets of data into one set of data, but also add predetermined header information or the like to the data during multiplexing. Moreover, the multiplexing/demultiplexing unit (MUX/DMUX) 1518 may not only divide one set of data into a plurality of sets of data, but also add predetermined header information or the like to the respective divided sets of data during demultiplexing. Accordingly, the multiplexing/demultiplexing unit (MUX/DMUX) 1518 converts data format by multiplexing and demultiplexing. For example, the multiplexing/demultiplexing unit (MUX/DMUX) 1518 may multiplex bit streams to convert the bit streams into transport streams corresponding to bit streams of transport format, or data of recording file format (file data). Needless to say, inverse conversion is allowed by demultiplexing.

The network interface 1519 is an interface for the broadband modem 1333, the connectivity 1321 (both in FIG. 28) and others, for example. The video interface 1520 is an interface for the connectivity 1321, the camera 1322 (both in FIG. 28) and others, for example.

An example of operation of the video processor 1332 thus constructed is hereinafter described. When transport streams are received from an external network via the connectivity 1321, the broadband modem 1333 (both in FIG. 28) or the like, the received transport streams are supplied to the multiplexing/demultiplexing (MUX/DMUX) 1518 via the network interface 1519, demultiplexed by the multiplexing/demultiplexing (MUX/DMUX) 1518, and decoded by the codec engine 1516. Image data obtained after decoding by the codec engine 1516 is supplied to the connectivity 1321 (FIG. 28) or others via the display interface 1512 after predetermined image processing by the image processing engine 1514 and predetermined conversion by the display engine 1513, for example. An image of the supplied image data is displayed on a monitor. Moreover, for example, image data obtained after decoding by the codec engine 1516 is re-encoded by the codec engine 1516, multiplexed by the multiplexing/demultiplexing unit (MUX/DMUX) 1518, and converted into file data. The file data is output to the connectivity 1321 (FIG. 28) or others via the video interface 1520, and recorded in various types of recording media.

Furthermore, for example, file data constituted by encoded image data and read from a not-shown recording medium by the connectivity 1321 (FIG. 28) or others is supplied to the multiplexing/demultiplexing (MUX/DMUX) 1518 via the video interface 1520, demultiplexed by the multiplexing/demultiplexing (MUX/DMUX) 1518, and decoded by the codec engine 1516. The image data obtained after decoding by the codec engine 1516 is supplied to the connectivity 1321 (FIG. 28) or others via the display interface 1512 after predetermined image processing by the image processing engine 1514 and predetermined conversion by the display engine 1513. An image of the supplied image data is displayed on a monitor. Moreover, for example, image data obtained after decoding by the codec engine 1516 is re-encoded by the codec engine 1516, multiplexed by the multiplexing/demultiplexing unit (MUX/DMUX) 1518, and converted into transport streams. The transport streams are supplied to the connectivity 1321, the broadband modem 1333 (both in FIG. 28) or others via the network interface 1519, and transmitted to not-shown other devices.

Note that data exchange of image data and other data between the respective processing units within the video processor 1332 is carried out by using the internal memory 1515 and the external memory 1312, for example. Moreover, the power management module 1313 controls power supply to the control unit 1511, for example.

According to the video processor 1332 thus constructed, the codec engine 1516 may incorporate the respective embodiments according to the present disclosure described above. More specifically, the codec engine 1516 may include a function block for realizing the encoding devices according to the first and second embodiments, for example. The video processor 1332 including the codec engine 1516 having this configuration offers advantageous effects similar to the advantageous effects described with reference to FIGS. 1 through 23.

Note that, according to the codec engine 1516, the present disclosure (i.e., function of decoding devices according to the respective embodiments described above) may be realized by hardware such as logic circuits, may be realized by software such as incorporated programs, or may be realized by a combination of both.

While two examples of the configuration of the video processor 1332 have been discussed, the video processor 1332 may have an arbitrary configuration including configurations other than the foregoing two examples. Moreover, the video processor 1332 may be constituted by one semiconductor chip, or may be constituted by a plurality of semiconductor chips. For example, the video processor 1332 may be constituted by a three-dimensional laminated LSI which laminates a plurality of semiconductors. Alternatively, the video processor 1332 may be realized by a plurality of LSIs.

(Application Examples to Devices)

The video set 1300 may be incorporated in various types of devices for processing image data. For example, the video set 1300 may be incorporated in the television device 900 (FIG. 24), the cellular phone 920 (FIG. 25), the recording and reproducing device 940 (FIG. 26), the imaging device 960 (FIG. 27), and others. The device incorporating the video set 1300 offers advantageous effects similar to the advantageous effects described with reference to FIGS. 1 through 23.

Note that only a part of the respective configurations of the foregoing video set 1300 may be practiced as a configuration according to the present disclosure as long as the video processor 1332 is included in the part. For example, only the video processor 1332 may be practiced as a video processor according to the present disclosure. Moreover, for example, each of the processor indicated by the dotted line 1341, the video module 1311 and the like described above may be practiced as a processor, a module or others according to the present disclosure. Furthermore, for example, the video module 1311, the external memory 1312, the power management module 1313, and the front end module 1314 may be combined, and practiced as the video unit 1361 according to the present disclosure. Any of these configurations offers advantageous effects similar to the advantageous effects discussed with reference to FIGS. 1 through 23.

In other words, an arbitrary configuration including the video processor 1332, like the video set 1300 discussed above, may be incorporated in devices for processing image data. For example, the video processor 1332, the processor indicated by the dotted line 1341, the video module 1311, or the video unit 1361 may be incorporated in the television device 900 (FIG. 24), the cellular phone 920 (FIG. 25), the recording and reproducing device 940 (FIG. 26), the imaging device 960 (FIG. 27) or the like. Then, the device incorporating any of the configurations according to the present disclosure offers advantageous effects similar to the advantageous effects discussed with reference to FIGS. 1 through 23, similarly to the video set 1300.

The present disclosure is applicable to an encoding device which receives bit streams compressed by discrete cosine transform or other orthogonal transform and motion compensation, such as MPEG, H. 26x, via a network medium such as satellite broadcasting, cable TV, the Internet, a cellular phone, and other network media, or processes these bit streams in a storage medium such as optical disk, magnetic disk, and flash memory.

Advantageous effects described in the present specification are presented only by way of example. Other advantageous effects may be offered.

Moreover, embodiments according to the present disclosure are not limited to the respective embodiments described herein, but may be practiced otherwise without departing from the scope of the present disclosure.

For example, the first embodiment and the second embodiment may be combined. In this case, bidirectional prediction is executed by using motion vectors with integer accuracy when execution of bidirectional prediction is determined. On the other hand, L0 prediction or L1 prediction is executed instead of bidirectional prediction when inexecution of bidirectional prediction is determined.

Moreover, for example, the present disclosure may have a cloud computing configuration which shares one function by a plurality of devices, and processes this function in cooperation with the respective devices connected via a network.

Moreover, the respective steps discussed with reference to the foregoing flowcharts may be shared and executed by multiple devices rather than executed by one device.

Furthermore, when multiple processes are contained in one step, the multiple processes contained in the one step may be shared and executed by multiple devices rather than executed by one device.

The present disclosure may have following configurations.

(1)

An encoding device including:

an accuracy transform unit that transforms a motion vector with fractional pixel accuracy of an image into a motion vector with integer pixel accuracy for each of prediction directions for bidirectional prediction of the image;

a predicted image formation unit that forms a predicted image of bidirectional prediction for the image on the basis of the motion vector with integer pixel accuracy transformed by the accuracy transform unit for each of the prediction directions; and an encoding unit that encodes the image in accordance with a recursively divided block structure by using the predicted image of the bidirectional prediction formed by the predicted image formation unit.

(2)

The encoding device according to (1) noted above, wherein the predicted image formation unit includes an average unit that averages intermediate predicted images corresponding to predicted images of the image formed on the basis of the motion vectors with integer pixel accuracy for the respective prediction directions to form a predicted image of the bidirectional prediction.

(3)

The encoding device according (2) noted above, wherein the predicted image formation unit further includes a storage unit that stores the intermediate predicted image, and the average unit averages the intermediate predicted images stored in the storage unit.

(4)

The encoding device according to (2) or (3) noted above, wherein the predicted image formation unit further includes an intermediate predicted image formation unit that forms the intermediate predicted image on the basis of the motion vector with integer pixel accuracy for each of the prediction directions.

(5)

The encoding device according to any one of (1) through (4) noted above, further including a setting unit that determines integer pixel accuracy or fractional pixel accuracy as accuracy of the motion vector used for forming the predicted image of the bidirectional prediction in accordance with an application.

(6)

The encoding device according to any one of (1) through (4) noted above, further including a setting unit that determines integer pixel accuracy or fractional pixel accuracy as accuracy of the motion vector used for forming the predicted image of the bidirectional prediction on the basis of a quantization parameter, a frame rate, or resolution of the image.

(7)

The encoding device according to any one of (1) through (6) noted above, further including a direction limitation prediction unit that limits prediction to either forward prediction or backward prediction when the bidirectional prediction is not executed.

(8)

The encoding device according to (7) noted above, wherein the direction limitation prediction unit includes a determination unit that determines a forward direction or a backward direction as the prediction direction by using a reduced image reduced from the image, and reduced reference images reduced from forward and backward reference images of the image when the bidirectional prediction is not executed, and a prediction unit that executes the forward prediction or the backward prediction determined by the determination unit by using the image, and the forward or backward reference image of the image.

(9)

The encoding device according to (8) noted above, wherein the determination unit determines the prediction direction in units of a plurality of largest coding units (LCUs).

(10)

The encoding device according to (8) or (9) noted above, wherein the determination unit determines the prediction direction on the basis of forward and backward motion vectors of the reduced image.

(11)

The encoding device according to any one of (8) through (10) noted above, wherein the determination unit determines the prediction direction on the basis of a cost function value of a reduced predicted image corresponding to a predicted image of the reduced image and formed on the basis of the reduced reference images.

(12)

The encoding device according to any one of (7) through (11) noted above, further including a determination unit that determines inexecution of the bidirectional prediction in accordance with an application.

(13)

The encoding device according to any one of (7) through (11) noted above, further including a determination unit that determines inexecution of the bidirectional prediction on the basis of a quantization parameter, a frame rate, or resolution of the image.

(14)

An encoding method including:

an accuracy transform step that transforms a motion vector with fractional pixel accuracy of an image into a motion vector with integer pixel accuracy for each of prediction directions when an encoding device executes bidirectional prediction for the image;

a predicted image formation step that forms a predicted image of bidirectional prediction for the image on the basis of the motion vector with integer pixel accuracy transformed by the accuracy transform step for each of the prediction directions; and an encoding step that encodes the image in accordance with a recursively divided block structure by using the predicted image of the bidirectional prediction formed by the predicted image formation step.

(15)

An encoding device including:

a direction limitation prediction unit that limits prediction for an image to either forward prediction or backward prediction in units of a plurality of largest coding units (LCUs) when a predicted image is formed for the image; and an encoding unit that encodes the image in accordance with a recursively divided block structure by using the predicted image.

(16)

The encoding device according to (15) noted above, wherein the direction limitation prediction unit includes a determination unit that determines a forward direction or a backward direction as the prediction direction in units of a plurality of largest coding units (LCUs) by using a reduced image reduced from the image, and reduced reference images reduced from forward and backward reference images of the image, and a prediction unit that executes the forward or backward prediction determined by the determination unit by using the image and the forward or backward reference image of the image.

(17)

The encoding device according to (15) or (16) noted above, wherein the direction limitation prediction unit imposes a limitation in accordance with an application.

(18)

The encoding device according to (15) or (16) noted above, wherein the direction limitation prediction unit imposes a limitation on the basis of a quantization parameter, a frame rate, or resolution of the image.

(19)

An encoding method including:

a direction limitation prediction step that limits prediction for an image to either forward prediction or backward prediction in units of a plurality of largest coding units (LCUs) when an encoding device forms a predicted image for the image; and an encoding step that encodes the image in accordance with a recursively divided block structure by using the predicted image.

REFERENCE SIGNS LIST

10 Encoding device
33 Arithmetic unit
82 Accuracy transform unit
83 Intermediate predicted image formation unit
84 Memory
86 Accuracy transform unit
30 87 Intermediate predicted image formation unit
88 Memory
89 Average unit
100 Encoding device
151 Bidirectional prediction unit
174 Determination unit
175 Prediction unit

The invention claimed is:

1. An encoding device comprising:
an accuracy transform unit that transforms a motion vector with fractional pixel accuracy of an image into a motion vector with integer pixel accuracy for each of prediction directions for bidirectional prediction of the image;
a predicted image formation unit that forms a predicted image of bidirectional prediction for the image on the basis of the motion vector with integer pixel accuracy transformed by the accuracy transform unit for each of the prediction directions; and
an encoding unit that encodes the image in accordance with a recursively divided block structure by using the predicted images of the bidirectional prediction formed by the predicted image formation unit,
wherein the predicted image formation unit includes an average unit that averages intermediate predicted images corresponding to the predicted images for respective prediction directions to form the predicted image of the bidirectional prediction, and
wherein the accuracy transform unit, the predicted image formation unit, the encoding unit, and the average unit are each implemented via at least one processor.

2. The encoding device according to claim 1, wherein
the predicted image formation unit further includes a storage unit that stores the intermediate predicted images,
the average unit averages the intermediate predicted images stored in the storage unit, and
the storage unit is implemented via at least one processor.

3. The encoding device according to claim 1, wherein
the predicted image formation unit further includes an intermediate predicted image formation unit that forms the intermediate predicted images on the basis of the motion vector with integer pixel accuracy for each of the prediction directions, and
the intermediate predicted image formation unit is implemented via at least one processor.

4. The encoding device according to claim 1, further comprising:
a setting unit that determines integer pixel accuracy or fractional pixel accuracy as accuracy of the motion vector used for forming the predicted image of the bidirectional prediction in accordance with an application,
wherein the setting unit is implemented via at least one processor.

5. The encoding device according to claim 1, further comprising:
a setting unit that determines integer pixel accuracy or fractional pixel accuracy as accuracy of the motion vector used for forming the predicted image of the bidirectional prediction on the basis of a quantization parameter, a frame rate, or resolution of the image,
wherein the setting unit is implemented via at least one processor.

6. The encoding device according to claim 1, further comprising:
a direction limitation prediction unit that limits prediction to either forward prediction or backward prediction when the bidirectional prediction is not executed,
wherein the direction limitation prediction unit is implemented via at least one processor.

7. The encoding device according to claim 6,
wherein the direction limitation prediction unit includes
a determination unit that determines a forward direction or a backward direction as the prediction direction by using the reduced image reduced from the image, and reduced reference images reduced from forward and backward reference images of the image when the bidirectional prediction is not executed, and
a prediction unit that executes the forward prediction or the backward prediction determined by the determination unit by using the image, and the forward or backward reference image of the image, and
wherein the determination unit and the prediction unit are each implemented via at least one processor.

8. The encoding device according to claim 7, wherein the determination unit determines the prediction direction in units of a plurality of largest coding units (LCUs).

9. The encoding device according to claim 7, wherein the determination unit determines the prediction direction on the basis of forward and backward motion vectors of the reduced image.

10. The encoding device according to claim 7, wherein the determination unit determines the prediction direction on the basis of a cost function value of a reduced predicted image corresponding to a predicted image of the reduced image and formed on the basis of the reduced reference images.

11. The encoding device according to claim 6, further comprising:
a determination unit that determines inexecution of the bidirectional prediction in accordance with an application.

12. The encoding device according to claim 6, further comprising:
a determination unit that determines inexecution of the bidirectional prediction on the basis of a quantization parameter, a frame rate, or resolution of the image.

13. An encoding method comprising:
transforming a motion vector with fractional pixel accuracy of an image into a motion vector with integer pixel accuracy for each of prediction directions when an encoding device executes bidirectional prediction for the image;
forming a predicted image of bidirectional prediction for the image on the basis of the transformed motion vector with integer pixel accuracy for each of the prediction directions; and
encoding the image in accordance with a recursively divided block structure by using the formed predicted images of the bidirectional prediction,
wherein forming the predicted image comprises averaging intermediate predicted images corresponding to the predicted images for respective prediction directions to form the predicted image of the bidirectional prediction.

14. An encoding device comprising:
a direction limitation prediction unit that determines forward prediction or backward prediction as prediction for an image in units of a plurality of largest coding units (LCUs), when a predicted image is formed for the image, by using a reduced image reduced from the image; and
an encoding unit that encodes the image in accordance with a recursively divided block structure by using the predicted image,
wherein the direction limitation prediction unit and the encoding unit are each implemented via at least one processor.

15. The encoding device according to claim 14, wherein the direction limitation prediction unit includes
a determination unit that determines a forward direction or a backward direction as the prediction direction in units of a plurality of largest coding units (LCUs) by using the reduced image reduced from the image, and reduced reference images reduced from forward and backward reference images of the image, and
a prediction unit that executes the forward or backward prediction determined by the determination unit by using the image and the forward or backward reference image of the image, and
wherein the determination unit and the prediction unit are each implemented via at least one processor.

16. The encoding device according to claim 14, wherein the direction limitation prediction unit imposes a limitation in accordance with an application.

17. The encoding device according to claim 14, wherein the direction limitation prediction unit imposes a limitation on the basis of a quantization parameter, a frame rate, or resolution of the image.

18. An encoding method comprising:
determining forward prediction or backward prediction as prediction for an image in units of a plurality of largest coding units (LCUs), when an encoding device forms a predicted image for the image, by using a reduced image reduced from the image; and
encoding the image in accordance with a recursively divided block structure by using the predicted image.

* * * * *